June 21, 1960 M. HEBEL 2,941,716
BOOKKEEPING AND CALCULATING MACHINE
Filed Oct. 13, 1953 26 Sheets-Sheet 2
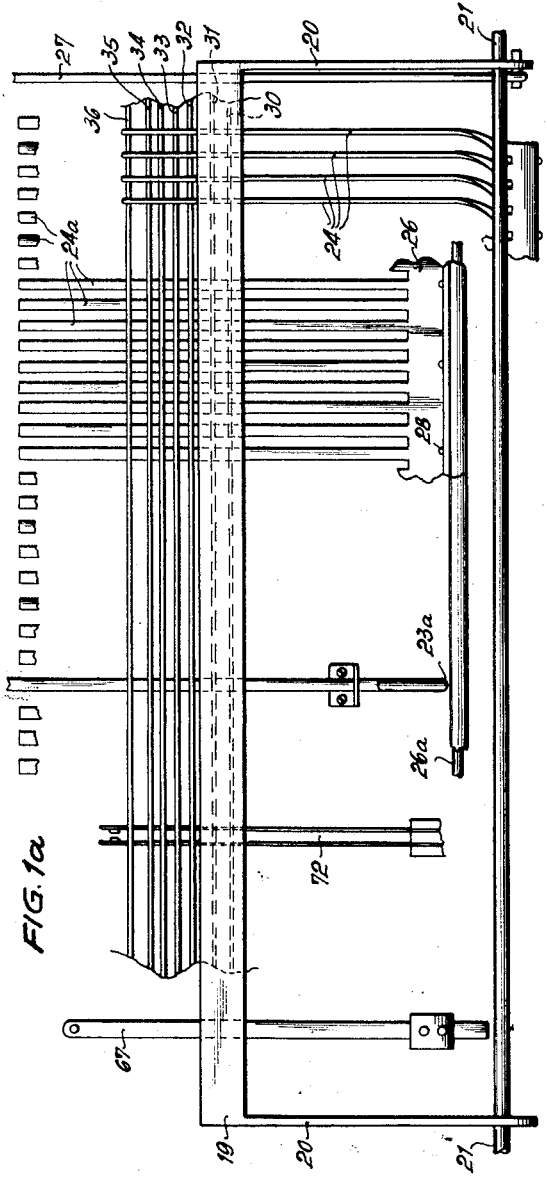
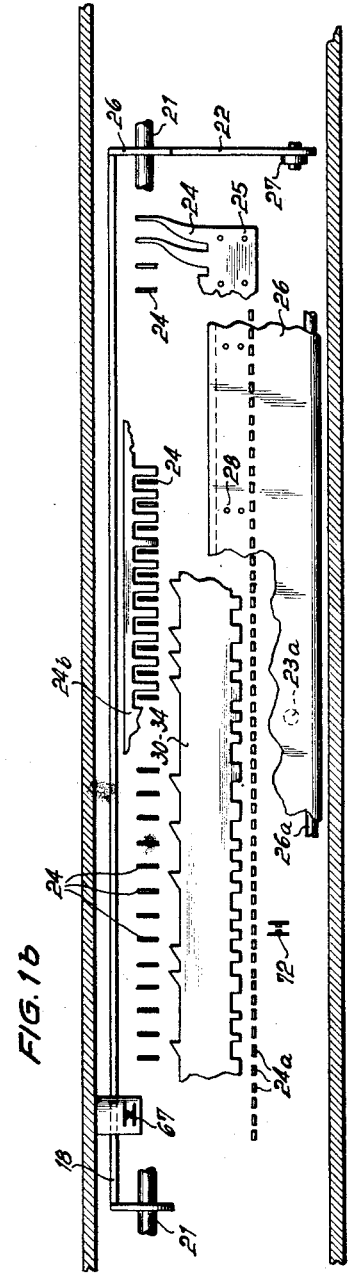
INVENTOR:
MARTIN HEBEL
BY:

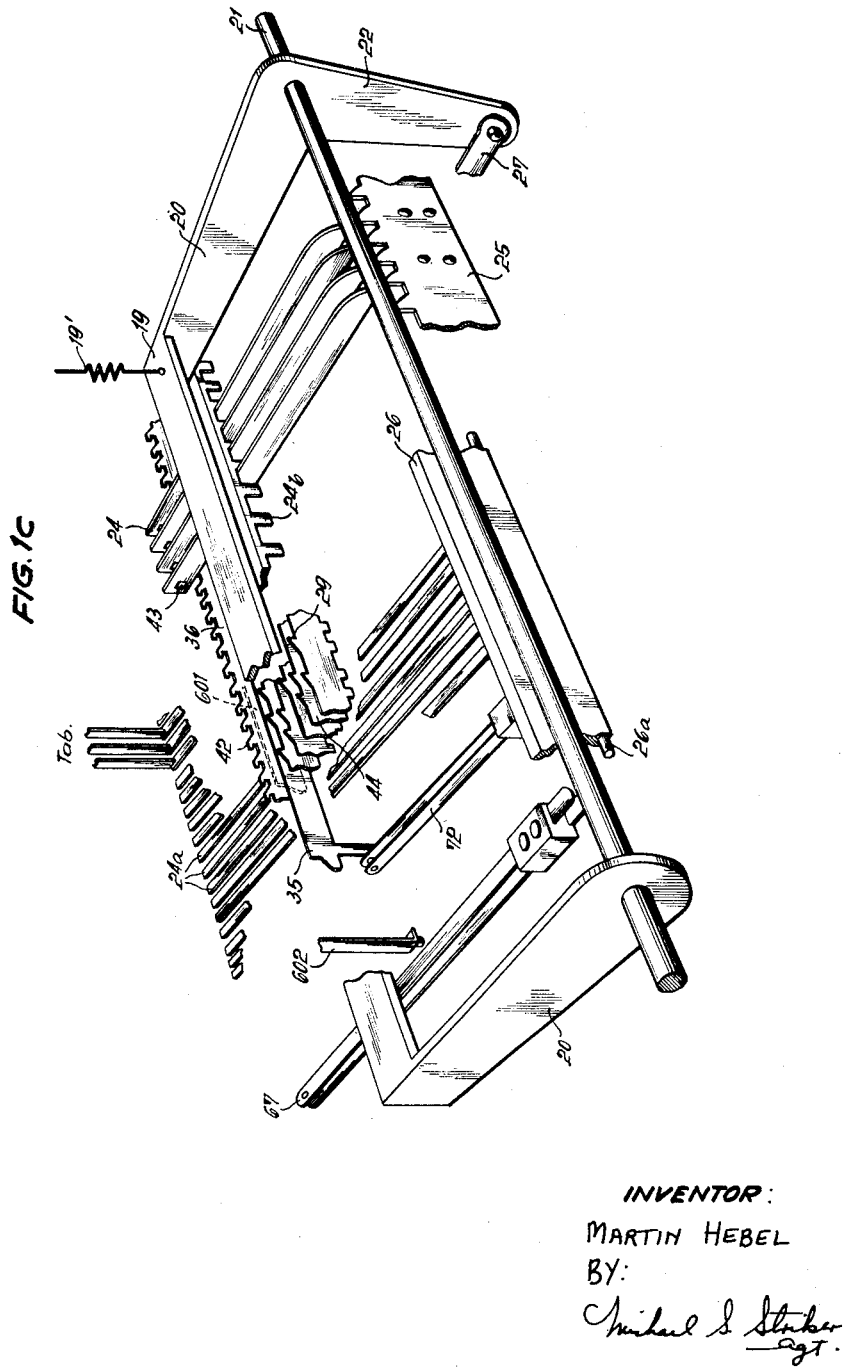

June 21, 1960 M. HEBEL 2,941,716
BOOKKEEPING AND CALCULATING MACHINE
Filed Oct. 13, 1953 26 Sheets-Sheet 4
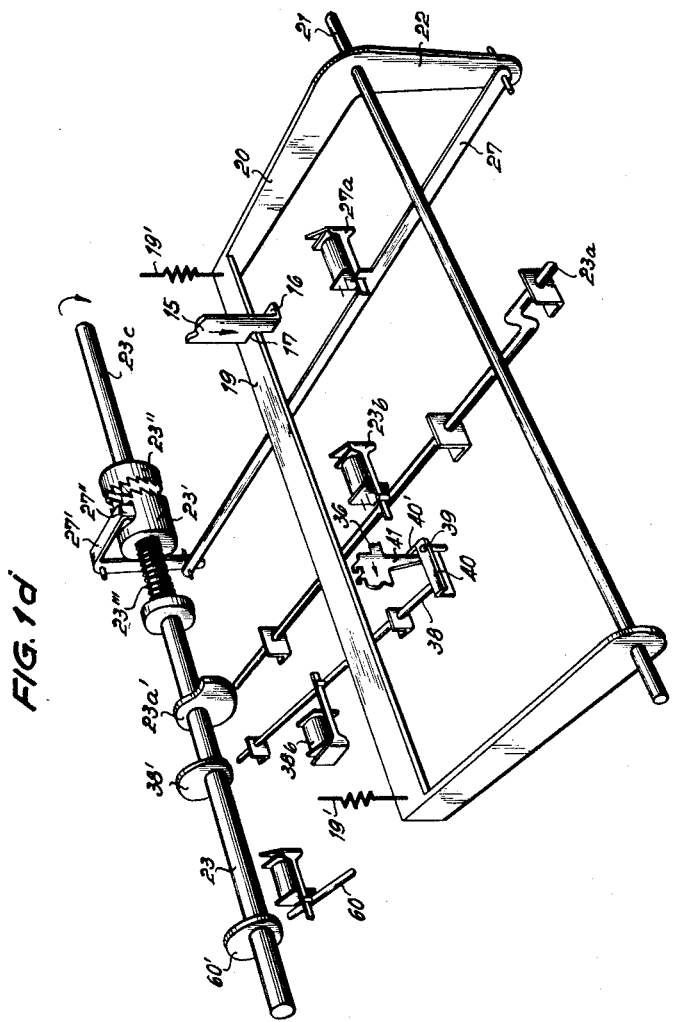
INVENTOR:
MARTIN HEBEL
BY:

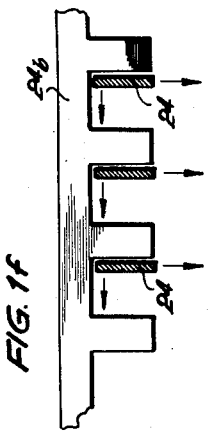
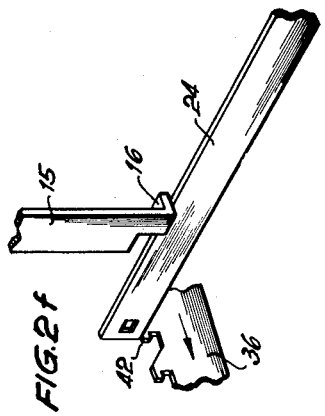
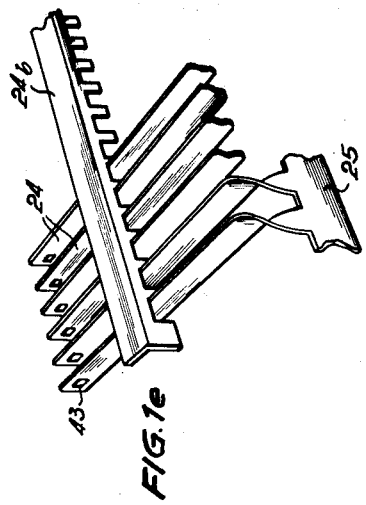
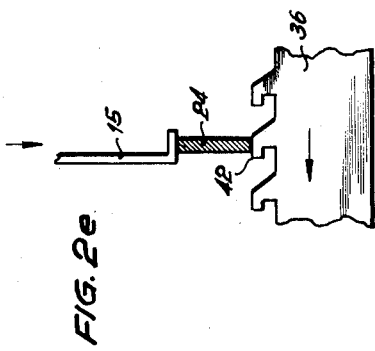

June 21, 1960 M. HEBEL 2,941,716
BOOKKEEPING AND CALCULATING MACHINE
Filed Oct. 13, 1953 26 Sheets-Sheet 6

INVENTOR:
MARTIN HEBEL
BY:

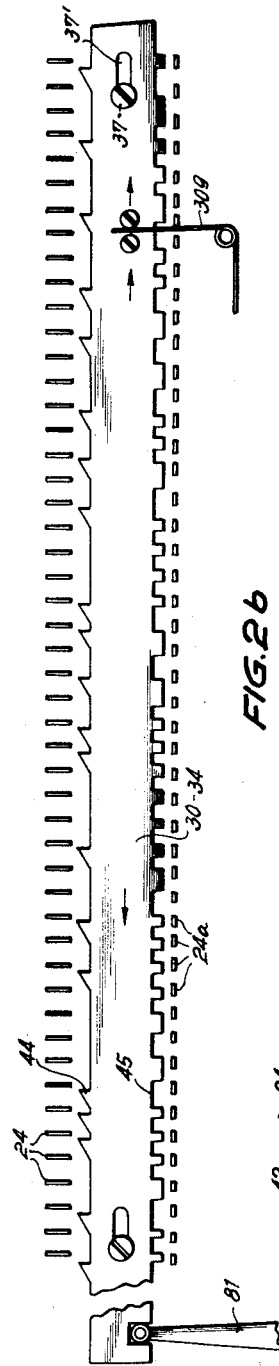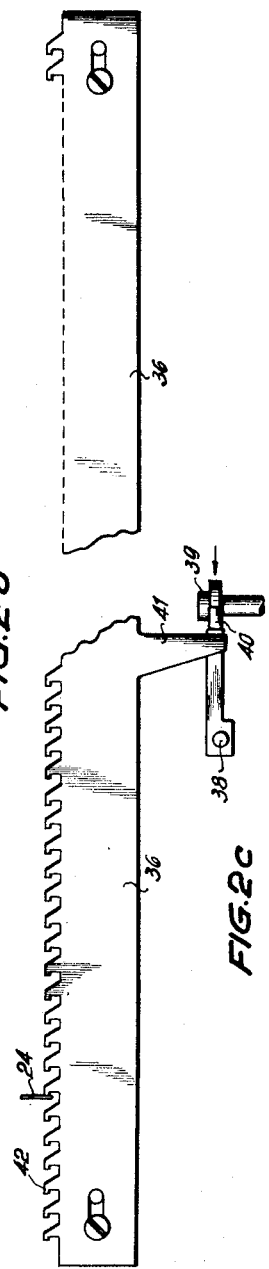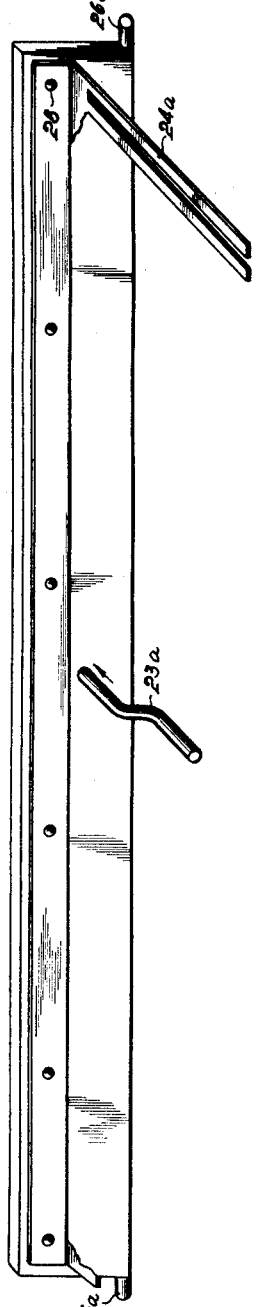

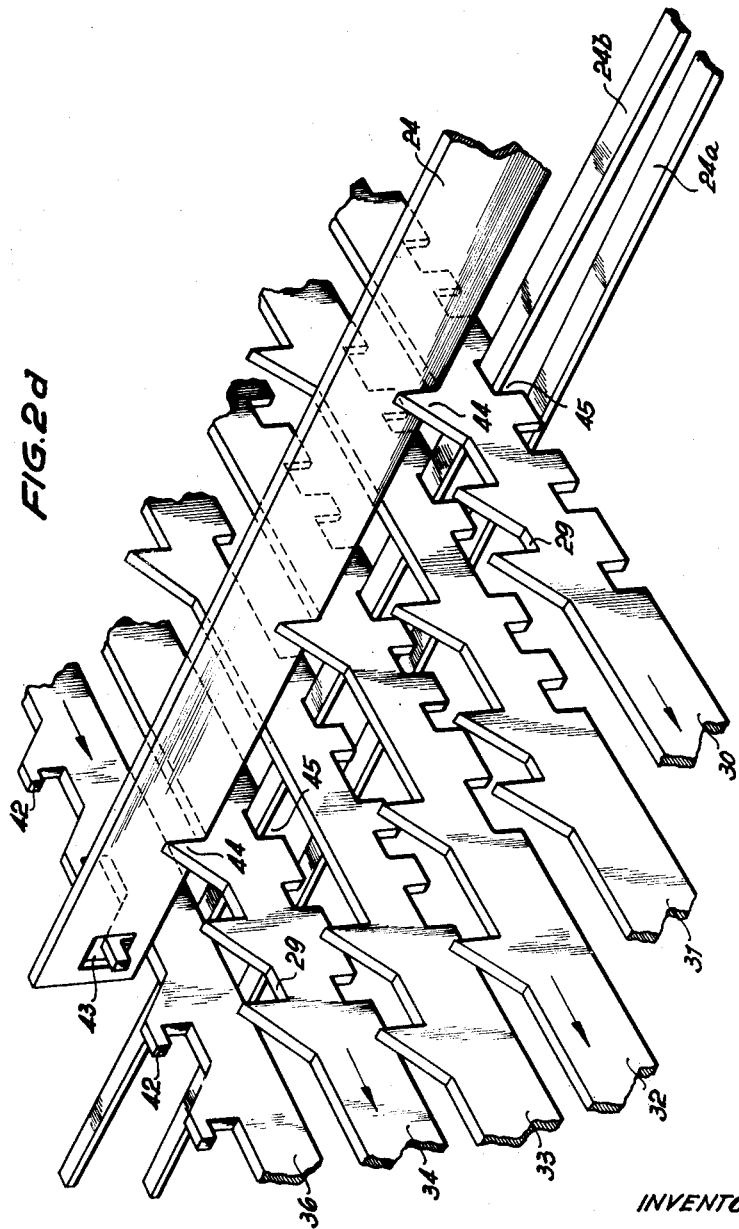

June 21, 1960
M. HEBEL
2,941,716
BOOKKEEPING AND CALCULATING MACHINE
Filed Oct. 13, 1953
26 Sheets-Sheet 9
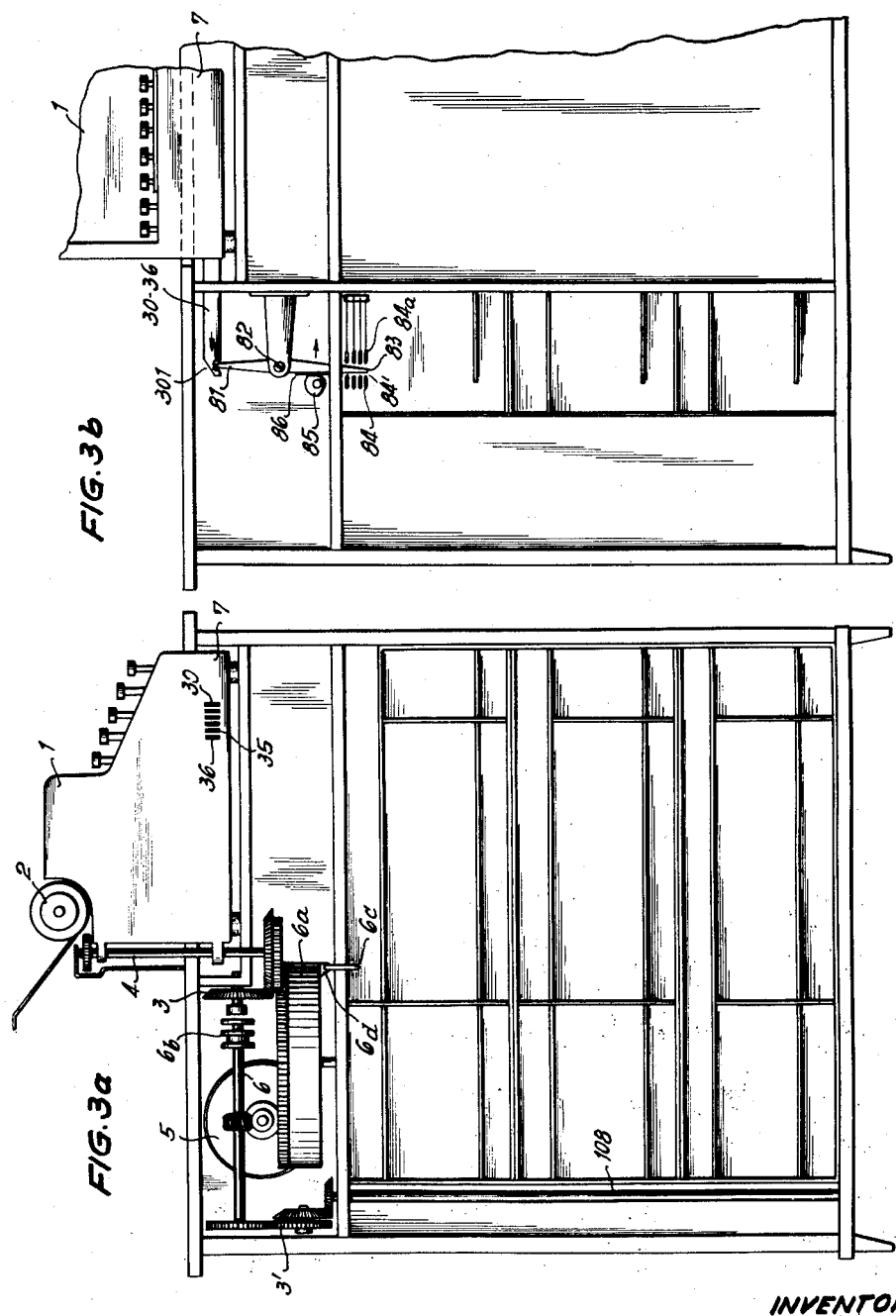
INVENTOR:
MARTIN HEBEL
BY June 21, 1960 M. HEBEL 2,941,716
BOOKKEEPING AND CALCULATING MACHINE
Filed Oct. 13, 1953 26 Sheets-Sheet 10
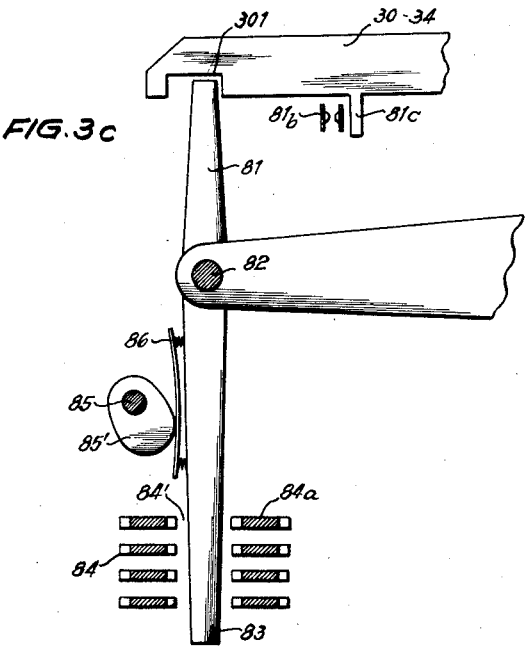
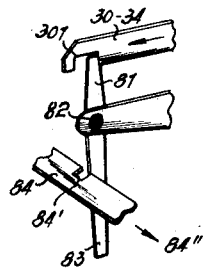
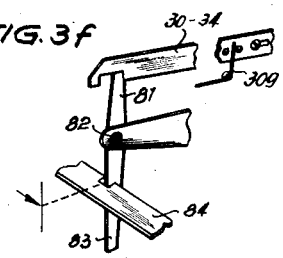
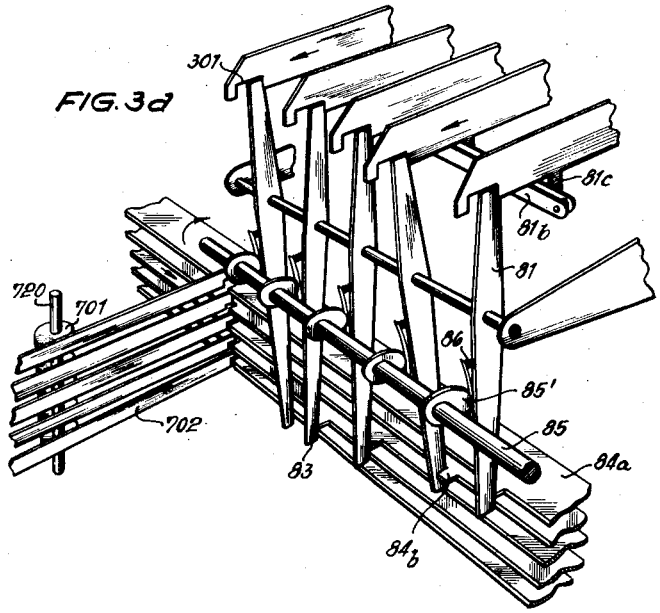
INVENTOR:
MARTIN HEBEL
BY:

June 21, 1960     M. HEBEL     2,941,716
BOOKKEEPING AND CALCULATING MACHINE
Filed Oct. 13, 1953     26 Sheets-Sheet 11
FIG. 4
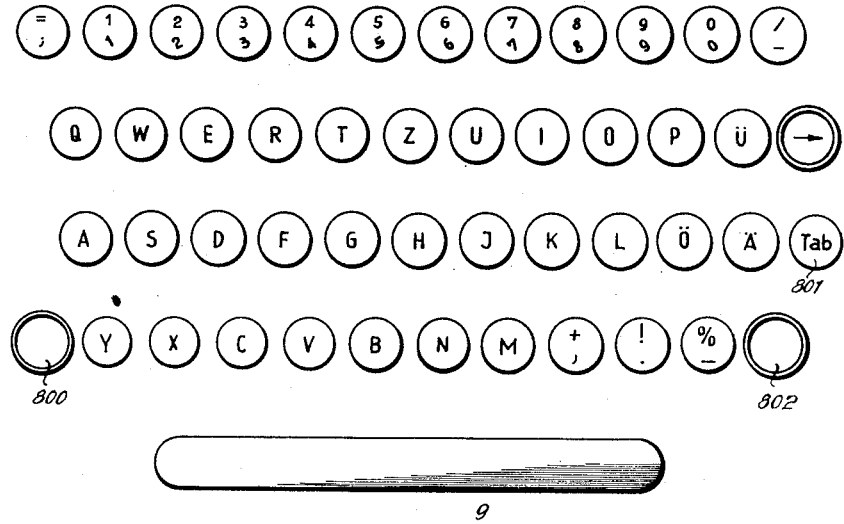
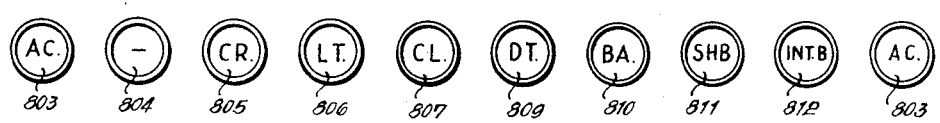
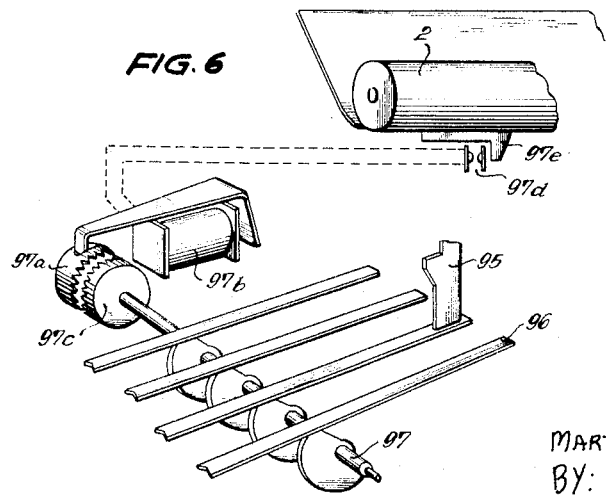
FIG. 6
INVENTOR:
MARTIN HEBEL
BY:

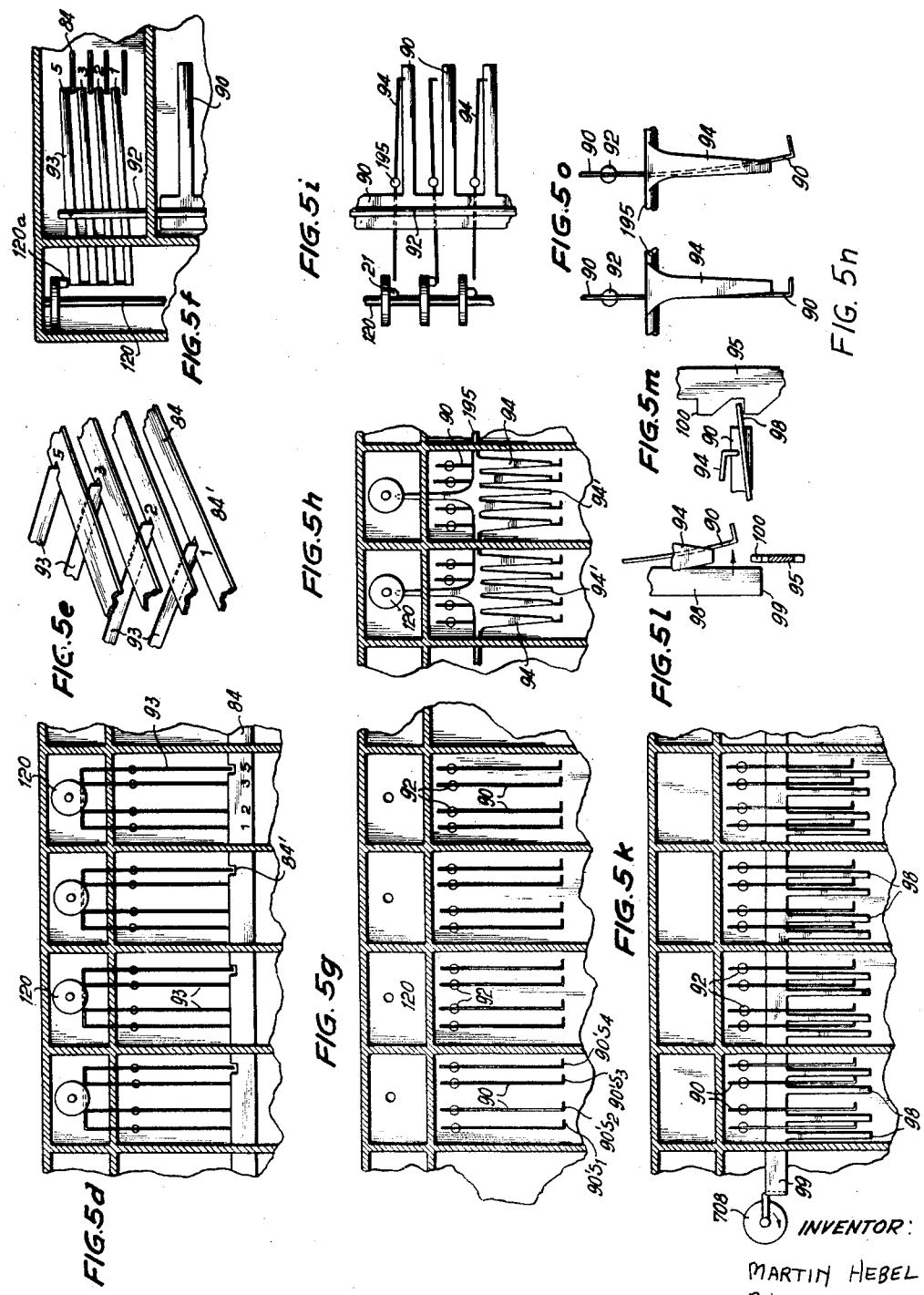

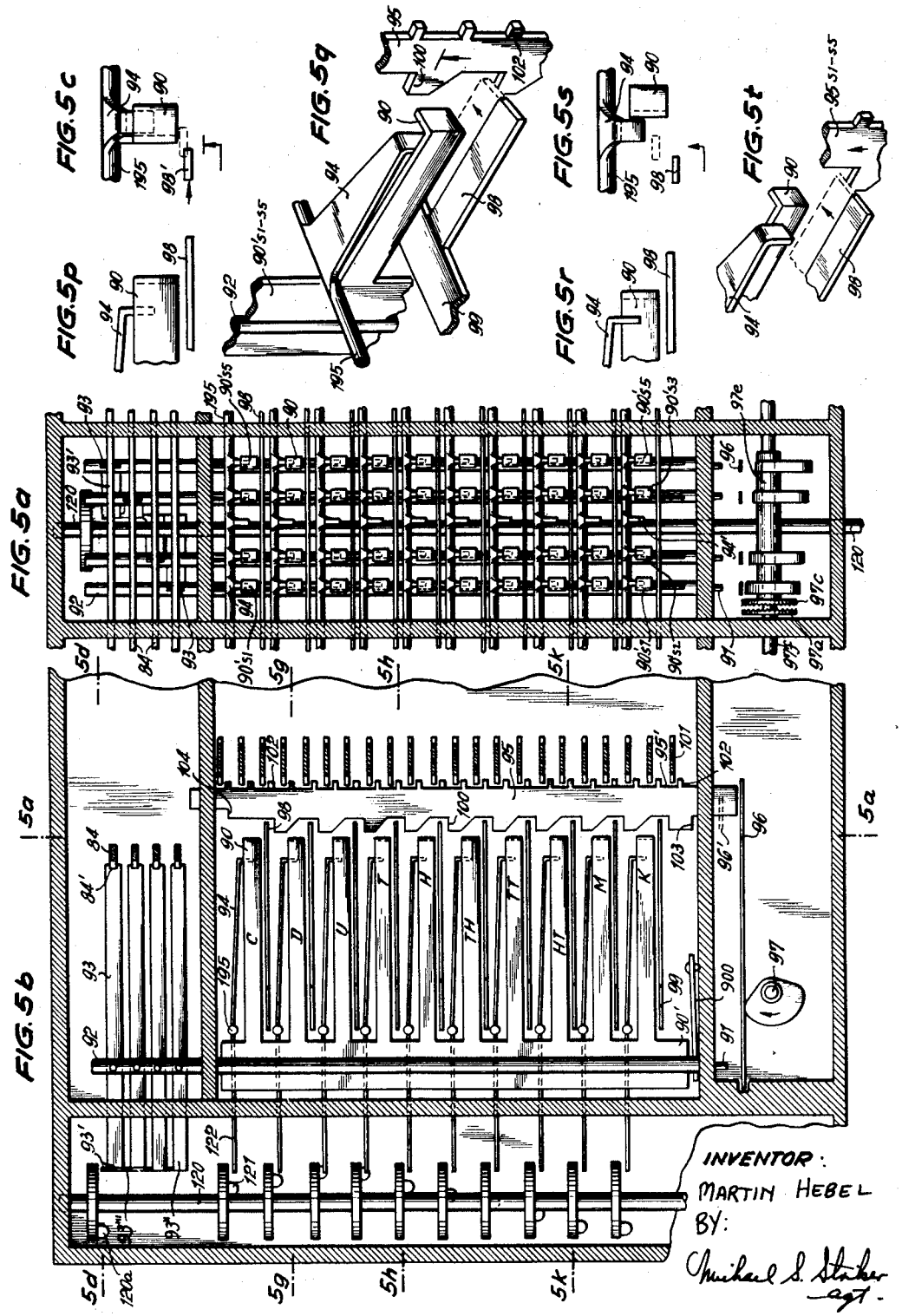

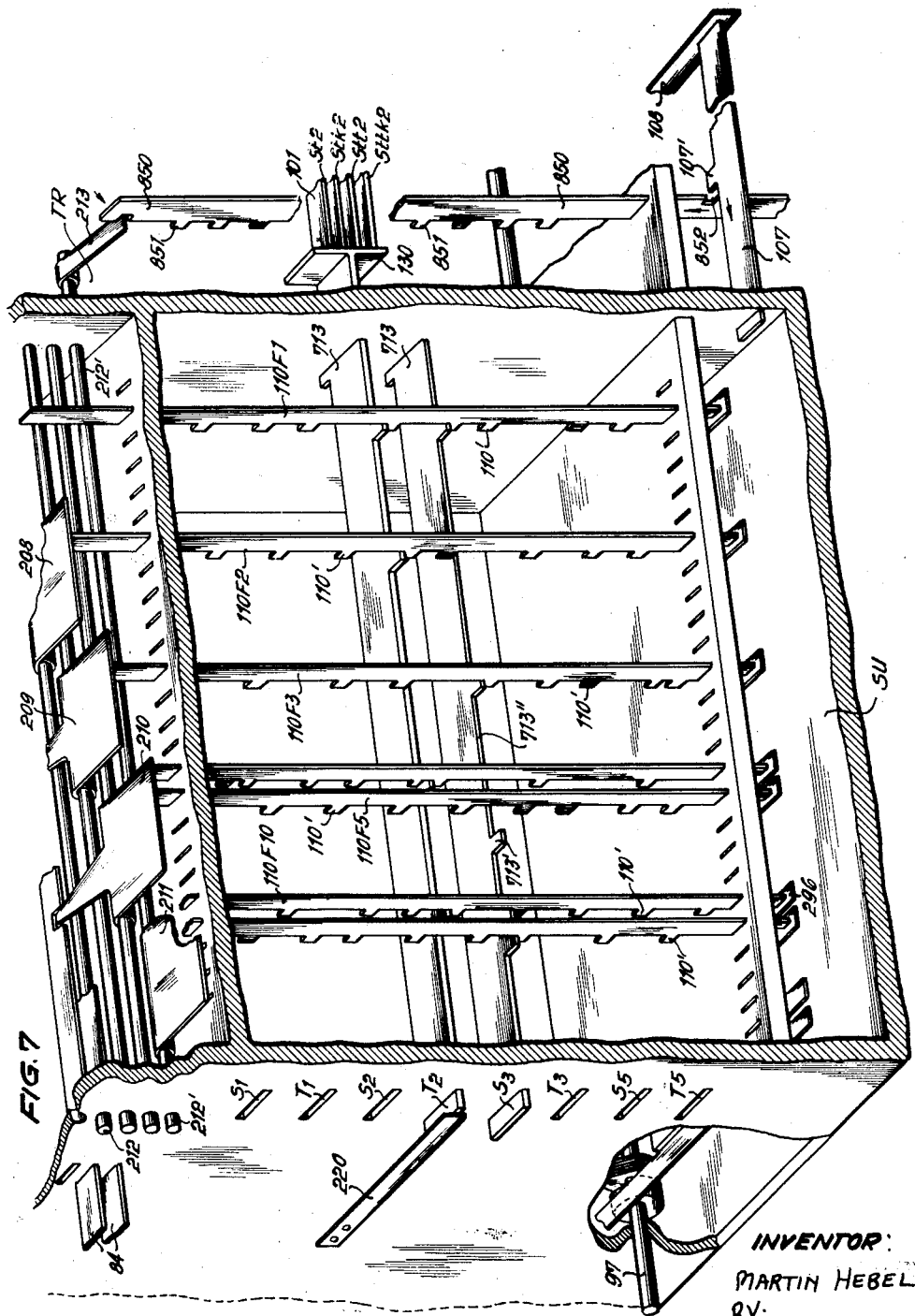

June 21, 1960  M. HEBEL  2,941,716
BOOKKEEPING AND CALCULATING MACHINE
Filed Oct. 13, 1953  26 Sheets-Sheet 15
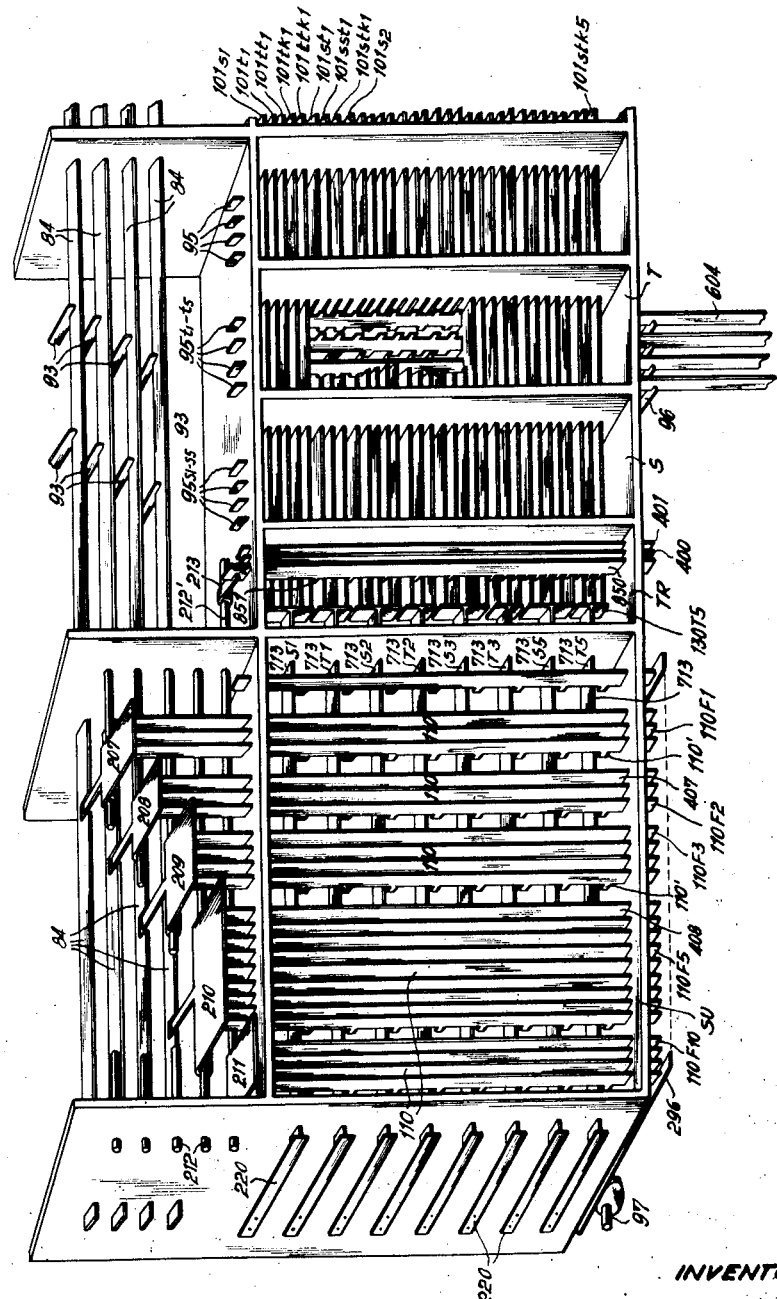
INVENTOR:
MARTIN HEBEL
BY:

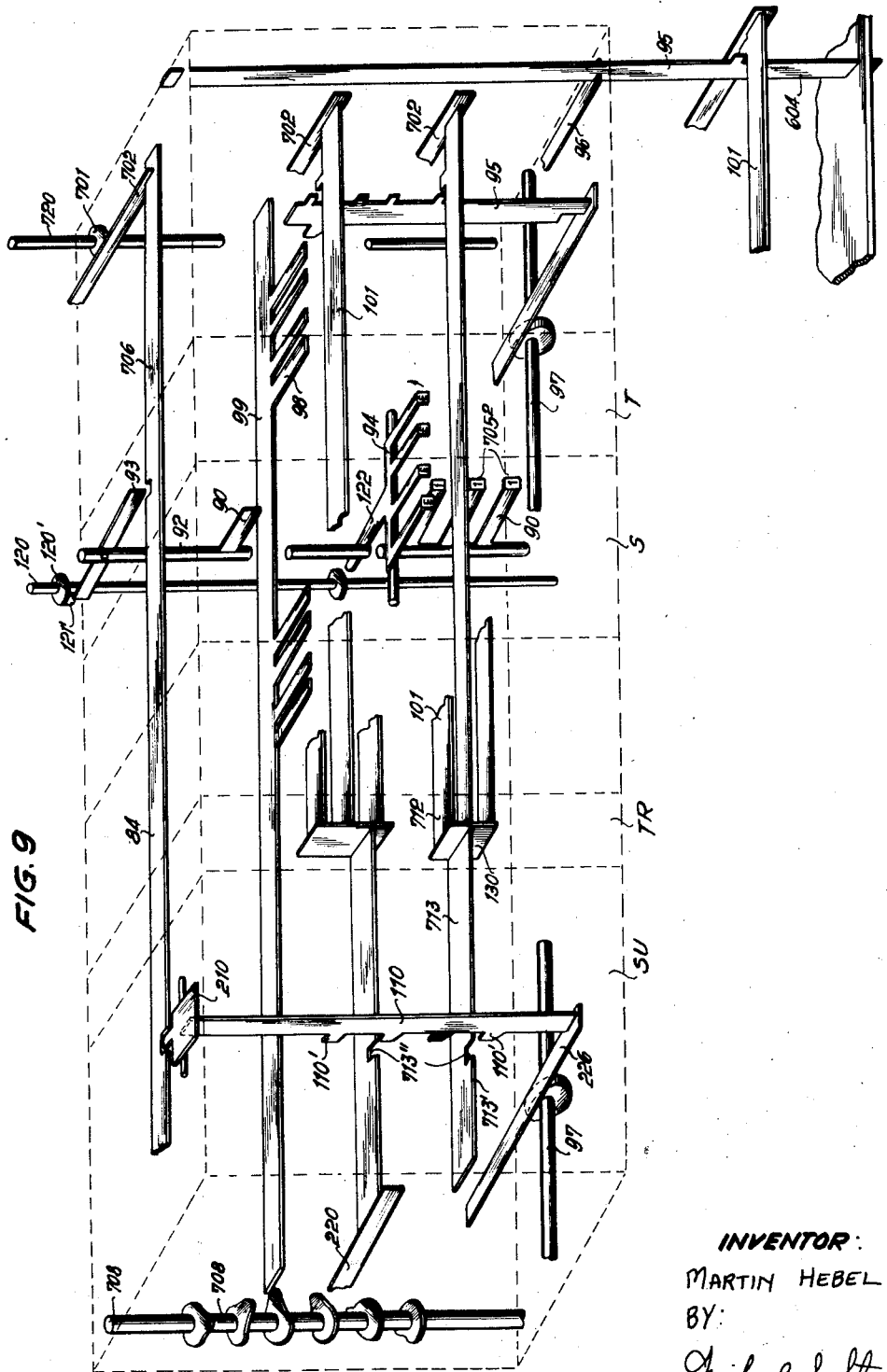

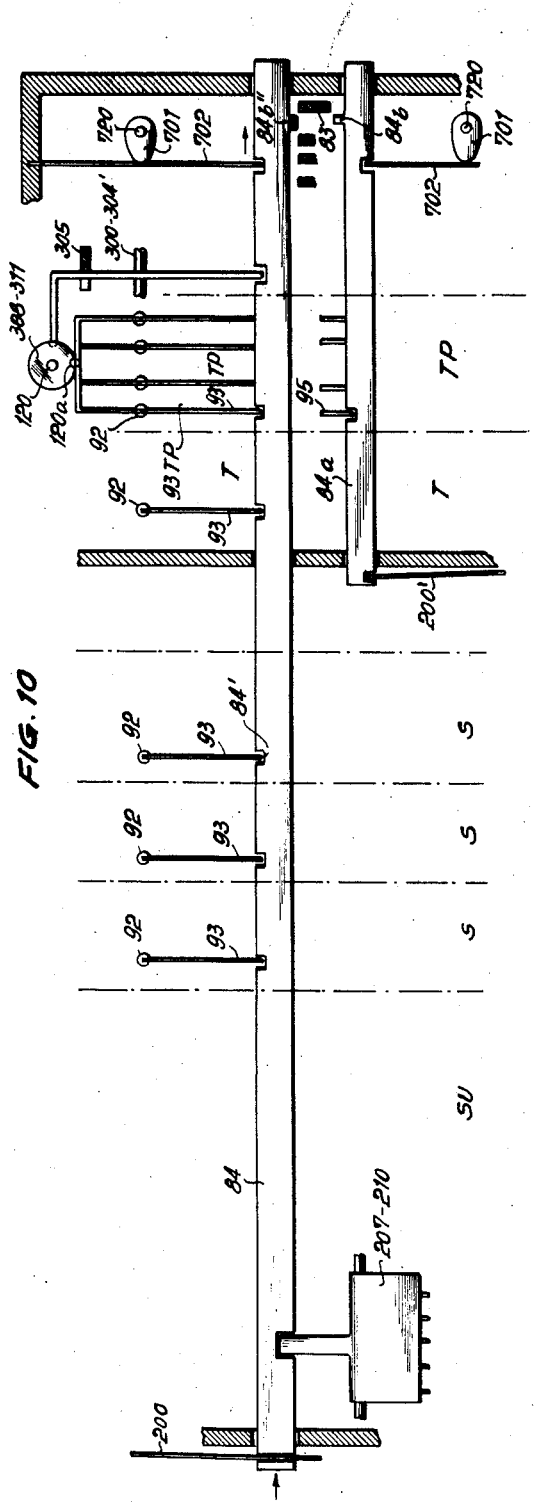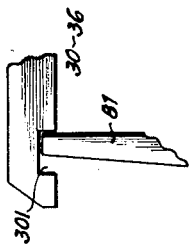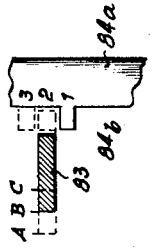

June 21, 1960
M. HEBEL
2,941,716
BOOKKEEPING AND CALCULATING MACHINE
Filed Oct. 13, 1953
26 Sheets-Sheet 18
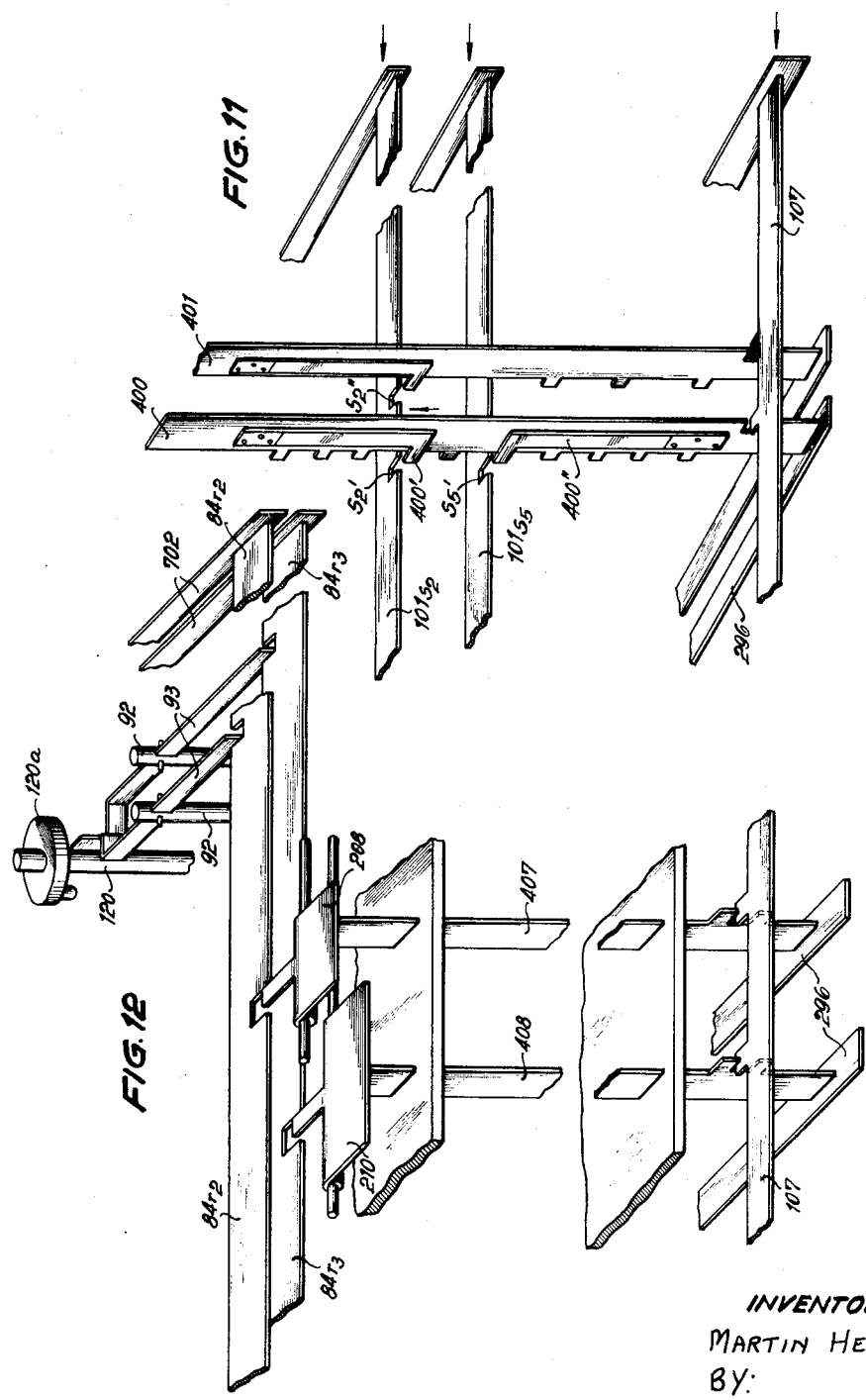
INVENTOR:
MARTIN HEBEL
BY:

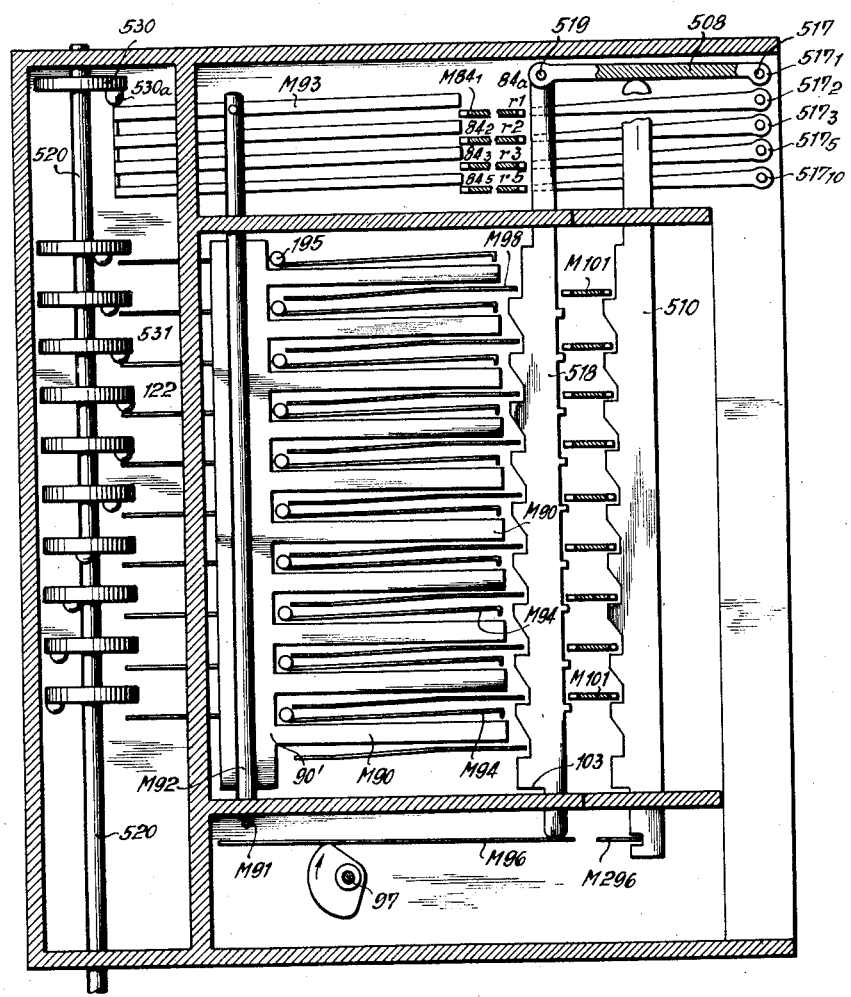

June 21, 1960 — M. HEBEL — 2,941,716
BOOKKEEPING AND CALCULATING MACHINE
Filed Oct. 13, 1953 — 26 Sheets-Sheet 21

FIG.14a — Numerical Example of a Multiplication

Factor F: 1 2 3 4 5 / tt' th' h' t' u'
Factor M: 6 7 8 9 / th h t u
Result = Product R = 8 3 8 1 0 2 0 5 / TM M HT TT TH H T U x = Tens Transfer for second following Operation is stored

| Operation | Storing device | Addition Tens | Addition Units | Tens-transfer | TM | M | HT | TT | TH | H | T | U | | F | M |
|---|---|---|---|---|---|---|---|---|---|---|---|---|---|---|---|
| 1 | | T | U | | | | | | | | 4 | 5 | 5 9 | u' | u |
| 2 | | H | T | + | | | | | | 3 | +6 | | 4 9 | t' | u |
| 3 | | H | T | | | | | | | 4 0 | 5 | | 5 8 | u' | t |
|   |   |   |   |   |   |   |   |   |   | 4 0 |   |   |   |   |   |
|   |   |   |   |   |   |   |   |   |   | 8 0 | 5 |   |   |   |   |
| 4 | | TH | H | + | | | | | 2 | +7 | | | 3 9 | h' | u |
| 5 | | TH | H | | | | | | 3 5 | 0 | 5 | | 4 8 | t' | t |
|   |   |   |   |   |   |   |   |   | 3 2 |   |   |   |   |   |   |
|   |   |   |   |   |   |   |   |   | 6 7 | 0 | 5 |   |   |   |   |
| 6 | | TH | H | + x | | | | | x 3 | +5 | | | 5 7 | u' | h' |
|   |   |   |   |   |   |   |   | 1 | 0 | 2 | 0 | 5 |   |   |   |
| 7 | | TT | TH | | | | | 1 | 8 | | | | 2 9 | th' | u |
| 8 | | TT | TH | + | | | | 2 8 | 2 | 0 | 5 | | 3 8 | h' | t |
|   |   |   |   |   |   |   |   | 2 +4 |   |   |   |   |   |   |   |
| 9 | | TT | TH | + | | | | 5 2 | 2 | 0 | 5 | | 4 7 | t' | h |
|   |   |   |   |   |   |   |   | 2 +8 |   |   |   |   |   |   |   |
| 10 | | TT | TH | x | | | | 8 0 | 2 | 0 | 5 | | 5 6 | u' | th |
|   |   |   |   |   |   |   | x | 3 0 |   |   |   |   |   |   |   |
|   |   |   |   |   |   |   | 1 | 1 0 | 2 | 0 | 5 |   |   |   |   |
| 11 | | HT | TT | + | | | | 0 +9 | | | | | 1 9 | tt' | u |
| 12 | | HT | TT | | | | | 2 0 | 0 | 2 | 0 | 5 | 2 8 | th' | t |
|   |   |   |   |   |   |   |   | 1 6 |   |   |   |   |   |   |   |
| 13 | | HT | TT | | | | | 3 6 | 0 | 2 | 0 | 5 | 3 7 | h' | h |
|   |   |   |   |   |   |   |   | 2 1 |   |   |   |   |   |   |   |
| 14 | | HT | TT | + | | | | 5 7 | 0 | 2 | 0 | 5 | 4 6 | t' | th |
|   |   |   |   |   |   |   |   | 2 +4 |   |   |   |   |   |   |   |
|   |   |   |   |   |   |   |   | 8 1 | 0 | 2 | 0 | 5 |   |   |   |
| 15 | | M | HT | + | | | 0 +8 | | | | | | 1 8 | tt' | t |
| 16 | | M | HT | + | | | 1 6 | 1 | 0 | 2 | 0 | 5 | 2 7 | th' | h |
|    |   |   |   |   |   |   | 1 +4 |   |   |   |   |   |   |   |   |
| 17 | | M | HT | | | | 3 0 | 1 | 0 | 2 | 0 | 5 | 3 6 | h' | th |
|    |   |   |   |   |   |   | 1 8 |   |   |   |   |   |   |   |   |
|    |   |   |   |   |   |   | 4 8 | 1 | 0 | 2 | 0 | 5 |   |   |   |
| 18 | | TM | M | + | | 0 +7 | | | | | | | 1 7 | tt' | h |
| 19 | | TM | M | | 1 | 1 8 | 1 | 0 | 2 | 0 | 5 | | | 2 6 | th' | th |
|    |   |   |   |   | 1 | 2 |   |   |   |   |   |   |   |   |   |
|    |   |   |   |   | 2 | 3 8 | 1 | 0 | 2 | 0 | 5 |   |   |   |   |
| 20 | | HM | TM | | 6 | | | | | | | | | 1 6 | tt' | th |
|    |   |   |   |   | 8 3 8 | 1 | 0 | 2 | 0 | 5 |   |   |   |   |   |

INVENTOR: MARTIN HEBEL
BY: Michael S. Striker

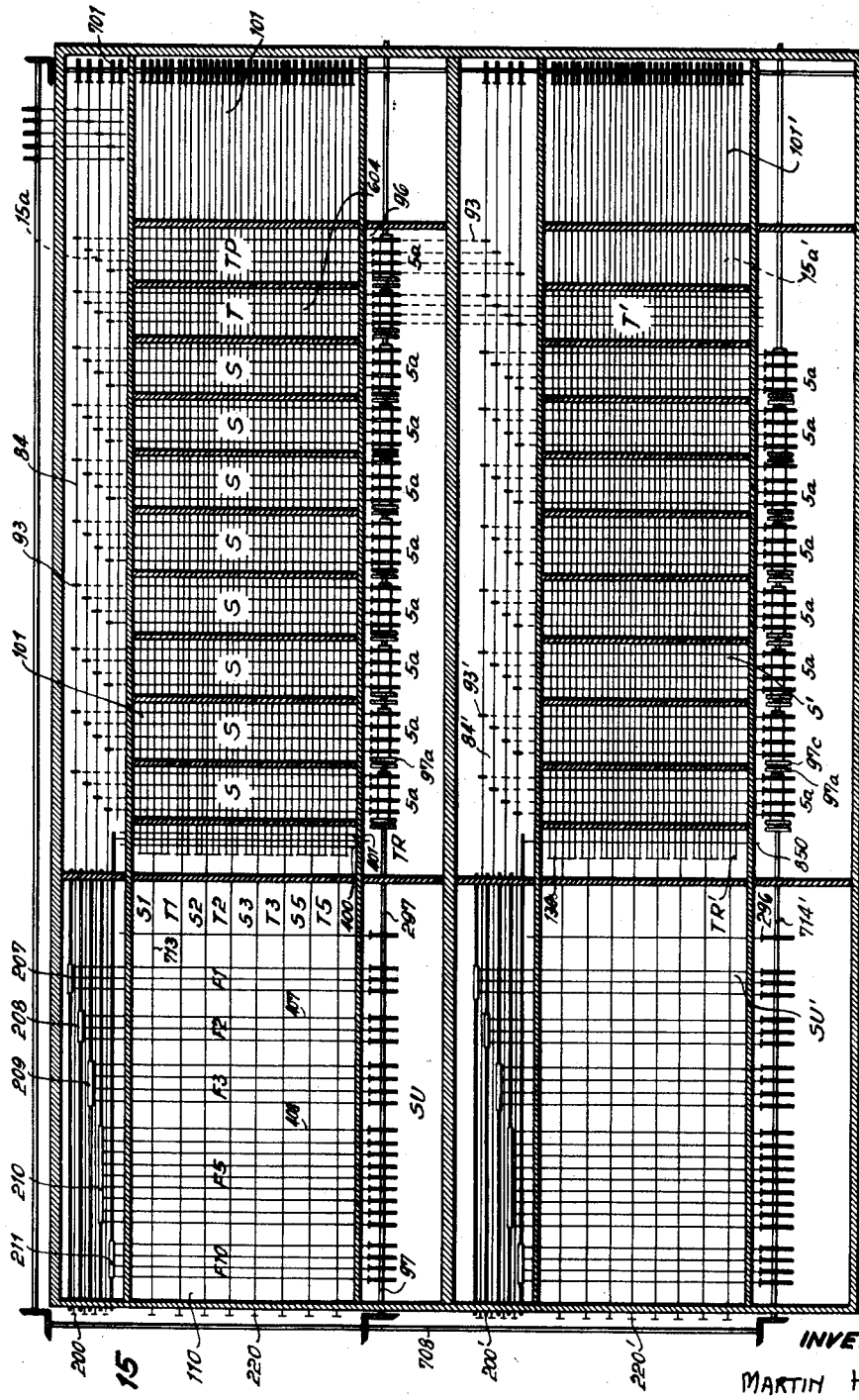

June 21, 1960  M. HEBEL  2,941,716
BOOKKEEPING AND CALCULATING MACHINE
Filed Oct. 13, 1953  26 Sheets-Sheet 23

INVENTOR
MARTIN. HEBEL
BY:

June 21, 1960     M. HEBEL     2,941,716

BOOKKEEPING AND CALCULATING MACHINE

Filed Oct. 13, 1953     26 Sheets—Sheet 24

FIG. 16

| number of the business transaction | outstanding balance | | date | | description of the business transaction | deductions | transaction | | resulting balance | |
|---|---|---|---|---|---|---|---|---|---|---|
| | Debit | Credit | Day | Month | | | Debit | Credit | Debit | Credit |
| 1 | 2 | 3 | 4 | 4 | 5 | 6 | 7 | 8 | 9 | 10 |
| 54321 | 123,50 | 500,00 | 12 | 6 | | 3,00 | 125,00 | | 245,50 | |
| 54322 | | | 12 | 6 | | | | 975,00 | | 1.475,00 |
| 54323 | 1.465,30 | | 12 | 6 | | 2,50 | 1.324,20 | 10,00 | 2.787,00 | |
| 54324 | | 200,50 | 12 | 6 | | | | | | 210,50 |
| | | | | | | | | | | |
| | | | | | | | | | | |
| sheed bal. | + 1.588,00 | − 700,50 | | | | 5,50 | + 1.449,20 | − 985,00 | + 3.032,50 | − 1.685,50 |
| storing device | 2 | 3 | 4 | M | 5 | 6 | 7 | 8 | 9 | |

INVENTOR:
MARTIN HEBEL
BY:

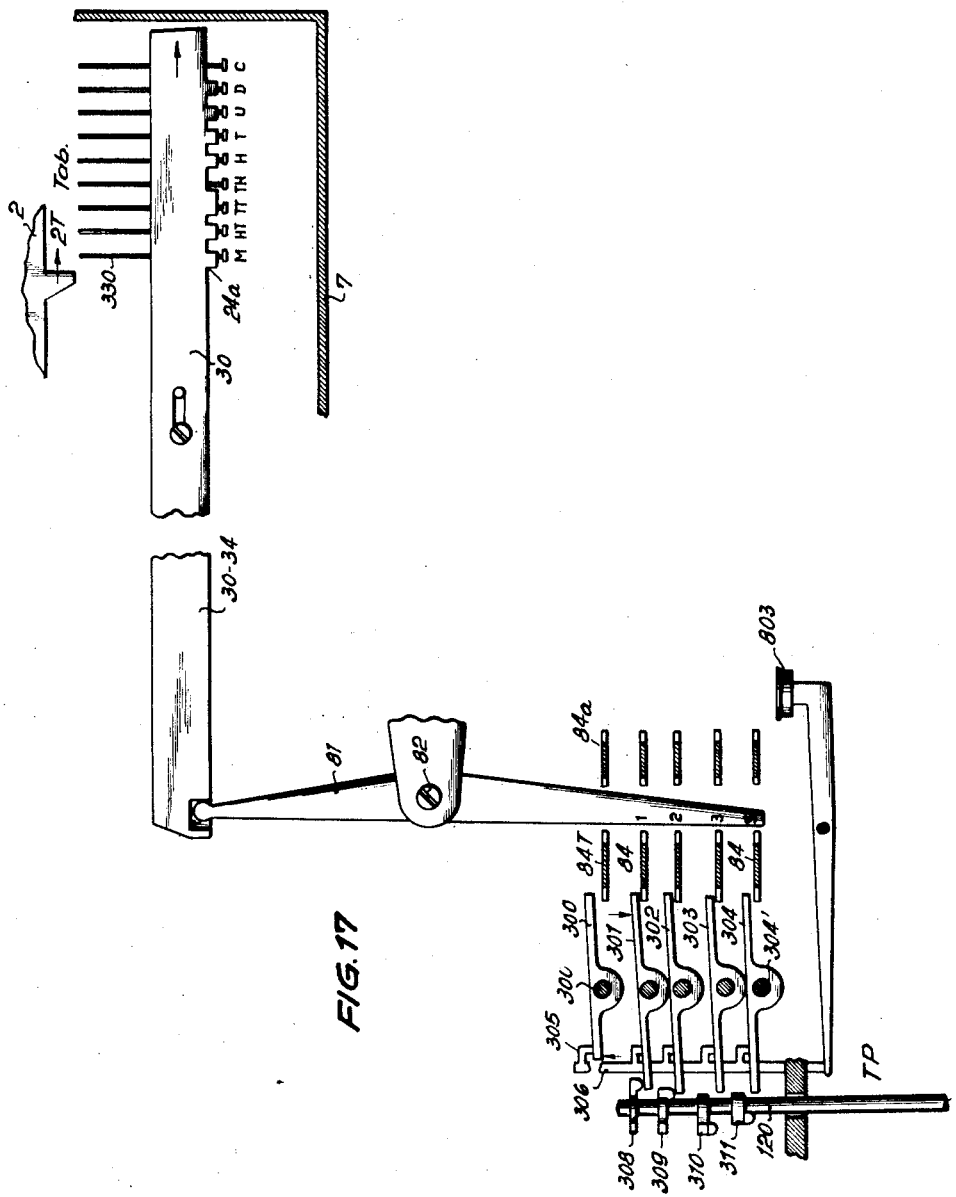

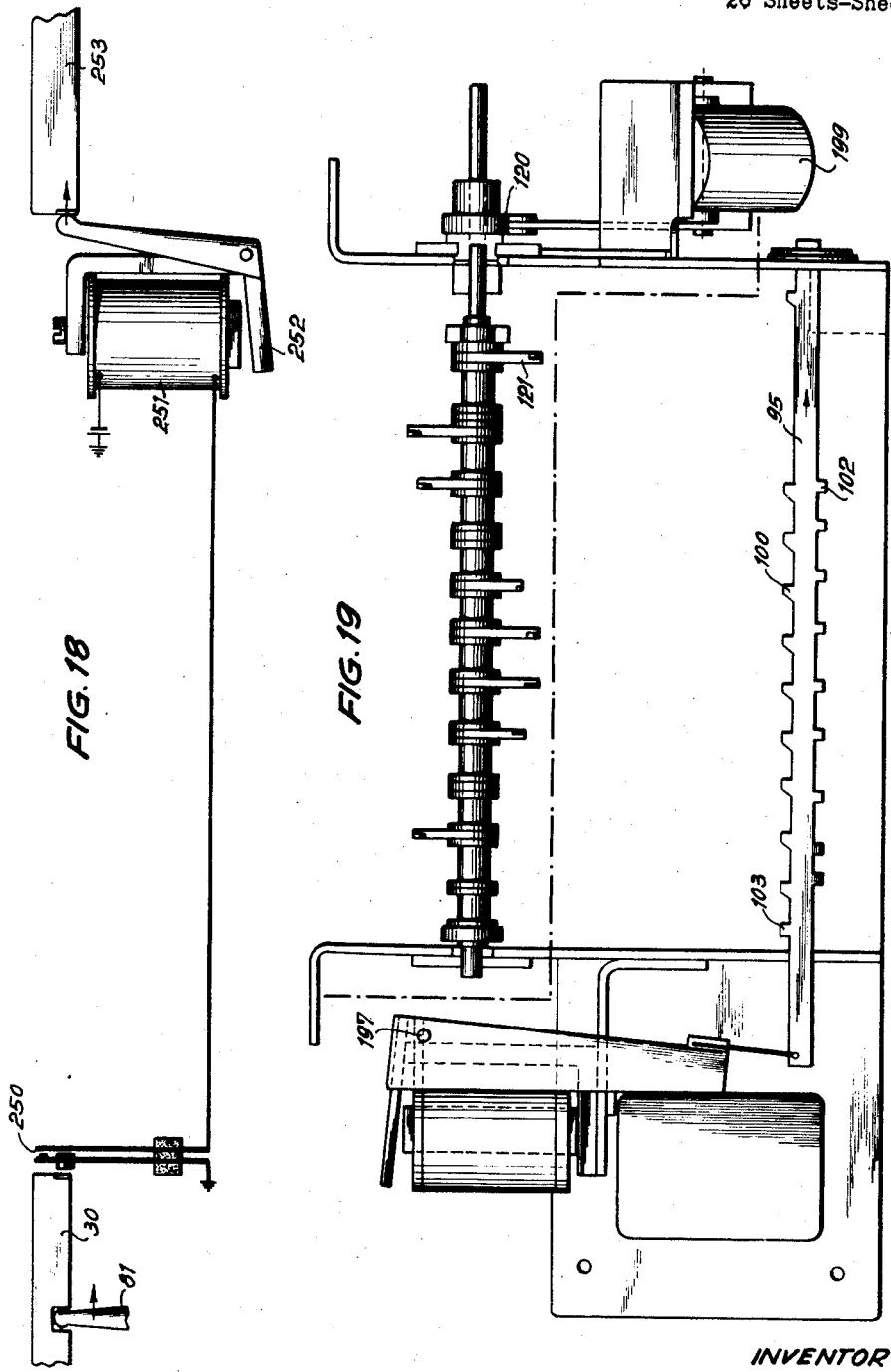

United States Patent Office 2,941,716
Patented June 21, 1960

2,941,716

BOOKKEEPING AND CALCULATING MACHINE

Martin Hebel, Hechendorf am Pilsensee, Upper Bavaria, Germany, assignor to Max Grundig, Eurth, Bavaria, Germany Filed Oct. 13, 1953, Ser. No. 385,853
In Germany Jan. 28, 1950

Public Law 619, Aug. 23, 1954
Patent expires Jan. 28, 1970

22 Claims. (Cl. 235—60)

The present invention relates to computing and bookkeeping machines, and more particularly to a bookkeeping machine which is partly mechanically and partly electrically operated.

It is known to provide typewriters with mechanical counting devices which are actuated when a key of the typewriter is operated and permit carrying out of simple computing operations, such as adding and subtracting. By combining such computing devices with pick-up devices automatic printing is achieved, which is frequently carried out through electrical transfer devices.

Mechanical and electrical devices have different and distinct advantages and disadvantages. Electrical devices are preferable when mechanical devices result in a very complicated apparatus due to constructive reasons. On the other hand reliable operation of electrical transfer devices can only be expected, if such devices are completely separated from the mechanical parts so that the contacts can be kept clean and the operating conditions required for electrical appliances are assured.

It is most important for electrically operated computing devices that stored results are not cancelled in the event that the current fails, and therefore, it is advisable to carry out transfer operations only by electrical means, but to provide mechanical devices for computing and storing of values.

It is the object of the present invention to provide a computing and bookkeeping machine in which the mechanically operating devices and the electrically operated devices are separated.

It is another object of the present invention to provide a bookkeeping machine in which the required motions are effected by elements having a minimum of mass and moving for very small distances.

It is a further object of the present invention to provide a bookkeeping machine in which characters and digits are expressed by the relative position of a plurality of bars each of which is shiftable for a predetermined basic distance, which according to a preferred embodiment is two mm.

It is a still further object of the present invention to employ the movement of elements shifted for such basic distance for the actuation of electrical contacts, which operate electric magnets so that the same again shift movable elements for the basic distance.

It is an additional object of the present invention to transform rectilinear shifting of movable elements into turning of cam shafts which actuate computing devices.

It is yet another object of the present invention to employ mechanically and electrically actuated elements, which are movable for a basic distance in such manner as to obtain a separation of electrical and mechanical devices preventing soiling of electrical devices by oil and dust.

It is an important object of the invention to provide a bookkeeping machine permitting typing of numbers and descriptive text on a ledger sheet, while in attached computing devices the numbers entered on the ledger sheets are added, subtracted and multiplied, as required, line by line and column by column.

With these objects in view the present invention mainly consists in a typewriter mechanism combined with a computing device. For each ledger column a storing device is provided in which the numbers entered in the respective column are stored and added in a column computing device. Simultaneously the numbers are stored in a storing device of a line computing device which adds and subtracts, respectively, credit and debit balances appearing in the same line of the ledger sheet.

For each column at least one storing device is provided, each storing device permitting storing of a number comprising so many decimal orders as required for the particular column.

The printing is not done simultaneously with the typing, if computing is required, but the typed value is entered in the storing device corresponding to the position of the carriage. Such typed and stored value is then printed in the respective column after transport of the carriage for the corresponding steps.

Each character or digit corresponding to a typewriter key is expressed by the relative position of a plurality of combination bars, each of which is longitudinally shiftable for the same basic distance, preferably 2 mm. The relative position of the combination bars is transferred into the corresponding storing device where it is stored by resilient elements. The number of resilient elements in the storing device corresponds to the number of combination bars required for expressing a digit. The resilient elements are bent, and held in such bent position to express the combination representing the respective digit. In the event that a number comprising a plurality of decimal orders is stored, one digit after the other is stored in the respective storing device by resilient elements arranged in a vertical column.

The digit stored in such manner in a storing device is added in a summing device to a previously stored digit contained in another storing device from where it is again transferred to the combination bars which in the relative position corresponding to the obtained result determine the result digit printed by the printing device of the typewriter. A similar arrangement is provided for multiplying operations. The essence of the present invention is the provision of sets of combination elements in a computing and bookkeeping machine, each combination element being movable for a predetermined distance independently of the other combination elements between a normal position and a shifted position, the location and number of combination elements in shifted positions defining a plurality of combination positions of said set of combination elements, said combination elements representing in each of said combination positions a single character.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1a is a horizontal section on line 1a—1a' in Fig. 1;

Fig. 1b is a section on line 1b—1b' in Fig. 1;

Fig. 1c is an isometric view of the operating arrangement of the combination bars;

Fig. 1d is an isometric view of the actuating arrangement;

Fig. 1e is an isometric view of a detail of the operating arrangement;

Fig. 1f is a front elevation of a detail of the operating arrangement;

Fig. 1g is an isometric view of an electrically operated actuating arrangement;

Fig. 2a is a front elevation of a combination bar;

Fig. 2b is a front elevation of the actuating bar;

Fig. 2c is an isometric view of a detail;

Fig. 2d is an isometric view illustrating the actuation of the combination bars;

Fig. 2e is a front view partly in section illustrating the locking of the keys by the shifted actuating bar;

Fig. 2f is an isometric view corresponding to Fig. 2e;

Fig. 3a is a schematic side view of the bookkeeping machine;

Fig. 3b is a fragmentary front view of the bookkeeping machine;

Fig. 3c is a front view, partly in section, of a detail showing a transfer lever for transferring a combination from the combination bars to the input bars;

Fig. 3d is an isometric view showing transfer of a combination from the result bars back to the combination bars;

Figs. 3e and 3f are isometric views illustrating the blocking of the input bars by the transfer levers according to a preferred embodiment of the invention;

Fig. 4 is a schematic plan view illustrating the arrangement of the actuating keys of the bookkeeping machine and of the typewriter;

Fig. 5a is a sectional view through a storing device on line 5a—5a' in Fig. 5b;

Fig. 5b is a sectional view through a storing device;

Fig. 5c is a front view illustrating a detail of the storing device;

Fig. 5d is a horizontal sectional view through several storing devices on line 5d—5d' in Fig. 5b;

Fig. 5e is an isometric view of a detail of the storing device;

Fig. 5f is a sectional view of a detail of the storing device;

Fig. 5g is a horizontal sectional view through several storing devices on line 5g—5g' in Fig. 5b;

Fig. 5h is a horizontal sectional view through several storing devices on line 5h—5h' in Fig. 5b;

Fig. 5i is a side view of a detail in the storing device;

Fig. 5k is a horizontal sectional view through several storing devices on line 5k—5k' in Fig. 5b;

Fig. 5l is a plan view of a detail in the storing device;

Fig. 5m is a side view of a detail in a storing device;

Figs. 5n and 5o are plan views of a detail in the storing device illustrating the storing of a digit element;

Fig. 5p is a side view of a detail of the storing device;

Fig. 5q is an isometric view of a detail of the storing device showing a pick-up bar;

Fig. 5r is a side view of a detail of the storing device;

Fig. 5s is a front view of the detail of the storing device;

Fig. 5t is an isometric view corresponding to Fig. 5q;

Fig. 6 is an isometric view showing the actuation of a clutch by the typewriter carriage;

Fig. 7 is an isometric view showing a summing device and a portion of a transfer device;

Fig. 8 is an isometric view showing several storing devices, a transfer device, and a summing device required for carrying out a computing operation;

Fig. 9 is a schematic isometric view illustrating the leative position of the actuating cam shafts and the elements actuated by the same;

Fig. 10 is a schematic plan view illustrating the input and the output bars;

Fig. 10a is a fragmentary plan view showing a detail of Fig. 10;

Fig. 10b is a fragmentary front view showing the connection between the combination bars and the transfer levers according to a modified embodiment;

Fig. 11 is an isometric view of a detail of a transfer device;

Fig. 12 is an isometric view of a detail of the transfer device;

Fig. 14 is a sectional view of a storing device employed in a multiplication device;

Fig. 14a is a table showing the steps required for carrying out a multiplication by addition of part products;

Fig. 15 is a schematic sectional view of the bookkeeping machine;

Fig. 16 illustrates a ledger sheet as printed by the bookkeeping machine according to the present invention;

Fig. 17 is a fragmentary front view illustrating the tabulating arrangement;

Fig. 18 is a fragmentary side view of a modified embodiment of the present invention employing electric magnets for the actuation of the cam shafts and the pick-up bars.

*Actuating and typing means*

Figure 1:
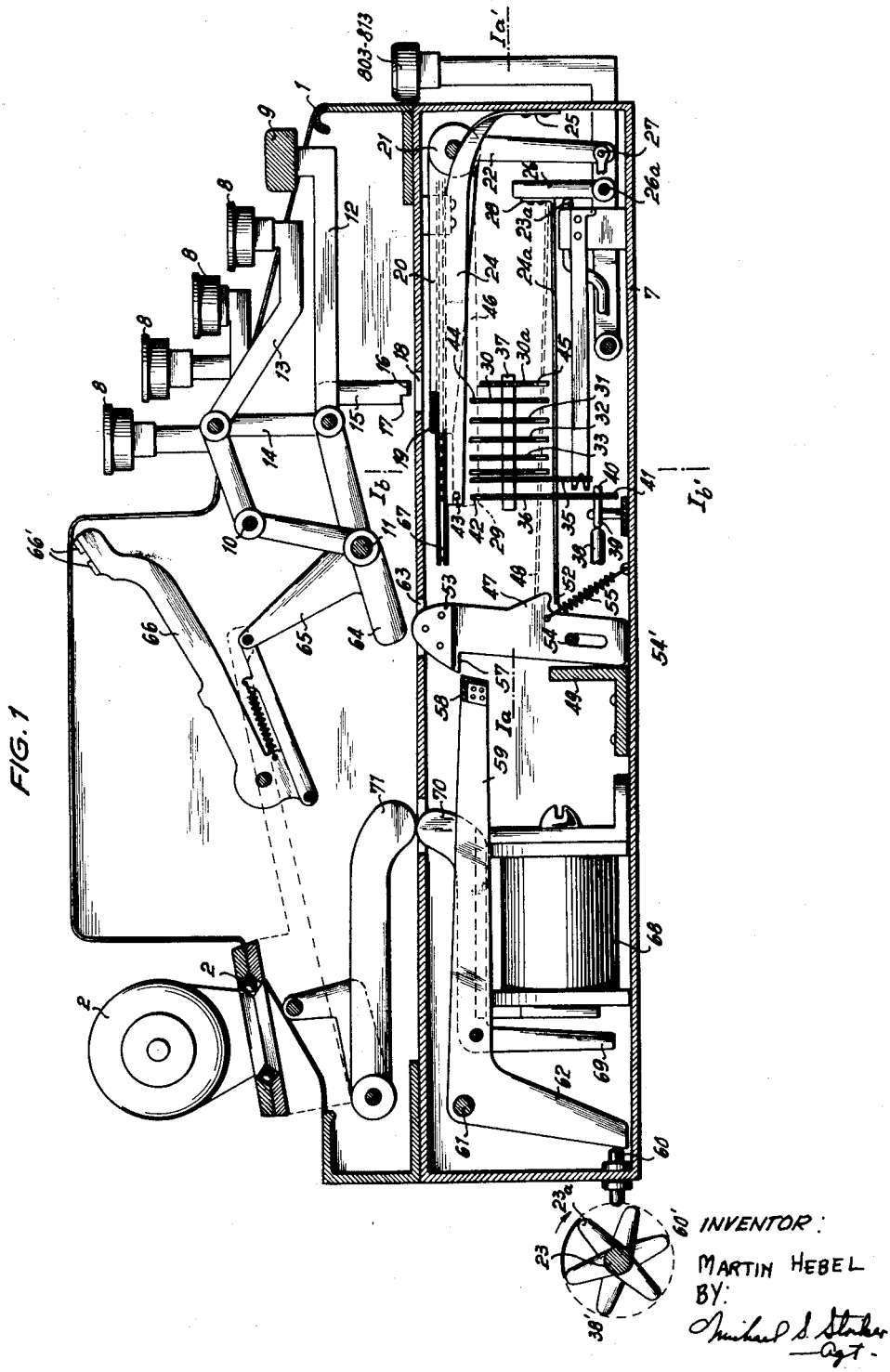
Fig. 1 is a cross section through the typewriter and the actuating device.

Referring now to the drawings and more particularly to Fig. 1, the frame 1 of the machine supports a keyboard comprising keys 8 and a space bar 9, Fig. 4. A lever system 12, 13, 14, 65 connected by pivot pins 10, 11, acts on the levers 66 carrying the types 66'. A carriage 2 is supported at the rear of the frame 1. The upper part of the machine is constructed similar to an electric typewriter, and as can be seen from Fig. 3a, the carriage 2 is driven by a motor 5, through a shaft 6, bevel gear means 3, and a vertical shaft 4.

Below the typewriter mechanism a housing 7 is provided which may be mounted within a desk so that the typewriter may be arranged at the usual height. Further below the computing and storing devices of the bookkeeping machine are arranged, as shown in Figs. 3a and 3b.

Whenever a key 8 is depressed a vertical rod 15, which can be best seen from Fig. 1d, is downwardly moved and engages with the edge of a cutout 17, the bar 19 which forms part of a starting member 20. Frame 20 is pivotally mounted in the housing by means of shaft 21 and is provided with a lever arm 22 which is connected by means of a rod 27 to a coupling member 23' of a clutch 23', 23". The coupling member 23" is fixed on the continuously rotating drive shaft 23c. A spring 23'" urges the coupling member 23', which is mounted on the cam shaft 23 non-rotatable but axially slidable, into engagement with the coupling member 23". The springs 19', which are secured at one end to the frame 20 and at the other end to the housing, hold the frame 20 in an inoperative upper position as long as the clutch 23', 23" is disengaged. When, however, a key 8 is depressed, the rod 15 pivots frame 20 so that the rod 27 pivots the catch 27' which is retracted from the notch 27" and releases the coupling member 23' so that the cam shaft 23 is coupled with the drive shaft 23c.

At the same time the projection 16 on the rod 15 engages a leaf spring 24, Figs. 1, 2e, 2f. A leaf spring 24 is provided for each key, Fig. 1a, and all leaf springs 24 are part of a comb-like structure which is stamped out of a sheet of resilient material and then bent a quarter turn to the shape which can be best seen from Fig. 1c. The portion 25 of the comb-like structure is secured to the housing 7 as can be best seen from Fig. 1. The leaf springs 24 are slightly tensioned and tend to move upwardly and to the right in Fig. 1c into engagement with the teeth of a comb-shaped fixed stop 24b, so that they are movable to the left but not to the right. This device is further illustrated in Figs. 1e and 1f. The resiliency of the comb-like structure formed by the leaf springs 24 and the portion 25 is such that the leaf spring 24 may be downwardly and laterally moved.

Underneath and transverse to the leaf springs 24 a set of bars 30 to 36 are longitudinally movably mounted in the housing 7. Bars 30 to 34 will be hereafter referred to as combination bars and, as illustrated in Fig. 2a, each combination bar is provided on its top edge with projections 44 and on its bottom edge with recesses 45.

Representation of characters and digits

In Fig. 1, five combination bars are illustrated but a smaller or greater number of combination elements may be provided.

Each combination bar 30 to 34 is longitudinally movable, and it is urged by a spring 309, Fig. 2a, to move in one direction. Stops 37 passing through elongated holes 37' in the combination bars limit such movement. All combination 30–34 bars are movable for the same predetermined distance which, in a preferred embodiment, is 2 to 3 millimeters.

The relative position of the combination bars represents characters. The five combination bars 30–34 can be arranged in twenty-five to thirty-two combinations. If more than 32 combinations are required, a sixth combination bar is added. A character may be for instance expressed by the combination + − + − +, as shown in Fig. 2d, which means that the combination bars 30, 32 and 34 are shifted the same predetermined distance against the action of the spring 309 into an operative position while the combination bars 31 and 33 remain in inoperative position.

For computing purposes four combination bars 30 to 33 are used, since four elements are sufficient to express the digits from 0 to 9. Preferably each digit is broken up into the digit elements 1, 2, 3 and 5, and each of the combination bars 30 to 35 may represent one of these four figures. Shifting of only the bar 30 expresses the digit 1, shifting of only the bar 31 expresses the digit 2, shifting of the bar 32 expresses the digit 3, and shifting of only the bar 33 expresses the digit 5. The remainder of the digits is expressed by a combined movement of two or three combination bars according to the following table:

| | |
|---|---|
| 1=1 | Combination bar 30 is shifted. |
| 2=2 | Combination bar 31 is shifted. |
| 3=3 | Combination bar 32 is shifted. |
| 4=3+1 | Combination bars 32 and 30 are shifted. |
| 5=5 | Combination bar 33 is shifted. |
| 6=5+1 | Combination bars 33 and 30 are shifted. |
| 7=5+2 | Combination bars 33 and 31 are shifted. |
| 8=5+3 | Combination bars 33 and 32 are shifted. |
| 9=5+3+1 | Combination bars 33, 32 and 30 are shifted. |

Obviously any other combination is possible but the arrangement according to the above table is particularly easy to remember. To express the digit 0 a special zero bar 30a may be provided, or all combination bars may remain in inoperative position. All five combination bars 30–34 are used for expressing letters and characters. Two positions of four combination bars are sufficient to express $2^4=16$ characters and are used for digits and bookkeeping symbols.

Parallel to the combination bars a longitudinally movable actuating bar 36 is arranged which can be best seen in Figs. 1c and 2b. The actuating bar 36 is provided at its top edge with hooked teeth and on its bottom edge with a projection 41 which is engaged by the arm 40' of a lever 40 which is pivoted by means of a pivot pin 39 on the supporting housing, Fig. 1d. The lever 40 is engaged by a rod 38 which is actuated by a cam 38' carried by the cam shaft 23.

Underneath the combination bars 30 to 34 and the actuating bar 36, a set of pick-up springs 24a is provided which are secured to a member 26 which is pivotally mounted in the housing 7 by means of shaft 26a, Figs. 1 and 2c. Member 26 is engaged by a rod 23a, which is actuated by a cam 23a' fixed on the cam shaft 23. Therefore member 26 is pivoted during each revolution of the cam shaft 23 against the action of a spring, not shown, to an upper position, so that all pick-up springs 24a will tend to assume the position 48 shown in broken lines in Fig. 1. Such movement, however, will be prevented by the combination bars 30 to 34. When, however, some of the combination bars 30 to 34 are shifted to their operative position, so that their combination expresses a character, or digit, certain recesses at the bottom edges of the respective combination bars will be aligned and permit a single pick-up spring 24a to enter such recesses and to assume the position 24b shown in Fig. 2d.

Operation

When a key corresponding to a character or digit is depressed, the operating means of the device are actuated. The projection 16 on the rod 15 engages the corresponding leaf spring 24 and moves the same downwardly to a lower position in which the same is located in a recess between two adjacent teeth 42 of the actuating bar 36, and laterally adjacent to the projections 44 on those of the combination bars 30 to 34 whose combination represents the respective character or digit, Fig. 2d. Simultaneously the rod pivots the frame 20 and effects connection of the cam shaft 23 with the drive shaft 23c by the clutch 23', 23'', Fig. 1d. The rotating cam 38' actuates the rod 38 so that the lever 40 is pivoted and effects a shifting of the actuating bar 36 for a predetermined distance into an operative shifted position. During such movement of the actuating bar 36 one hooked tooth 42 passes through the hole 43 in the depressed leaf spring 24 holding the same in depressed position even if the key 8 is released, Fig. 2d. During the movement of the actuating bar 36 to its operative position, the engaged leaf spring 24 is resiliently bent and takes along those of the combination bars 30 to 34 which correspond in their combination to the respective key and have correspondingly arranged projections 44. Due to the fact that the combination bars 30—34 are spaced from each other distances which are substantially smaller than the distance from the combination bars to the bending points of the leaf springs 24, all combination bars move substantially the same distance, particularly since the combination bars travel only 2 mm. to operative position. In Fig. 2d the combination bars 30, 32 and 34 move with the actuating bar to an operative position, while combination bars 31, 33 remain in the inoperative position of rest since the projections 44 thereon adjacent the operative leaf spring 24 are spaced from the latter.

During further rotation of the cam shaft 23 the cam 23a' engages the rod 23a and pivots the member 26 so that all pick-up springs 24a tend to move upwardly to a raised position. All pick-up springs 24a, however, will be blocked by the projections on the bottom edges of the combination bars 30 to 34, with the exception of a single pick-up spring 24a which will find a series of aligned recesses 45 corresponding to the projections 44 engaged by the operative leaf spring 24, and consequently, the pick-up spring 24a which is in the upper position 48 indicated in broken lines in Fig. 1, represents the character of the respective depressed key 8.

Printing of a character or digit

Referring again to Fig. 1, opposite each pick-up spring 24a a member 53 is arranged which is formed with an elongated hole 54'. A shaft 54 passes through the aligned holes 54' so that each member 53 is pivotable and also movable in a substantially vertical direction. Springs 55 urge each member 53 to a lower position on shaft 54. When, however, one of the pick-up springs 24a moves to the upper position, its end portion 52 engages the projection 47 and pivots the member 53 to a position in which the projection 57 engages the transverse bar 58 which extends along all members 53 and is a part of a frame 59. Shortly after a member 53, actuated by a pick-up spring 24a, has engaged the bar 58, the cam 60' on the cam shaft 23 engages a rod 60, cooperating with a lever arm 62 which pivots the frame 59 and the bar 58 about the shaft 61, Figs. 1, 1d. Thereby the pivoted member 53 is upwardly moved and engages a cooperating lever 64 fixed on a shaft 11 whereby the levers 65, 66 are set in motion and a type 66' is struck. One lever 64 is provided for each type 66'.

At the moment in which the projection 57 of the member 53 engages the bar 58, the cam 23a' of the cam shaft 23 releases the rod 23a and thereby member 26 so that all pick-up springs 24a, and particularly the pick-up spring 24a which had entered the aligned recesses 45 of the combination bars 30, 32, 34, return to an inoperative position due to the action of a spring, not shown. Thereupon cam 38' releases rod 38 so that the actuating bar 36 returns to its inoperative position releasing the leaf spring 24 which was held by tooth 42 engaging the hole 43 therein. The respective leaf spring 24 returns resiliently to its higher inoperative position so that the projections 44 of the previously actuated combination bars 30, 32, 34 are released, permitting spring 309 to return bars 30, 32, 34 to their inoperative position.

No other key 8 can be depressed while the actuating bar 36 is in operative position. The projection 16 of a rod 15 of another key cannot depress the leaf spring 24 corresponding thereto since it abuts against a tooth 42 of the shifted actuating bar 36, as clearly shown in Figs. 2e and 2f.

As in ordinary typewriters, one key 8 may type two characters one of which may be selected by raising the carriage by means of one or two shift keys 800, 802, Fig. 4, one of which is depressed simultaneously with a key 8. The shift keys 800, 802 are provided with a rod 602 which closes a contact means 67 as can be best seen from Fig. 1c. The terminals of the contact means 67 are connected to the terminals of an electromagnet 68, Fig. 1, which is connected to a source of electric current so that when a shift key is depressed, the armature 69 is attracted and pivots the end of lever 70 to a higher position, whereby lever 71 is actuated to raise the carriage 2, as shown in Fig. 1. This operation is independent of the actuation of a type 66' by the cam shaft 23 when a key 8 is depressed. Each type 66' carries two characters, one of which is only printed when the carriage is raised by a shift key.

During printing of results obtained from the computing devices, the bar 35, located adjacent the combination bars 30–34, Fig. 1, may be shifted to close contact 72, Fig. 1c, which energizes magnet 68 to raise the carriage 2 for printing the other of two characters on a type. This may be necessary if printing of a negative value in italics is desired. In a credit column the carriages closes a contact 72 in a manner similar to the arrangement shown in Fig. 6 to actuate the lifting magnet 68.

The principle of the present invention, that is shifting of all elements for a predetermined distance permits electrical actuation of additional devices, such as perforating devices, and sensing devices for perforated cards. In Fig. 18 a bar is shifted for the basic distance and actuates a contact 250 to energize a magnet 251, which attracts lever 252 whereby another bar 253 of an additional device is shifted. Wherever the available space is insufficient for cam shafts magnets can be provided, and transfer of movements electrically carrried out.

In the event that the apparatus is used as a teletype machine further electromagnets may be used for the actuation of the device. Fig. 1g shows the magnets 38b, 23b, in addition to 27a. Electromagnet 23b actuates the rod 23a to pivot the pick-up springs 24a while electromagnet 38b is used for actuating the actuating bar 36. Magnet 27a takes the place of the frame 20 and is de-energized by a circuit closed by a key 8 to permit engaging of the clutch 23', 23''.

Transfer of a combination representing a digit element into the computing device As can be seen from Figs. 3b–3f, the ends of the combination bars 30 to 34 project from the typewriter housings and are formed with recesses 301. For each combination bar 30 to 34, a transfer lever 81, 83 is provided which is pivoted on a fixed bracket 82. The arms 81 of each transfer lever engage the recess 301 of the corresponding combination bar while the arm 83 is arranged between two groups of bars, the input bars 84 and the output bars 84a of which only four each are shown in Figs. 3b and 3c as four bars are sufficient to express any digit for computing purposes. The arrangement of levers 81, 83 can be best seen from Figs. 3c, d, e, f. According to one embodiment of the invention each input bar 84 is provided with a recess 84' and cannot move in the direction of the arrow 84'', if the corresponding combination bar is in inoperative position, Fig. 3f, since the lever arm 83 is then located in the recess 84' under the action of spring means, not shown in Figs. 3e and 3f, which bias levers 83, 81 in clockwise direction. When, however, the corresponding combination bar is shifted to operative position as shown in Fig. 3e, the corresponding input bar 84 can move longitudinally since the lever arm 83 is retracted from the corresponding recess 84'. As shown in Figs. 3d and 10, a transfer cam shaft 720 is provided which, when rotated, urges the springs 702 through cams 701 against the ends of the bars 84, 84a to move in a longitudinal direction. In Fig. 3d the bars 84 are omitted in order to more clearly illustrate the bars 84a the function of which will be described hereafter. As shown in Fig. 10, springs 200, and 200' engage the other ends of the bars 84 and 84a, respectively, and urge the same to the left in Fig. 10. Immediately after any of the combination bars 30 to 34 have been moved to operative positions by the actuating bar 36 as described above, the cams 701 of the cam shaft 720 release the pressure of the springs 702 against the ends of the input bars 84 and the spring 200 urge the input bars 84 to the right. Such input bars 84 as are blocked by the lever arms 83 due to the inoperative position of the corresponding combination bars cannot move. According to the embodiment shown in Figs. 3e and 3f, the lever arms 83 project into notches 84'. According to the embodiment of Fig. 10, projections 84b'' are engaged by the lever arms 83. Input bars 84 which are released by the lever arms 83 due to inoperative position of the corresponding combination bars, are shifted for a predetermined distance by the springs 200. Consequently, the input bars 84 assume a position relative to each other which exactly corresponds to the combination position of the combination bars 30 to 34. The input bars 84 extend through several storing and computing devices which will be described in greater detail hereafter, and serve to actuate the same. It will be noted that the input bars 84 are only locked and released by the combination bars 30 to 34 and that no force is transmitted between the same. The actuating force is supplied by the springs 200 and 702. The springs 702 positively engage recesses in the ends of the input bars 84 and in the output bars 84a and return the bars 84, 84a to the original position when the cams 701 actuate the springs 702.

The output bars 84a extend parallel to the input bars 84, but are shorter, and serve for transferring the final result of a computing operation back to the combination bars 30 to 33, respectively. When a result has been found by computing devices, which will be described hereafter, output bars 84a are urged by the springs 200' and 702 due to the action of the cam means 701 to move in one direction. However, only those of the output bars 84a which represent in their combination the resulting number are movable, the other output bars 84a being blocked by the computing device. Consequently, only the free output bars 84a are moved by the springs 702 for a predetermined distance. After the free output bars 84a have been shifted, the cam shaft 85 acting through cams 84 on resilient abutments 86 on the lever arms 83 urges all transfer levers 81, 83 to perform a pivotal movement. As can be clearly seen from Fig. 3d, the lever arms 83 which are located oppositely projections 84b cannot move, while the lever arms 83 which correspond to shifted free output bars 84a, which represent the result, are free to perform a pivotal movement so that their lever arms 81 pull the corresponding combination bars 30–34 to their shifted operative position and the combination is transferred from the output bars 84a to the combination bars 30 to 34. Similar projections 84b' cooperating with levers 83 may be provided on the input bars 84 instead of the cutouts 84'.

For representing the digits only four input and output bars are required. The fifth bars 84a and 84 shown in Fig. 3d serve for actuating the tabulating device which will be explained hereafter.

The result of a computing operation, as indicated by the combination bars 30–35, is also printed by the typewriter. For this purpose the cam shaft 23 is rotated whenever combination bars 30–34 are shifted by the levers 81, 83 according to the relative positions of the result bars 84a.

The combination bars 30 to 34 are provided with projections 81c which close contact means 81b when at least one combination bar is shifted to the operative position, as can be best seen from Figs. 3c and 3d. The contact means 81b are in the circuit of electromagnet 27a, Fig. 1d, and are provided with a pivoted armature actuating the rod 27 for releasing the coupling member 23' when at least one of the combination bars 30 to 34 is shifted and closes a contact means 81c whereby cam shaft 23 is coupled to the drive shaft 23c for rotation. When cam shaft 23 rotates, cam 23a' actuates rod 23a to pivot the member 26 so that a pick-up spring 24a enters the aligned recesses 45 of the shifted combination bars representing a result, and actuates a type lever, as described above.

Before a computing operation is performed, a number must be stored in a storing device, as illustrated in Figs. 5a and 5b.

As explained above, when a key 8 representing a digit has been struck and the actuating bar 36 has shifted those combination bars 30 to 34 which in their combination represent the respective digit, the corresponding levers 81, 83 are shifted and unlock the corresponding bars 84 which are released by cams 701 and springs 702, 200 for a predetermined distance and to an operative position representing the digit of the struck key. Bars 84 extend into the storage device and are provided with recesses 84' cooperating with shifting levers 93, each recess 84' registering with a lever 93 when bars 84 are in inoperative position.

Each of the storing levers 93 is secured to a shaft 92, the number of the shafts 92 being equal to the number of bars 84. The storing levers 93 are vertically and horizontally staggered with respect to each other, as clearly shown in Figs. 5a, 5b, 5d, 5e and 5f and all storing levers 93 are simultaneously actuated for turning movement with the associated shaft 92 by cam 120a engaging a lateral projecting portion 93' of the uppermost lever 93. Each lever 93 has a lateral projecting portion 93'' which rests upon the next lower adjacent portion 93' so that all levers 93 are actuated when the uppermost lever 93 is shifted by cam 120a, as best seen in Fig. 5u. When the cam shaft 120 rotates the cam 120a to a position releasing the pivoted storing levers 93, the ends of the same fall from the position shown in Fig. 5f into the corresponding recesses of the bars 84, Fig. 5e.

Four resilient storing combs 90's1, 90's2, 90's3, 90's5, are secured to the four shafts 92, each comb having teeth 90 the shape of which can be best seen from Fig. 5q. The four teeth C represent hundredths, the teeth D tenths, the teeth U represent units, the teeth T represent tens, the teeth H represent hundreds, the teeth TH represent thousands, the teeth TT represent ten thousands, the teeth HT represent hundred thousands, and the teeth M represent millions. Further teeth K are provided for complement computing. Four teeth 90 are provided for each decimal order, and similarly to the combinations of the bars 30 to 33, and 84, the combination of each group of four teeth 90 is used to represent a digit element.

Above each group of four teeth 90 a locking means is provided comprising four locking prongs 94, one for each tooth 90, a common shaft 195 which is pivotally mounted in supporting walls of the device, and an extension 122 so that each locking means is pivoted when a cam 121 engages the corresponding extension 122 during rotation of the cam shaft 120, Fig. 5h. In normal inoperative position the end of each locking prong 94 is located on one side of a corresponding tooth 90 as can be best seen in Fig. 5q. Consequently, when some of the bars 84 are shifted to the right in Fig. 5a and turn the corresponding shafts 92 by means of storing levers 93, all teeth 90 of the comb 90' on the corresponding shafts 92 tend to turn in all decimal orders, but are prevented from turning by the locking prongs 94 so that the resilient teeth 90 are bent. The decimal orders are consecutively actuated by the cams 121 during rotation of the cam shaft 120. Assuming for instance, that the cam 121 corresponding to one decimal order engages the extension 122 of the corresponding locking means, the four locking members 94 move upwardly, Fig. 5i, and release for a moment the four teeth 90 in the decimal order which receives an impulse from cam 121. Now the bars 84 are shifted so that actuated combs 90' tend to turn. Those of the four teeth which are under resilient tension due to the pivoting of the corresponding shafts 92 by a combination of shifted bars 84 move consequently below the lifted locking member 94 in the actuated decimal order. Thereupon the cam shaft 120 turns one step, the cam 121 of the respective decimal order releases the extension 122 of the locking means of the respective decimal order so that the locking members 94 move again downwardly. They are, however, now located on the other side of the actuated teeth 90, and in the position shown in Figs. 5r, s, t. The cam shaft 120 completes its step and stops in a position in which the cam 121 of the next higher denominational order engages the locking means associated therewith and raises locking members 94. Thereupon the cam 120a pivots the levers 93 so that they are no longer engaged in recesses of the bars 84, Fig. 5f, and all shafts 92 and teeth 90 return to their normal inoperative position shown in Figs. 5n, p, o, and q, except the previously actuated teeth 90 in the respective decimal order which are held by the locking members 94 in the position shown in Fig. 5o. Each shaft 92 is provided with a bore receiving the end portion of a wire spring 900 whose other end is secured to the stationary housing. Springs 900 tend to return the associated shafts 92 to normal positions. All operations in the respective decimal order are thereby completed. The combination of teeth 90 held by the locking members 94 represents a stored digit in the respective decimal order which was previously selected by key 8 and transmitted by the combination bars 30 to 33 and the bars 84 to the storing device. Since the locking members 94 of the next higher decimal order are held by a cam 121 in unlocked position, an impulse now given by a key 8 through input bars 84 will have an effect only in the unlocked next higher decimal order. Before the next following revolution of the cam shaft 120 the locking means 122, 94 are pivoted again so that the locking member 94 releases the corresponding teeth 90 so that the digit is no longer stored. Before that takes place, however, the number stored in the storing device is picked-up by further devices and used in a computing operation.

The following operations are required for storing a value:

(1) Actuation of a typewriter key 8. No printing necessary.

(2) Engagement of the leaf spring 24 with the projections on the combination bars 30 to 35.

(3) Actuation of the starting member 19, 20, Fig. 1d, for shifting clutch 23' into engaged position so that shaft 23 is rotated.

(4) Actuation of the actuating bar 36 so that the combination bars 30–34 are shifted.

(5) Shifting of the input bars 84 unlocked by levers 81, 83 by springs 702 and 200 (Figs. 10 and 17).

(6) Raising of the locking members 94 in the lowest order of the storing devices T and TP by one, or two cam shafts 120 (Figs. 5a, 5b).

(7) Turning of the storing combs 90 in the storing devices T and TP by levers 93 actuated by the input bars (Figs. 5a, 5c and 10).

(8) The decade cam shafts 120 are again actuated by a control shaft to lower the locking members 94 so that the turned storing comb teeth 90 are arrested (Figs. 5a, 5b, 5q, 5r, 5s, 5t).

(9) The transfer cam shaft 720 rotates to a position permitting the input bars 84 to return to their initial position so that the storing combs 90 return to their initial position with the exception of the locked teeth 90 storing digit elements (Fig. 10, right position, Fig. 9, Fig. 15).

(10) The actuating bar 36 is released, and the combination bar 30 to 34 return to their initial position and are ready for the next actuation by a typewriter key for storing a value in the next following order (Fig. 1).

It may be desirable to provide means for clearing the machine independently of the cam shaft 120 and for this purpose a special prong 94' may be provided on each locking shaft 195, Fig. 5h. A rack bar, not shown, engages all prongs 94', and if actuated by a magnet trough key 807, simultaneously pivots all shafts 195 so that all locking members 94 release the teeth 90. In the embodiment illustrated in Figs. 5a and 5b, four combs 90' are provided representing the digit elements 1, 2, 3 and 5, respectively, which in combination represent the digits 1 to 9. It is, however, also possible to provide ten, or any other number of combination bars, input bars 84 and combs 90'.

In front of each of the four combs 90', 90 four vertical pick-up bars 95 are located, which serve for further transferring digit elements stored by the combs 90. One pick-up bar 95 is provided for each of the digit elements 1, 2, 3, 5, and the corresponding pick-up bars will be referred to hereinafter as 95s1, 95s2, 95s3, and 95s5. Each of the pick-up bars 95 is supported by a spring 96 which is raised by a pick-up cam shaft 97. Cooperating with the pick-up bars 95 are coupling members 99 which are provided with projecting teeth 98. As can be best seen from Fig. 5k, the coupling members 99 extend through several storing devices and are shifted by a coupling cam shaft means 708 extending vertically through all decimal orders, Fig. 9. One tooth 98 is provided for each of the four teeth 90 in each storing device. In normal inoperative position the teeth 98 are located beside the teeth 100 of the corresponding pick-up bar 95 as illustrated in Figs. 5c, q, s and t so that the four pick-up bars 95 could be raised and lowered by cam means 97 and springs 96 without any change in their relative position. The coupling cam shaft 708 consecutively shifts the coupling members 99 for each decimal order to the position shown in broken lines, Figs. 5c, q, s, t. If the teeth 90 are in inoperative position, as shown in Figs. 5c and q, the pick-up bars 95 cannot move upwardly since the now shifted teeth 90 block the movement of the teeth 98. If, however, a tooth 90 is in the bent storing position, shown in Figs. 5s and t, the upwardly moving corresponding pick-up bar resiliently bends the tooth 98, which is possible since tooth 98 can move past the tooth 90 to the position shown in broken lines in Fig. 5s. Consequently, some of the four pick-up bars 95 are raised by the cam shaft means 97 and the springs 96 in a combination corresponding to the combination stored by the teeth 90 and the locking members 94 of the decimal order which is sensed by cam means 708 through members 99, 98. Since the coupling cam shaft means 708 consecutively shifts the coupling members 99 of each decimal order, the digits stored by the storing device in the respective decimal orders are consecutively picked up by the pick-up bars 95. After the pick-up bars have picked up the combination in a decimal order, the coupling member 99 of the respective decimal order is released by the associated cam on cam means 708 and is returned by spring means, not shown, while the combination of the pick-up bars is further transferred, as will be described hereinafter. Thereupon the pick-up bars 95 drop, the coupling member of the next decimal order is actuated, and the bars 95 are again actuated for the next decimal order.

Figure 19:
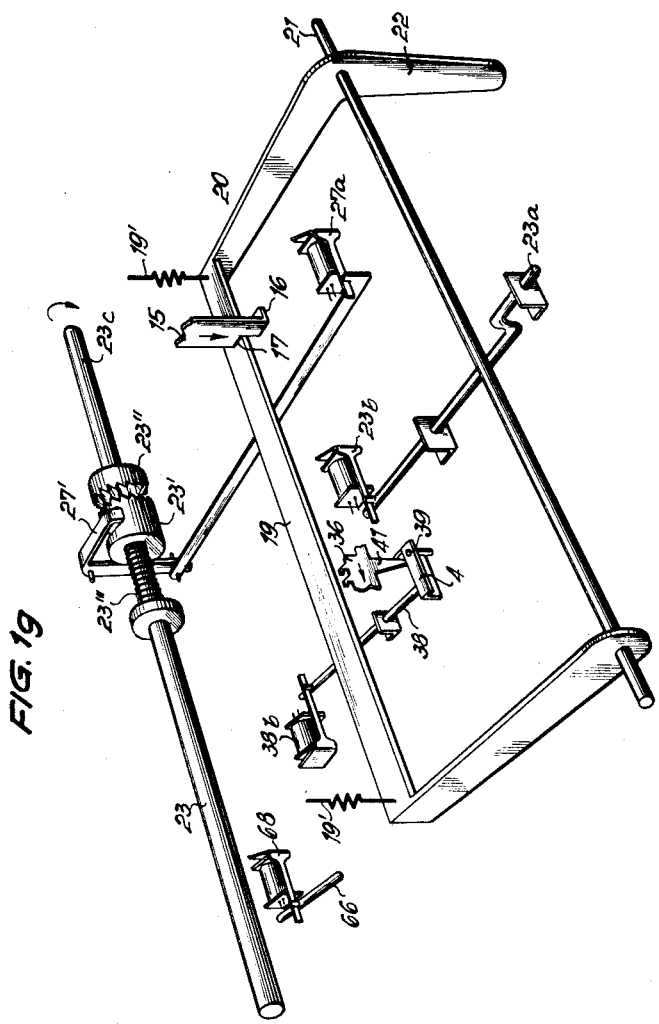
Fig. 19 is a schematic view illustrating the electrical actuation of an auxiliary device by the combination bars.

As shown in Fig. 19 the decade cam shaft 120 may be turned by a magnet 199, and the pick-up bars 95 may be raised by a magnet 197.

It will be noted that during the transfer of the stored figures no force is directly transmitted but that the movement of the pick-up bars 95 is effected by a cam means 97 and springs 96 and is only controlled by the storing device. The lower position of the pick-up bars 95 is defined by stop means 103 and the upper by a stop means 104. The pickup bars 95 are provided with teeth 102 which control the movement of the transfer bars 101. For carrying out a computing operation at least two storing devices as shown in Figs. 5a and 5b are required.

Assuming that in each of these two storing devices S and T a number is stored, an addition is carried out by a summing device SU which is shown in Figs. 7 and 8. In Fig. 8 three storing devices, as shown in Fig. 5b, are illustrated on the righ hand side of the figure, while the summing device SU is shown on the left hand side of the figure. In both figures some elements are omitted for the sake of clarity.

In Fig. 5b a number of horizontal transfer bars 101 are shown to extend transversely to the pick-up bar 95. In Figs. 7 and 8 several transfer bars 101 are shown to engage a cross piece 130 of each of the eight bars 713. It is clear that longitudinal shifting of any one of the several transfer bars 101 abutting against the cross piece 130 of bar 713S1 will effect shifting of the 713S1 for the same distance. The purpose of this arrangement will be explained hereinafter but, in order to understand the basic operation of the device it may be assumed for explanation purposes that the eight bars 713 extend all the way through the three storing devices shown in Fig. 8, and that there are no bars 101. The transfer bars 101 are provided for transferring the combinations of the pick-up bars 95 to the summand bars 713 and cooperate with cut-outs and teeth in bars 95. In the following explanation the summand bars 713 will be assumed to cooperate with pick-up bars 95.

*The principle of the computing apparatus*

As can be clearly seen from Fig. 8, five groups of vertical result bars 110 are provided which cooperate with the eight summand bars 713. Each summand bar 713 is provided with a plurality of recesses 713'', not shown in Fig. 8, only one of which is shown in Fig. 9 in bars 713 as an illustrative example. The result bars 110 have projections 110' which block upward movement of bars 110 by engaging bars 713 except when all projections on a result bar 110 are located opposite vertically aligned recesses 713" in all summand bars 110. The group of result bars 110F1 engages a pivoted lever 207, the group of result bars 110F2 engages a lever 208, the group of result bars 110F3 engages a lever 209, and the group of result bars 110F5 engages a lever 210. The group of result bars 110F10 engages a similar lever 211, but since this group of result bars serves for the tens transfer, it will be explained later on.

Each of the blocking levers 207 to 210 has a projecting arm whose end portion, if located in a cut-out of one of the input bars 84, prevents longitudinal shifting of the same. When, however, the result bars 110 are raised by supporting springs 296 upon rotation of the cam shaft 97, the levers 207–210 are pivoted and their projecting arms release the corresponding input bars 84 so that the same can be shifted by springs 200 and 702 upon rotation of cam shaft 720 carrying the cam 701, Figs. 3d and 9.

Assuming again that in place of the bars 101 the eight summand bars 713 extend through two storing devices S and T which store numbers to be added, the summand bars 713S1, S2, S3 and S5 will cooperate with the storing devices, and the summand bars 713T1, T2, T3 and T5 will cooperate with the other storing device T. When the clutch 97a, c in the respective storing device is engaged, Fig. 5a, the cam shaft portion 97e located underneath the storing device S rotates and raises the springs 96 to a first operative position 96' which is illustrated in broken lines in Fig. 5b.

Fig. 6 shows how the clutch 97a, c is shifted to engaged positions by magnet 97b when a contact 97d is closed by a projection 97c on the carriage 2. Fig. 6 is a simplified construction, and the preferred embodiment is shown in Fig. 5a. A hollow cam shaft portion 97e is provided in each storing device, and is actuated by the drive shaft 97f when the clutch 97a, c is coupled. As shown in Fig. 15, the cam shaft portions 97e are provided under each storing device. Thereby the pick-up bars 95s1, s2, s3, and s5 in the storing device S are raised to a first operative position in which shifting of all four corresponding summand bars 713S is blocked by projections 102 on the pick-up bars 95. (In the at present described simplified arrangement the bars 101 in Fig. 5b represent the summand bars 713.) Those pick-up bars 95 which are located underneath a bent comb prong 90 storing a digit element, can move to a second higher operative position as shown in Figs. 5q, 5s and 5t. In the second operative position of the pick-up bars 95, the projections on the same are shifted to a position permitting certain summand bars 713S to be shifted by springs 702, Fig. 9, since they are now located opposite recesses 95'.

Assuming that in the first decade C of a storing device S the number four was stored, so that the teeth 90 of the combs 90's1 and 90's3 are bent and in storing position, the corresponding pick-up bars 95s1 and 95s3 will be raised to the second operative position and permit the result bars 713S1 and S3 to be shifted. At the same time the result bars 713S2 and S5 will be blocked by projections 102 of the corresponding pick-up bars 95s2 and 95s5 which could be raised by the springs 96 only to the first operative position. Consequently in the summing device SU shown at the left of Fig. 8 only the summand bars 713S1 and S3 will be in shifted position.

During this operation the pick-up bars 95t1–t5 of the other storing device T were in the lower inoperative position shown in Fig. 5b since they were not actuated by the respective hollow cam shaft portion 97e of the cam shaft 97. In this inoperative position of the bars 95 cut-outs are located opposite bars 713 (101 so that the summand bars 713S1 to S5 pass through cut-outs 95' in the pick-up bars 95t1 to t5 and can be freely shifted, unless they are blocked in storing device S, while the summand bars 713T1 to T5 are blocked by pick-up bars 95s1 to 95s5 regardless of whether the same are in the first or second operative position.

Now the portion 97e of the cam shaft 97 located underneath the storing device T is coupled by a contact 97d on the moving carriage 2 actuating the clutch 97a, c as shown in Fig. 6 for one cam shaft portion and rotates, while in the meantime the pick-up bars 95s1 to s5 have returned through cut-outs in the summand bars 713T₁ to T₅ to their lowered inoperative position permitting shifting of all summand bars 713T1 to T5. Rotation of cam shaft portion 97e underneath storing device T effects raising of the pick-up bars 95t1 to t5 to the first operative position, blocking all summand bars 713T1 to T5 and 713S1 to 713S5 (bars 101 in Fig. 5a). As described with reference to the storing device S, the pickup bars 95t which are arranged opposite teeth 90 storing digit elemetns in the first decade of storing device T can be raised to the second operative position in which cut-outs of the same permit shifting of corresponding summand bars 713T but block summand bars 713S.

Assuming that, for instance, the digit 5 corresponding to the number 5 was stored in the storing device T, the summand bar 713T5 will be shifted.

Referring now again to Fig. 8, in the summing device SU the summand bars 713S1, S3, and T5 are now shifted. The summand bars 713S and 713T are provided with appropriate cut-outs and projections cooperating with result bars 110F so that the result bars 110F1, F3, and F5 can be raised by springs 296 to unlock the input bars 84 by turning the blocking levers 207 to 210 about the shafts 212. In the present simplified example the result bars 110F1, 110F3, 110F5 represent the result of the addition 4 plus 5 since the sum 9 is expressed by the same digit elements as 4 and 5, namely 1, 3, 5. If the input bars 84 are now urged to shift by springs 200, 702, the unlocked input bars 84 move and transfer the result 9 comprising the elements 1, 3 and 5.

If the same digit is stored in the storing devices S and T, the result bar 110F corresponding to the sum of the two digits is released by corresponding cutouts in the summand bars 713 and is raised by spring 296. For instance, if both the summand bars 713S1 and 713T1 are shifted, aligned cut outs in these bars which are provided for the result "two" are shifted to a position located oppositely the result bar 110F2 permit raising of this result bar so that the input bar 84 corresponding to the digit 2 is unlocked for transferring the result 2. The arrangement of the cut-outs in the summand bars 713S and 713T will be described hereinafter with reference to the practical embodiment in which a plurality of bars 101 is associated with each bar 713S and 713T.

The result represented by the relative position of the input bars 84 could be used directly to shift the combination bars 30 to 33 as described with reference to Fig. 3d for output bars 84a. Actually this is not done, but the result represented by the input bars 84 is transferred to a storing device.

The above explanation of the operation of a simplified computing arrangement has been provided in order to disclose the principle of the computing operation.

Since the results contain the same digit elements in various digits (for instance the digit element 1 is contained in the numbers 1, 4, 6, and 9), more than one result bar 110F is required for each digit, so that several result bars 110F1, F2, F3, F5 and F10 have to be provided. According to the preferred embodiment of the present invention each digit is expressed by the digit elements 1, 2, 3 and 5. Another system may be used employing digit elements 1, 2, 3, 4. For each system of breaking up a digit into digit elements the number of result bars has to be determined. In some cases a single result bar can take care of several computing operations, and in some cases additional result bars are required for indicating the same digit element in the result.

If all possible additions from 0 plus 0 to 9 plus 9 are broken up into the digit elements 1, 2, 3, 5 and one of the two additions containing the same summands are omitted, the number of possible additions to be carried out is reduced. There are always two additions containing the same summands inasmuch as the same summands may be stored in the storing devices S and T, respectively. The result is represented by the result bars 110F broken up into the digit elements 1, 2, 3, 5 regardless of the digit elements by which the summands were represented in the storing devices. For instance, the result 4 is expressed by the digit elements 1 and 3 and represented by result bars 110F1 and 110F3 regardless of whether the storing devices store and transfer the summands 1 and 3, or 2 and 2, or 0 and 4. However, since the same result is obtained from different summands, more than one result bar 110F is required for each digit element. An analysis of the prevailing conditions proves that the number of resut bars 110F required for each digit element is limited since certain basic combinations are repeated. Instead of 10 times 10 result bars 110F1, only four result bars 110F1, 110F1′, 110F1″, 110F1‴ are required. The following table shows an analysis of the possible combinations of the digit elements 1, 2, 3, 5 in which result bars 110F1 are required. Similar considerations decide the number of the required result bars 110F2, 110F3, 110F5, and 110F10, the last-mentioned result bars being required for a ten-transfer as will be described hereinafter.

When two digits are added in a single decimal order, a limited number of sums are possible. Of these sums, the sums 1, 4, 6, 9, 11, 14, and 16 contain the digit element 1 when expressed in digit elements according to the present invention.

The first column in the table shows the sum, the second column shows the addition of twodigits stored respectively in two storing devices, and the third column shows the digit elements by which the respective digits are represented in storing devices. For instance, the digit element 2 may be stored in one storing device, and the digit element 2 in the other storing device. Or, the digit element 1 may be stored in one storing device, and the digit element 3 in the other storing device. Both additions will have the result 4, and must be expressed by digit elements 1 and 3 in the result.

The fourth column indicates which combinations of stored digit elements require additional result bars 110F1.

| I | II | III | IV | | | |
|---|---|---|---|---|---|---|
| Sum | Digits | Stored digit elements | Result bars | | | |
|  |  |  | 110F1 | F1′ | F1″ | F1‴ |
| 1 | 0 plus 1 | 1 |  |  |  |  |
| 4 | 0 plus 4 | 1,3 |  |  |  |  |
| 6 | 0 plus 6 | 1,5 |  |  |  |  |
| 9 | 0 plus 9 | 1,3,5 |  |  |  |  |
| 4 | 1 plus 3 | 1,3 |  |  |  |  |
| 6 | 1 plus 5 | 1,5 |  |  |  |  |
| 9 | 1 plus 8 | 1,3,5 |  |  |  |  |
| 4 | 2 plus 2 | 2,2 |  |  |  |  |
| 6 | 2 plus 4 | 1,2,3 |  | ... |  |  |
| 9 | 2 plus 7 | 2,2,5 |  | ... |  |  |
| 11 | 2 plus 9 | 1,2,3,5 |  | ... |  |  |
| 6 | 3 plus 3 | 3,3 |  |  | ... |  |
| 9 | 3 plus 6 | 1,3,5 |  |  | ... |  |
| 11 | 3 plus 8 | 3,3,5 |  |  | ... |  |
| 9 | 4 plus 5 | 1,3,5 |  |  |  |  |
| 11 | 4 plus 7 | 1,2,3,5 |  | ... |  |  |
| 11 | 5 plus 6 | 1,5,5 |  |  |  |  |
| 14 | 5 plus 9 | 1,3,5,5 |  |  |  |  |
| 14 | 6 plus 8 | 1,3,5,5 |  |  |  |  |
| 14 | 7 plus 7 | 2,2,5,5 |  | ... |  |  |
| 16 | 7 plus 9 | 1,2,3,5,5 |  | ... |  |  |
| 16 | 8 plus 8 | 3,3,5,5 |  |  |  | ... |

From the above table it will be apparent that cutouts in the summand bars 713S1 and 713T3 will permit the raising of a first result bar 110F1. When summand bars 713S2 and 713T2 are actuated, cutouts in these summand bars will register and permit raising of another result bar 110F1′, and of a result bar 110F3.

The addition 0 plus 4 reduced to the elements 0 plus 1 plus 3 shows no change as regards the result bar F1 compared with the addition 0 plus 1, the adding of the element 3 influencing only the result bar F3. Consequently at the crossing point of the result bar F1 with the summand bar S3 the blocking projection is omitted, and the same result bar 110F1 actuated. The same is true for the additions 1 plus 5, 0 plus 6, and 1 plus 8, since the addition of the digit element 5 has no influence on the result bars F1. Consequently the first seven additions of the above table can be managed with one result bar 110F1, as well as all additions in which besides the digit element 1, only add digit elements occur. Altogether 12 combinations of digit elements can be sensed by a single bar 110F1.

A second result bar 110F1′ is required for representing the digit element 1 contained in the result 4 in all cases in which the sum is an even number. Since the occurrence of the digit 5 constitutes only a periodical repetition, the second result bar F1′ takes care of the cases 2 plus 2, as well as of the cases 2 plus 2 plus 5, and 2 plus 2 plus 5 plus 5.

The third result bar F1″ is required for representing values containing the number 6 which is reduced to the digit elements 1, 2, 3 while an addition of one or two elements 5 does not result in any change. The fourth result bar F1‴ is required for indicating the number 6 if the digit element 3 occurs twice, regardless of whether one or two elements 5 are added.

A similar analysis for determining the required number of all result bars 110 leads to the conclusion that:

4 result bars 110F1, for digit element 1,
3 result bars 110F2, for digit elements 2,
4 result bars 110F3, for digit element 3,
9 result bars 110F5, for digit element 5, and
4 result bars 110F10, for tens transfer, are required, so that altogether 24 result bars 713F must be provided. It will be understood that in computing by digit elements, the cutouts in bars in the summing device permit use of the same result bar, for instance, 110F1 for indicating the digit element 1 in various additions, so that not 10 times 10, but only, for instance, four result bars 110F1 are required. The 24 result bars are capable of representing all possible results in the form of digit elements 1, 2, 3, 5.

Not all result bars 110F are shown in the drawings, some result bars having been omitted for the sake of clarity. Only one result bar of each group of result bars representing a digit element, for instance only one result bar of the four result bars F1, F1′, F1″, and F1‴ must be raised by the springs 296, while the others must be blocked. For this purpose the respective summand bars 713 are provided with cutouts permitting shifting of certain result bars 110F, while the projections between the cut-outs block the other result bars 110F.

In order to permit raising of those result bars 110 that represent elements of the result, all eight summand bars 713 must be provided with cut-outs at the crossing points with each result bar 110. In some cases it is necessary to provide cut-outs permitting the raising of a result bar 110 while the summand bar 713 is in actuated, shifted position, while in some cases it is necessary to provide cut-outs on a summand bar permitting raising of a result bar while the respective summand bar is in rest position, and not shifted In the following table the arrangement of the cut-outs is shown, the letter A indicating a cut-out of the respective summand bar 713 in actuated position, and the letter R indicating a cut-out of the respective summand bar in the position of rest, that is not shifted. The letters AR indicate that the respective summand bar is provided with a cut-out permitting raising of the respective result bar in actuated position of the summand bar, and with another cut-out, or a wider cut-out, permitting raising of the respective result bar also while the summand bar is in position of rest,

|  |  | 713S1 | S2 | S3 | S5 | T1 | T2 | T3 | T5 |
|---|---|---|---|---|---|---|---|---|---|
|  | 1 | AR | A | A | A | R | R | R | R |
|  | 2 | AR | R | A | A | R | R | A | R |
|  | 3 | A | R | A | A | A | R | R | A |
| 110F10 | 4 | AR | AR | AR | A | AR | AR | AR | A |
| 110F1 | F1′ 5 | A | R | AR | AR | R | R | R | AR |
|  | F1′ 6 | A | A | A | AR | R | R | R | R |
|  | F1″ 7 | R | A | R | AR | R | R | A | AR |
|  | F1‴ 8 | R | R | A | AR | R | R | A | AR |
| 110F2 | 9 | A | R | R | AR | A | R | R | AR |
|  | 10 | R | A | R | AR | R | R | R | AR |
|  | 11 | A | R | A | AR | R | R | A | AR |
| 110F3 | 12 | A | A | R | AR | R | R | R | AR |
|  | 13 | R | A | R | AR | R | A | R | AR |
|  | 14 | AR | R | A | AR | R | R | R | AR |
|  | 15 | A | R | A | AR | A | R | A | AR |
| 110F5 | 16 | A | R | A | R | A | R | R | R |
|  | 17 | AR | A | A | R | R | R | R | R |
|  | 18 | AR | R | A | R | AR | R | A | R |
|  | 19 | AR | R | A | A | R | R | R | R |
|  | 20 | R | A | R | A | R | A | R | R |
|  | 21 | AR | A | A | A | R | R | R | A |
|  | 22 | AR | R | A | A | R | R | A | A |
|  | 23 | A | R | A | A | R | R | AR | R |
|  | 24 | AR | AR | A | A | AR | R | R | R |

Instead of providing cut-outs on the summand bars, it is also possible to omit the teeth on the result bars 110 which otherwise cooperate with the cut-outs on the summand bars 713. If, for instance a wide cut-out AR is necessary to permit passing of a projection on the result bar both in position of rest and in shifted position of the summand bar 713, the corresponding projection on the result bar may be omitted, so that the summand bar need not be provided with a cut-out. Provision of a wide cut-out AR, or omission of the corresponding projection on the result bar is required, if one digit element, for instance 1, is required for the formation of several result digits 1, 4, 6, 9 so that the result bar 110F1 must be permitted to be raised to sense the cut-outs regardless whether a second element is present in the result or not.

The result bars 110F1, F2, F3, F5 and F10 are supported by leaf springs 296, Figs. 7, 8 and 9, which are actuated by a cam shaft 97, Figs. 9 and 15 for raising the result bars 110 which check the position of the summand bars 713. It is clear that only such result bars 110 can be raised that have projections 110′ located oppositely aligned cut-outs 713″ of the summand bars 713, or which have the respective projection 110′ omitted, as explained above. If a projection 110′ engages a projection 713′ on the summand bar 713, the result bar 110 cannot be raised, and the cam shaft 97 bends the respective spring 296 which gives resiliently.

Tens-transfer device

For carrying out the tens transfer, and for computing operations employing complement values and negative values a transfer device TR is required which is shown in Fig. 8 and partly in Fig. 7.

Each summand bar 713 is provided at its end with a cross piece 130 against which a plurality of transfer bars 101, in Fig. 5b, abut. One end of the transfer bars 101 abuts against springs 702 which are actuated by cam shaft 720 and cams 701, Fig. 9, which rotate each time the digit elements stored in one decade of one of the storing devices is to be transferred into the summing device SU.

A simplified arrangement has already been described by which no tens transfer or complement computing operation could be carried out, and in this simplified arrangement it was assumed that the summand bars 713 run through two storing devices containing stored elements which have to be added. In the preferred embodiment of the present invention, Fig. 8, the summand bars 713 end in the transfer device TR and in their place the transfer bars 101 extend through the storing devices. In the preferred embodiment of the bookkeeping machine which will be described in greater detail hereinafter, several storing devices are provided, so that the transfer bars 101 extend through several storing devices S.

The transfer device

Fig. 8 shows that the summand bars 713 are urged by springs 220 to the right, and since springs 702, Fig. 9, urge the transfer bars 101 to the left, the respective summand bar 713 moves with each of the transfer bars 101 abutting against the cross piece thereof as if the two bars were a single element, unless bars 101 or bars 713 are blocked by bars 95 and 110, respectively. It will be understood that if one spring 702 shifts one of the five transfer bars 101, the corresponding summand bar 713 is shifted since the transfer bar abuts against the cross piece 130. The other transfer bars 101 abutting against the cross piece 130 can be blocked by the pick-up bars 95 or, for instance, by the bar 850 in Fig. 8, by projections cooperating with cut-outs so that they are not shifted although the springs 702 urge them resiliently to the left. On the other hand springs 702 release the transfer bar 101, while bars 713 are still blocked by bars 110.

By the above described arrangement the tens transfer, and complement and negative computing operations are carried out. Furthermore the arrangement is used for simplifying basic computing operations.

For all possible additions beginning from 0 plus 0 to 9 plus 9 the summands are reduced to the digit elements 1, 2, 3 and 5. Assuming that a digit is stored in one of the storing devices, and that by actuation of a corresponding typewriter key the digit which is to be added is stored in a storing device T, it is for the purpose of addition and for the result of the addition immaterial in which storing device the digit element was stored. For instance, the same result is obtained if the digit 1 was already stored in the storing device S and the digit 2 was stored by typing in the storing device T, or whether the digit 2 was already stored in the storing device S and the digit 1 was typed to be stored in the storing device T, or if a digit was transferred into the storing devices from another storing device.

Similarly it is immaterial whether the element 3, for instance, is represented in the summing device SU by the summand bar 713S3, or by the summand bar 713T3 since in both cases one result bar 110F3 will be released and raised to indicate the digit element 3 in the result.

According to a preferred embodiment of the present invention the digit elements 1, 2, 3 and 5 are expressed by the summand bars 173S regardless of whether the respective digit was stored in the storing device S or in the storing device T. Only if the same digit element occurs twice in one computing operation it must be expressed by the summand bars 713T.

For instance for the addition 2 plus 1 only result bars 713S are required. One transfer bar 101s2 abutting against the cross piece 130 of the summand bar 713S2 transfers the digit 2 from the storing device S into the summing device SU. Another transfer bar 101t1 abutting against the cross piece 130 of the summand bar 713S1 transfers the digit 1 from the storing device T into the summing device SU. It is clear that there is also a transfer bar 101s1 provided for transferring a digit element 1 from the storing device S, if this should be necessary.

If, therefore, the addition 1 plus 4 is to be carried out which, when reduced to the digit elements, is 1 plus 1 plus 3, one transfer bar 101s1, abutting against the cross piece 130 of the summand bar 713S1 and one transfer bar 101st1 abutting against the cross piece 130 of the summand bar 713T1 is required in addition to the transfer bar 101t3 abutting against the cross piece 130 of the summand bar 713S3. Of course, if the summand bar 713S3 were already occupied by a digit element 3 transferred from the storing device S, the transfer bar 101st3 would be needed for shifting the summand bar 713T3.

In order to prevent that the same digit element is twice transferred into the summing device SU, the transfer bars 101 corresponding to the same digit element are blocked by the pick-up bars 95S in storing device S and 95T in the storing device T in such manner that only one of the two corresponding transfer bars 101s or 101t can be shifted. The pick-up bars 95S and 95T are provided with correspondingly arranged blocking projections cooperating with blocking projections on bars 101, as shown in Fig. 9 in a simplified manner.

Fig. 8 shows that five transfer bars 101 abut against the cross piece 130 of each summand bar 713S. While only three transfer bars 101 abutting against the cross piece of each summand bar 713T are shown in Fig. 8, actually there are four transfer bars 101 provided for each summand bar 713T, as shown in Fig. 9. Referring only to the digit element 1, the functions of the bars 101s1, and 101t1, cooperating with the summand bar 713S1, and the function of the transfer bar 101st1 cooperating with the summand bar 713T1 have been explained. Further transfer bars 101 are necessary for the tens transfer.

Tens-transfer

If the result is greater than 9, cut-outs in the summand bars 713 permit simultaneous raising of one of the result bars 110F10 and effect that in the next higher order a summand to which the carried over one has been added is transferred by a transfer bar 101 into the summing device SU where the result bars 110 sense the result. Assuming that in one denominational order a result greater than 9 has been obtained, and a result bar 110F10 has been raised, in the next decade a digit element increased by 1 must be transferred by a transfer bar 101. The decimal orders are not segregated in the summing device, but the result is transferred to a storing device. The sequence, in which this operation is carried out, is determined by a cam shaft 120 of the respective storing devices, which, starting from the lowest order introduces a summand broken up into digit elements from the storing devices S and T into the respective storing device. The result is then returned by bars 84 as shown in Fig. 5b. The summing device forms the sum of two digits in one decimal order, and if such sum exceeds ten, a unit is added during the following addition of the values stored in the next higher order. The orders are mechanically segregated only in the storing devices, while the summing device operates consecutively in each order.

Referring now to Figs. 7 and 8, if one of the result bars 110F10 is raised due to the fact that the result exceeds 9, the respective result bar F10 engages a lever 211. Lever 211 is fixed on a shaft 212' to the other end of which a leaf spring 213 is secured. Leaf spring 213 projects into a cut-out of a tens transfer bar 850 which is provided with projections 851 cooperating with cut-outs in the transfer bars 101.

When the lever 211 is pivoted by a result bar 110 F10, the leaf spring 213 pivots with the shaft 212' and raises the tens transfer bar 850. The raised transfer bar 850 remains in its raised position effected by the motion transmitting means 211, 212', 213 until the result has been transferred from the storing devices in the following denominational order. For this purpose a locking bar 107 is provided which is shifted by a spring 108 into a shifted position in which the projection 107' projects into a cutting out 852 of the tens-transfer bar 850.

In the event of a tens-transfer, transfer bars 101 have to transfer:

| instead of: | the elements: | to obtain the value: |
|---|---|---|
| 0 | 1 | 1 |
| 1 | 2 | 2 |
| 2 | 3 | 3 |
| 3=3+1 | 3+1 | 4 |
| 4=3+1 | 5 | 5 |
| 5 | 5+1 | 6 |
| 6=5+1 | 5+2 | 7 |
| 7=5+2 | 5+3 | 8 |
| 8=5+3 | 5+3+1 | 9 |
| 9=5+3+1 | 5+3+2 | 10 |

In the case indicated in the last line of the table, the combination 5, 3, 2 which otherwise never occurs, causes the shifting of a result bar 110F10 so that in the next operation another tens transfer takes place.

As pointed out above, raising of a result bar 110F10 results in shifting of the tens transfer bar 850 which is provided with projections cooperating with cut-outs in the transfer bars 101.

In Fig. 8 five transfer bars 101 engage the cross piece 130S of the summand bar 713S1. The first transfer bar 101s1 is used for transferring a digit element 1 stored in a storing device S. The second transfer bar 101t1 is used for transferring a digit element 1 stored in a storing device T which is to be transferred to the summand bar 713S1 so as to simplify the operation as described above. A third transfer bar 101tt1 corresponding to 101s1 is provided for transferring a digit increased by 1 in the event that the preceding computing operation has had a result greater than 10 so that the tens transfer bar 850 has been raised and has locked the transfer bar 101 which normally would have been actuated by the digit stored in one of the storing devices, and has unlocked the transfer bar 101tt1. If the transfer bar 101tt1 is shifted instead of transfer bar 101s1, the digit transferred to the summing device is increased by the carry over one. The transfer bar 101tt1 must be used when one of the values 1, 3, 5 or 8 is to be transferred, see table above.

Since the addition of 1 to the stored digit can be always carried out in the storing device S there is no need to provide a transfer bar corresponding to 101tt1 for shifting the summand bar 713S1 in the event that a tens transfer is necessary. A further transfer bar 101stt1 cooperating with summand bar 713T1 is provided, however, to add the carried over 1 in the event that the summand bar 713S1 is already being shifted by one of the transfer bars 101 cooperating with the same. The carried over 1 is then represented by the shifted summand bar 713T1. Cutouts in bar 850 permit shifting of transfer bars 101 for transferring digit elements to the summing device in raised position of bar 850.

Storing of complement and negative values

The transfer device TR is also used for complement computing by which subtractions are carried out. In the event that positive and negative values are booked by the bookkeeping machine in the credit and debit columns, a subtraction is carried out by adding the complement value with reference to 9.

The following table shows the six cases which may occur in accounting, using the numbers 36 and 25 by way of example.

(1) Typed +36     computed     36
    Stored −25     complement     974
    Result +11                 −1010
                                     −1

(2) Typed +25                        −25
    Stored −36     complement     963
    Result −11     complement     −988

(3) Typed −25     complement     974
    Stored +36                        36
    Result +11                 −1010
                                     −1

(4) Typed −36     complement     963
    Stored +25                        25
    Result −11     complement     −988

(5) Typed −25     complement     974
    Stored −36     complement     963
    Result −61     complement     −1937
                                     −1

(6) Typed +25                        25
    Stored +36                        36
    Result +61                        61

In the above table numbers are expressed positive, negative and as complements to 9 in a known manner. When the values stored in storing devices are transferred, it is necessary to indicate whether such numbers were positive, negative or complements, and for this purpose the storing devices are provided with the so-called K- decade as described with reference to Figs. 5a and 5b. The K-decade is actuated after the shaft 120 and cams 121 have actuated all other decades C to M. In this K-decade an element, for instance 2, is stored if a complement value is to be stored, and two elements, for instance 2 and 5, are stored if the stored value is to be negative. The storing of the elements 2, or 2 and 5, respectively, is effected by the input bars 84 which indicate by their relative position, whether the result is positive, negative or a complement value when the K-decade is actuated by the shaft 120 in the storing devices during storing.

For storing a negative value of a complement value in the K-decade of a storing device, bars 407 and 408 are provided which may be located in a storing device S, in the transfer device TR, or in the summing device SU, as shown in Fig. 8. The bars 407 and 408 are raised by a magnet, not shown, or by springs 296, Fig. 12, if a minus key 804 is struck in the typewriter, see Fig. 4, or if the carriage of the typewriter arrives at a column in which negative accounts are listed. In such columns a contact is provided on the carriage in a similar manner as shown in Fig. 6, or on the drum 6a shown in Fig. 3a, for closing an electric circuit by which a magnet, not shown, is energized. The energized magnet closes a clutch connecting a cam shaft cooperating in the springs 296, or directly raises both bars 407 and 408 if a complement negative value is to be stored.

If it is required that the value is stored only negative, for instance in a debit column, the respective column contact on the carriage energizes a magnet to raise only the bar 408.

As shown in Fig. 12 the bars 407, 408 cooperate with the levers 208, 210 for blocking the input bars 84r2 and 84r5. During actuation of the K-decade the springs 296 are actuated to raise bars 407, 408 for release of bars 84r2, r5. In order to store the element 2 in the K-decade of a storing device to indicate complement values, or the elements 2 and 5 to indicate negative values, the input bars 84r2; or 84r2 and 84r5, corresponding to the digit elements 2 and 5, respectively must be shifted by springs 702 to turn the levers 93 and thereby the comb member 90, see also Fig. 9. The bars 407 and 408, however, permit only in raised operative position shifting of the input bars 84r2 and 84r5 and constitute in inoperative position a blocking means for the input bars 84 in the K-decade. Bars 407, 408 may also be arranged to cooperate with bars 713S2 and 713S5. In this event springs 702 actuate bars 101s2, 101s5 in the K-decade.

Referring now to Fig. 11, the elements 2, or 2 and 5 respectively, when stored in the K-decade permit the operation of classifying pick-up bars 400 and 401 which, similar to the pick-up bars 95 and tens-transfer bar 850, are provided with projections cooperating with projections on the transfer bars 101, and permit movement only of transfer bars 101 which correspond to negative, or complement values respectively. The locking bar 107 is shifted as described with respect to the tens-transfer to hold bars 400 and 401 during computing, and to release the same at the end of the operation. The complement bar 401 has to be raised if a complement value is to be picked up, and the minus bar 400 has to be raised if the value is to be negative. Two leaf springs 400' and 400'' are riveted to the minus bar 400. If a negative value is indicated in the K-decade by stored elements 2 and 5, the bars 400 and 401 permit shifting of the respective transfer bar 101s2 and 101s5 in the K-decade to an operative position in which the cut-outs s2' and s5' are aligned with the projections 400', 400'', and the cut-out s2'' is aligned with the leaf spring 401' only one leaf spring being provided on the complement bar 401. Immediately after the transfer bars 101s2 and s5 have been shifted, the bars 400 and 401 are raised by the springs 290, which is made possible by the shifted transfer bars 101 permitting entering of the leaf springs 400', 402', and 401' into the corresponding cut-outs. In Fig. 11 only the two bars 101 are shown which are operated in the K-decade, but it will be understood that the bars 400 and 401 cross all transfer bars 101 and are provided with projections cooperating with corresponding projections on the transfer bars 101. The arrangement is such that if a complement value is to be transferred instead of the normal value, the projections on the complement bar 401 block all transfer bars corresponding to normal values during the actuation of the storing device, and simultaneously permit shifting of transfer bars 101 expressing the complement value. The leaf springs 400', 400'', and 401', however, are lifted off the bars 400 and 401 when the transfer bars 101s2 and 101s5 have to be shifted in the following decade. After all values in all decades have been picked up by the pick-up bars 95, and are transferred by the transfer bars 101, the supporting springs 296 are released by the cam shaft actuating the same, and the bars 400, and 401 respectively drop to their former positions.

With respect to the tens transfer it was explained that in addition to the bar 101s1, a transfer bar 101tt1 cooperating with result bar 713S1 and a transfer bar 101stt1 cooperating with 713T1 are provided for transferring the element 1 in the event that in the preceding decade the number 9 was exceeded. In a similar manner the storing of the elements 2 and 5 in the K-decade effects that during the consecutive pick-up of the digits stored in a storing device, the transfer bar 101s1 is blocked by bars 400 and 401 and transfer bars 101 are released which correspond to the complement number 8 reduced to the elements 3 and 5. In addition to the already described transfer bars, two further transfer bars, namely 101tk and 101ttk have to abut against the cross piece 130S of each result bar 713S for expressing a complement value, and a complement value for a tens transfer.

Since in the storing devices negative values in the result can be stored as complement values, it is not necessary to transform them again to complement values needed for a further computing operation, but they can be entered directly into the summing devices SU as complement values so that no transfer bars 101sk1 to sk5 have to be provided, and this of course concerns as well the tens transfer so that the respective digit can be transferred from the storing device T by the transfer bars 101tk and 101ttk abutting against the cross piece 130S of the respective summand bar 713S. This is why the transfer bars 101tk and 101ttk have t indices.

A further transfer bar 101sttk for complement values must be provided on each cross piece 130T of one result bar 713T for a tens-transfer and serves for transferring complement values.

Summarizing, the transfer device comprises five transfer bars 101 abutting against each summand bar 713S, and four transfer bars 101 abutting against each summand bar 713T. The following transfer bars are cooperating with summand bars 713S:

Transfer bar 101s serves for transferring a digit element from a storing device S,

101t serves for transferring a digit element from a storing device T, if the same digit element is not stored in storing device S,

101tt serves for transferring a value increased by 1 for a tens transfer,

101tk serves for transferring a complement value from a storing device T if the same digit element was not stored in the storing device S,

101ttk serves for transferring a complement value increased by one for a tens transfer.

Cooperating with summand bars 713T:

Transfer bar 101st serves for transferring a digit element from the storing device T if the same digit element was stored in the storing device S, 101stt serves for transferring a value increased by 1 for a tens transfer if the result bar 713S is occupied, 101stk serves for transferring a complement value from storing device T if the result bar 713S is occupied, 101sttk serves for transferring a complement value increased by 1 from the storing device T in the event that result bar 713S is occupied. Due to lack of space only three bars 101 cooperating with bars 713T are shown in Fig. 8.

The arrangement of the bookkeeping machine

Figure 15A:
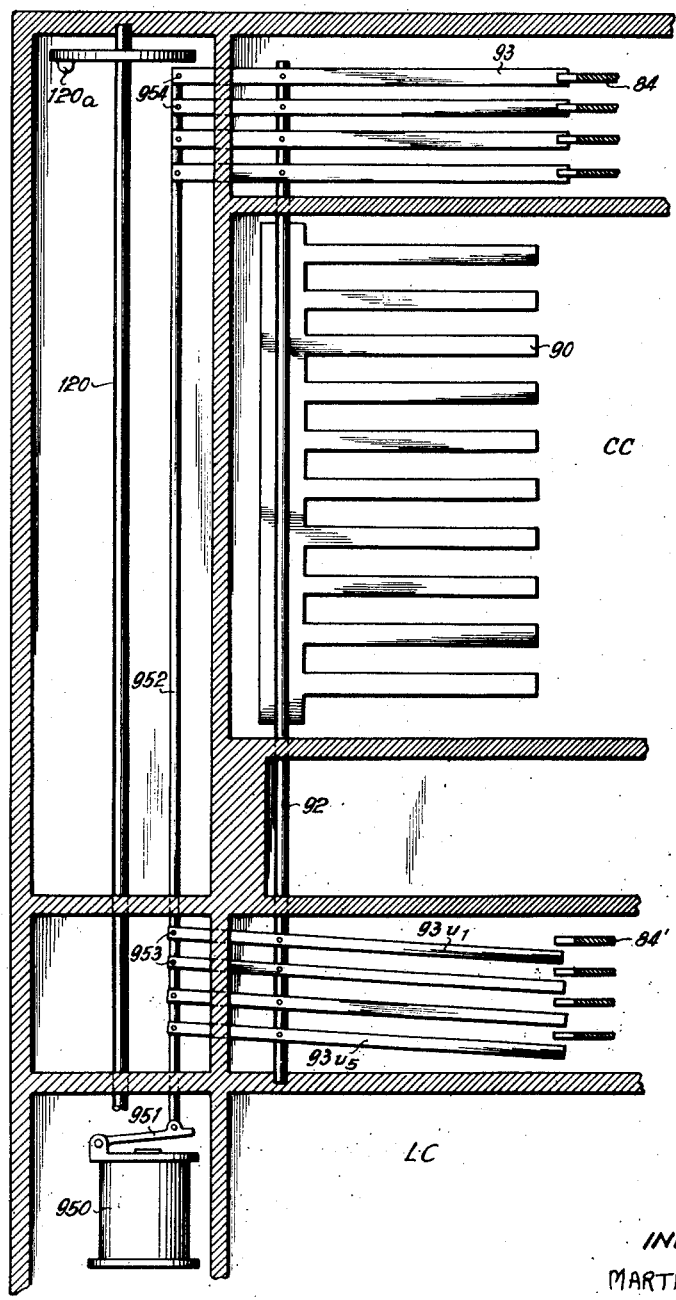
Fig. 15a is a fragmentary sectional view on line 15a—15a' in Fig. 15.

A preferred embodiment of the present invention is a bookkeeping machine which serves for keeping accounts in the manner shown in Fig. 16. Fig. 16 shows a ledger sheet provided with lines and columns. Each column listing values which are used for computing operations is represented in the machine by a storing device S. The upper portion of Fig. 15 shows the arrangement of the column computing device CC, and the lower portion of Fig. 15 shows the arrangement of the line computing device LC. The respective reference letters CC and LC are shown in Fig. 15a. The column computing device includes a summing device SU; a transfer device TR; a plurality of storing devices S for storing values; a type storing device T in which typed values, that are values derived from actuated typewriter keys, are stored which are used for computing operations; and finally a printing storing device TP from which the result is taken to be printed by the typewriter. The line computing device is arranged below the column computing device and includes corresponding summing, transfer and storing devices SU', TR' and S', while the type storing device T' is somewhat simplified. The printing storing device is omitted in the line computing device.

The summing device SU, the transfer device TR, and some of the storing devices S are shown in detail in Figs. 8, 7, and 5a.

In Fig. 15 only the result bars 110F, the summand bars 713S and T, the levers 207 to 211 are shown in the summing device SU, while the pick-up bars 95, the transfer bars 101, the input bars 84 and the locking levers 93 are indicated in the storing devices. Below the line computing device extends the horizontal pick-up cam shaft 97, and as previously explained, portions of cam shaft 97 are coupled by clutch means 97a when rotation of a cam shaft portion underneath a storing device is required for actuating the pick-up bars 95. In the respective storing device the levers 93 are actuated by the decade cam shaft 120, Fig. 5b, to engage the respective input bars 84.

Two storing devices T and TP are provided in which a typed value is simultaneously stored, but picked up separately. This is necessary since typing and printing is carried out from the left to the right, that is starting with the highest denominational order, while the computing operation must start with the lowest order in order to obtain a correct tens transfer. Consequently, the orders must be picked up from the storing device T and the storing device TP in reversed order, and the respective decade cam shafts 120 must be provided with cams 121 which actuate the locking members 94 of the storing devices T and TP in reversed order.

The type storing devices T of the column computing device, and the type storing device T' of the line computing device are connected by pick-up bars 604 which take the place of the pick-up bars 95 in the storing devices S, as shown in Fig. 5b. Consequently the lower type storing device T' is not provided with the resilient comb member 90, 90' or locking members 94, since the pick-up bars 604 are provided with corresponding projections in their upper portions located in the type storing device T and in their lower portions located in the type storing device T'. A value stored by typing without printing in type storing device T causes a certain position of the four pick-up bars 604 when the same are raised by pick-up cam shaft 97 and springs 96, and the lower portions of the pick-up bars 604 of course assume the same position so as to cooperate with the transfer bars 101' in the same manner as the upper portions of the pick-up bars 604 cooperate with the transfer bars 101.

Storing operations

The following operations are required for storing a value simultaneously in the type storing device T, the printing storing device TP and in the type storing device T'.

(1) Actuation of a typewriter key 8. No printing necessary.

(2) Engagement of the leaf spring 24 with the projections on the combination bars 30 to 35.

(3) Actuation of the starting member 19, 20, Fig. 1d, for shifting clutch 23' into engaged position so that shaft 23 is rotated.

(4) Actuation of the actuating bar 36 so that the combination bars 30–34 are shifted.

(5) Shifting of the input bars 84 unlocked by levers 81, 83 by springs 702 and 200 (Figs. 10 and 17).

(6) Raising of the locking members 94 in the lowest order of the storing devices T and TP by one, or two cam shafts 120 (Figs. 5a, 5b).

(7) Turning of the storing combs 90 in the storing devices T and TP by levers 93 actuated by the input bars (Figs. 5a, 5c and 10).

(8) The decade cam shafts 120 are again actuated by a control shaft to lower the locking members 94 so that the turned storing comb teeth 90 are arrested (Figs. 5a, 5b, 5q, 5r, 5s, 5t).

(9) The transfer cam shaft 720 rotates to a position permitting the input bars 84 to return to their initial position so that the storing combs 90 return to their initial position with the exception of the locked teeth 90 storing digit elements (Fig. 10, right portion, Fig. 9, Fig. 15).

(10) The actuating bar 36 is released, and the combination bars 30 to 34 return to their initial position and are ready for the next actuation by a typewriter key for storing a value in the next following order (Fig. 1).

From the above description of the consecutive operations it is apparent that the actuation of a typewriter key need not result immediately in the printing of the character, but only in the storing of the digit in the storing devices T and TP.

For picking up the values stored in the storing devices T and T', the pick-up bars 604 are raised by coupling the portion of the cam shaft 97 located underneath the storing device T (Fig. 15). First the lowest order is picked up, as described with reference to bars 95 in Figs. 5a and 5b, and then one order after the other is picked up when the coupling cam shaft 708 consecutively shifts the coupling members 98, 99 into coupling position (Figs. 5g, 5k). Every time some of the pick-up bars 604 are in raised position representing a digit stored in one order of the type storing device T, the transfer bars 101 are shifted by springs 702 and transfer cam shaft 720 to transfer the value into the summing device SU (Figs. 15, 8, 9). As explained with reference to Fig. 8, a digit stored previously in one of the storing devices S is added in the summing device TU to the digit stored in the same decade of the storing device T.

If simultaneous printing is required a coupling cam shaft 708 simultaneously shift the coupling members 98, 99 of the printing storing device TP in reversed order. Printing is effected by release of the output bar 84a (Fig. 17) which permit shifting of the combination bars 30 to 34 from which the result is taken from springs 24a which actuate members 53, as described with reference to Fig. 1.

During the computing the following operations take place:

(1) The coupling member 98 is shifted in the lowest order parts of the storing device T and of the storing device S in which a value has been stored by a previous operation. The coupling cam shaft 708 acts on the coupling members of several storing devices as shown in Fig. 5k.

(2) The clutches 97a, c of the respective storing devices S and T are engaged so that the pick-up bars 95 in the storing device S and the pick up bars 604 in the type storing device T are raised and express by their relative position the digit stored in the respective order.

(3) After a short time, about 10 milliseconds, the transfer cam shaft 708 releases the bars 713 so that the transfer bars 101 shift through the cross pieces 130 the summand bars 713. This operation is simultaneously carried out in the column computing device in the upper portion of Fig. 15 and in the line computing device in the lower portion of Fig. 15. In the transfer device TR a tens transfer is carried out if the tens transfer bars 850 was shifted in the preceding decade.

(4) 10 milliseconds after the summand bars 713 have been shifted, the pick-up cam shaft 97 is actuated to perform one revolution and through springs 296 resiliently raises all result bars 110 so that those result bars 110 which are released by cut-outs in the summand bars 713, pivot the levers 207 to 210 and unlock the input bars 84, Figs. 8 and 9.

(5) At the same time as the result bars 110 are raised, the transfer bars 101 are returned by the springs 702 which are released by the cams of the transfer cam shaft 720. The summand bars 713 are still locked by the raised result bars 110 so that the transfer bars 101 are disengaged from the cross pieces 130.

(6) Another 10 milliseconds later the pick-up cam shaft 97 releases the pick-up bars 95 and 604 so that the same return to their lower inoperative position.

(7) Another 10 milliseconds later the coupling cam shaft 708 is actuated and retracts the coupling members 98.

(8) Since the result obtained in the summing device SU is to be stored in the storing device S, the respective decade cam shaft 120 raises the locking member 94 in the respective decade of the storing device S.

(9) The result is now stored in the storing device S. The transfer cam shaft 720 and springs 702 shift those input bars 84 which are unlocked by the levers 207 to 210 whereby the storing comb 90 of the storing device S is turned through levers 93 which were permitted by the correspondent cam shaft 120 to fall into cut-outs in the input bars 84.

(10) The decade cam shaft 120 is again actuated, and lowers the locking members 94 to store the digit elements in the storing device S.

(11) The input bars 84 are released and returned to their initial position.

(12) The result bars 110 of the summing device SU are lowered by pick-up cam shaft 97 and springs 296 whereby the summand bars 713 are unlocked, and are returned by springs 220 to their initial position in which the cross pieces 130 engage the ends of transfer bars 101.

*Actuation by cam shafts*

Referring now to Figs. 9, and 3a and 3b, the motor 5 drives through the shaft 6 the transmission means 3, connected to shafts 4. The carriage of the typewriter is moved to the starting position at the beginning of the line when the clutch 6b is engaged. A spring which may engage the carriage directly, or be located in the drums 6a moves the carriage during typing. The motor 5 drives all vertical and horizontal cam shafts which in turn actuate the cam shafts 120 and 708.

A preferred embodiment has been described in which the cam shafts are mechanically driven, it is however, also possible to drive the cam shafts by electric magnets 199 so as to cause step-wise shifting of the same, and to actuate the supporting springs 96 for lifting the pick-up bars 95 by electric magnets, Fig. 18.

For mechanical actuation two types of shafts are required:

(1) Shafts, that move step by step, are turned a step for actuating each order, and remain at a standstill until the next order is actuated, for instance the decade cam shafts 120 and the coupling cam shafts 708. These cam shafts actuate elements of the storing devices when rotating, and exert no influence on the elements when at a standstill in the intermediate position. In Fig. 9 a decade cam shaft 120 and one coupling cam shaft 708 are shown.

(2) Shafts which perform one revolution during computing in each denominational order so as to actuate supporting springs. The cams of these shafts are so arranged that an accurate timing of the operations is assured. At the end of each revolution of the cam shafts which rotate one revolution during each decade, the decade cam shaft 120, and the coupling cam shaft 708, are actuated by the same to perform a step. This is similar to the known arrangement in which after each revolution of a gear corresponding to a lower decimal order, a gear corresponding to the next highest decimal order is actuated to perform one step.

*Input and output*

The input bars 84 cooperate with the levers 93 of the storing devices in a previously described manner to turn the storing combs 90. In accordance with the arrangement of the storing devices the storing is produced by shifting the input bars 84 from the right to the left, or from the left to the right, in Fig. 10.

Fig. 10 is a plan view of the arrangement schematically illustrating the input bar 84 passing through the summing device SU, several storing devices S, and the type storing device T and the printing storing device TP. The output bars 84a pass only through the storing devices T and TP. Only one input bar 84, one lever 93 in each storing device S, and one bar 84a is shown for the sake of clarity.

The input bars 84 perform the following operations:

(1) Values typed in the typewriter must be recorded in the two storing devices T and TP. For this purpose the respective storing levers 93 project into cut-outs in the input bars 84, while the corresponding storing levers 93 in the storing devices S are out of engagement with the input bars 84 and must be actuated by rotation of the respective decade cam shaft 120 by means of cam 120a to move into the cut-outs. In accordance with the column in which the respective number is to be typed, an abutment on the carriage or on the drum of the typewriter corresponding to the column actuates the decade cam shaft 120 which may be common for the two storing devices T and TP and releases the storing levers 93T and 93TP to fall into the respective cut-outs. Shifting of the input bars 84 would be blocked by the blocking levers 207 in the summing device SU, and therefore a cam on the pick-up cam shaft 97 raises by means of springs 296 the result bars 110 for a short distance so that the same pivot the blocking levers 207 to 210 to release the input bars 84.

As previously described, the actuation of a key 8 results in a combination position of the combination bars 30 to 34, which through transfer levers 81, 83 unlock the respective input bars 84 permitting shifting of those input bars 84 which correspond to the combination. The shifted input bars 84 store the value in the type storing device T and the printing storing device TP simultaneously. Referring to Fig. 10b, according to a preferred embodiment of the invention the upper lever arms 81 engage wide cut-outs 301 in the combination bars 30 to 34, see also Figs. 3c, 3d and 3e. During rotation of the cam shaft 85 the cams 85', Fig. 3d, pivot the lower arms 83 out of the path of the projections 84b so that the input bars 84 are freely movable. Simultaneously the upper lever arms 81 move in the wide cut-outs 301 of the combination bars. Only while a number is stored by typing, the cams 85' shift the lower lever arms 83 into a position engaging the lateral face of the projection 84b so as to block movement of the output bars 84a, unless shifted combination bars 30 to 34 shift the transfer levers 81, 83 into a releasing position. The input bars 84 are blocked in two places, namely in the summing device by the blocking levers 207–210, and at their ends by the transfer levers 81, 83. To permit shifting for a transfer of results from the summing device SU into a storing device S, the levers 81, 83 must be in an intermediate position. As shown in Fig. 10a, the lower lever arm 83 of each transfer lever 81, 83 has three different positions A, B, C. The cams 85' shift the transfer levers 81, 83 into the intermediate position B if nothing is to be stored. In the intermediate position B, the upper lever arm 81 engages the left side of the cut-out 301 in Fig. 10b. Only when the carriage arrives in a column in which a computing operation is to be carried out, and a value is to be stored so that the cam shaft 85 performs a revolution, the upper lever arms 81 are urged by cam shaft 85 and cams 85', see Fig. 3d, to the position shown in Fig. 10b engaging the right side of the cut-out 301 so that the transfer levers 81, 83 are pivoted when the combination bars 30 to 34 are shifted.

(2) The results obtained in the summing device SU, and represented by the result bars 110 and pivoted blocking levers 207 to 210, have to be transferred into storing devices S. Those blocking levers 207 to 210 which are not pivoted by the result bars 110 block the corresponding input bars 84. The lever arm 83 is in its inoperative position B in which it cannot block the projection 84b. When the input bars 84 are shifted by springs 200 or 702, the results represented by the position of the pivoted blocking levers 207 to 210 is transferred to the storing device S whose storing levers 93 have been released by the respective cam shaft 120 to fall into the cut-outs of the input bars 84. The respective cam shaft 120 is actuated by the carriage or by the drum 6a.

(3) Since the printing is carried out in reverse order, a result which is to be printed has to be first transferred from the storing device S in which it is stored into the printing storing device TP. According to a preferred embodiment of the present invention a result stored in the storing device S is transferred in reversed order of the denominational orders into the printing storing device TP. For this purpose the coupling cam shaft 708 is rotated in opposite direction through a reversing gear, not shown, and shifts the coupling members 98, 99 in reverse order so that the highest order is first picked up by the pick-up bars 95 in the respective storing device S. The digit stored in the respective order and represented by the position of the pick-up bars 95 is then transferred by transfer bars 101 into the summing device SU where it is added to zero, no value being typed, so that the result bar 110 and the blocking levers 207 to 210 represent the digit contained in the respective order in the storing device S. In the manner described above, the result is then transferred by the input bars 84 into the printing storing device TP. Since the decimal orders are picked up from the storing device S beginning with the highest decimal order, the type storing device TP contains the result in reverse order which is necessary for printing the result from the left to the right beginning with the highest decimal order.

During transfer of the result from the summing device SU to the printing storing device TP only the storing levers 93 of the storing device TP engage the input bars 84, while all other storing levers 93 are pivoted by the respective decade cam shaft 120 into a position releasing the input bars 84. In the event that it is desired to use the result, which is being printed, for further computing operations, the respective decade cam shaft 120 releases the storing levers 93 of the storing device T so that the result is stored again and for use in further computing operation.

(4) The result stored in the printing storing device TP must now be transferred to the combination bars 30 to 34 for printing by means of the typewriter. The pick-up bars 95 of the printing storing device TP extend upwardly beyond the storing device and engage cut-outs in the output bars 84a, while in inoperative lower position, see Fig. 10. When the pick-up bars 95 in the printing storing device TP are raised, the corresponding output bars 84a are released and can be shifted by springs 200' or 702. By means of the projections 84b on the output bars 84a the pivoting of the transfer levers 81, 83 due to the action of the cam shaft 85 is controlled whereby the result is transferred to the combination bars 30 to 34. During printing the output bars 84a are shifted from the position 1 to the position 2 in Fig. 10a so that the projection 84b' is located opposite a lower lever arms 83. In this position the respective output bar 84a remains if no element is picked up. In the event, however, that the pick-up bars 95 of the printing storing device TP indicate in raised position that the respective digit element is stored, the output bars 84a can be shifted to the position 3 in Fig. 10a so that the projection 84b' is located on the other side of the lever 83, and the cam shaft 85 can pivot the lever arm 83 towards the output bar 84a so that the upper lever arm 81 shifts the corresponding combination bar to operative position.

In some embodiments it is desirable to pick up a result stored in a storing device, in reverse order, so as to avoid transferring of the result to the summing device and back to a storing device. In this event the decade cam shaft 120 of the respective storing device is provided with two sets of cams arranged spaced from each other a short distance in axial direction so that by axially shifting the shaft for the thickness of the cams one or the other set of cams actuates the corresponding elements in the storing device. The two sets of cams are so arranged as to shift the coupling members 98 in reversed order which results in a pick up of the digits stored in the decades of the storing device in reversed order. For transferring value between the line and column computing devices LC and CC, the construction shown in Fig. 15a is preferably used. If a result represented by the bars 84' is to be transferred to bars 84, the magnet 950 is energized by a carriage contact (as in Fig. 6) and disengages the levers 93 from bars 84, while connecting the levers 93u1–u5 to the bars 84'. The blocking levers 93 are actuated through bar 952 and pins 953, 954. These pins are so constructed as not to obstruct small pivoting of the levers, and permit cam 120a to actuate levers 93 without shifting bar 952.

Values that are to be stored must be typed, but need not be printed. Such values may be shown in an indicating device so that a typed value can be corrected before the final result is printed on the ledger sheet of the bookkeeping machine if an error occurs. The typed numbers contain the digits without indication of their decimal place. In contrast thereto the number which is printed in a column of the ledger sheet must be in a predetermined position with respect to the numbers previously printed in the same column, namely, the decimal points of all numbers in one column must be arranged below each other.

Moreover, if a number corresponding to cents is printed it is necessary to print a zero before the decimal point and if the value is also below ten cents, to print one zero after the decimal point, which must be automatically done by the bookkeeping machine. In order to place the printed number in correct position, each number must be typed to the last decimal place.

For instance:

| | |
|---|---|
| 3 is typed | 0.03 is printed |
| 35 is typed | 0.35 is printed |
| 315 is typed | 3.15 is printed |

Consequently, means must be provided for printing the digits in predetermined places when the printing storing device TP effects printing in a column of a ledger sheet. If in the printing storing device only the number 3 is stored in the highest order whereupon the storing device was stopped at the second highest decimal order, the fact that only one digit was stored in the storing device indicates that this number must be printed in the lowest order as cent value, while in the event that the two numbers are stored in the two highest orders of the storing device, a ten cent value and a one cent value must be printed.

For this purpose a tabulator key 803, Figs. 4 and 17, must be actuated after the typing has been concluded, that is in the first case the tabulator key must be actuated after the number 3 has been typed. From the position of the storing device and of the decade cam shaft 120 of the same, the decimal place of the printed number can be derived.

It is possible to arrive at the correct position by actuating the space bar so that the carriage is shifted in consecutive steps. A tabulator device must shift the carriage to the correct position within the column of the ledger sheet. The angular position of the decade cam shaft 120 of the storing devices T and TP decides the distance for which the carriage is shifted while simultaneously the decade cam shaft turns to zero initial position so as not to obstruct the movement of the coupling members 98 and of the pick-up bars 95. In the event that in the unit decimal order, in the tenth decimal order and in the hundredth decimal order, that is in the decades U, D, C, Fig. 5b, no number greater than 0 is present, automatic zero typing in these decimal places is required while the carriage moves to its correct position. Consequently the carriage must only be shifted to the unit decimal place without printing and then zeroes must be printed if no number is stored in the lowest three orders. The tabulating device only shifts the carriage to the unit decimal order whereupon the carriage moves in steps while simultaneously zeroes are printed.

The distinction between no printing movement of the carriage and zero printing movement of the carriage can be obtained by the arrangement of the combination bars 30 to 34. For instance the combination 2 plus 1 which is otherwise not needed since the digit element 3 is represented by a combination bar, is used for indicating movement of the carriage without printing, and no combination bar is shifted when a zero is printed at each step of the carriage. This arrangement has the advantage that if zero values occur between numbers in the decades of the storing devices, no element has to be stored, so that the storing comb 90 need not be bent.

According to a preferred embodiment of the invention, a zero bar 30a, Fig. 1, is arranged adjacent to combination bar 30, and such zero bar is always shifted if the carriage moves without printing. The zero bar is shifted by a cam, or by a magnet, and is provided with a cut-out cooperating with one pick-up spring 24a in such manner that, if all other combination bars are in inoperative position, the zero bar actuates the space bar due to the engagement of a pick-up spring 24a in the cut-out of the zero bar. On the other hand when the zero bar is in, or returned to normal position, another pick-up spring is engaged which effects actuation of the member 53 corresponding to the zero type. When a number is typed and stored, the tabulator key 803 is actuated, and the printing as well as the computing starts.

Referring now to Figs. 10 and 17, at the upper end of the decade cam shaft 120 in the storing device TP, cams 308 to 311 are arranged which correspond to the combination of elements representing the numbers from 1 to 9. The cams 308 to 311 cooperate with levers 300 to 304 which are rockable on shafts 300' to 304' between two positions, and in one position engage input bars 84 and a fifth tabulator input bar 84T. The combination represented by the position of the cam 308 to 311 in the end position is transferred by the input bars 84 and 84T to shift the carriage to the correct decimal place. If a tabulator step is to take place, beside the input bars 84 the fifth input tabulator bar 84T is shifted so that not the combination represented by the four input bars 84, but a tabulator bar 330 is actuated, which is shifted and projects into the path of a stop 2T on the carriage 2. Consequently the carriage moves to the unit decimal order, or if a number of digits has been stored, to the highest decimal order in which the printing has to take place.

Assuming a storing device for nine decimal orders the position of the cams 308 to 311 on the shaft 120 effects a shifting of the carriage as follows:

| Typed | Carriage Steps | To decade |
|---|---|---|
| 1 digit | 6 | U |
| 2 digits | 6 | U |
| 3 digits | 6 | U |
| 4 digits | 5 | T |
| 5 digits | 4 | H |
| 6 digits | 3 | TH |
| 7 digits | 2 | TT |
| 8 digits | 1 | HT |
| 9 digits | 0 | M |

When the carriage arrives at the decimal order U, the zero bar is shifted to normal position and from there on instead of non-printing movement of the carriage by means of the space bar, or tabulator jump, the printing device prints zeroes, whereupon the values stored in the storing device are picked up. The tabulator bars 330 can be actuated by magnet as well as by the pick-up springs 24a. If a jumping of the carriage to the proper position is not required, actuation of the tabulator key 803 effects return of the decade cam shaft 120 step by step until it arrives in the zero position, and the supplementary steps effect the correct number of carriage steps by actuation of the space bar so that a carriage is guided to the correct position for printing in the respective column. In these decades the storing device contains the value zero, so that the pick-up of the storing device results in actuation of the space bar and to movement of the carriage in single steps.

Referring again to Fig. 17, the five levers 300 to 304 are engaged by projections 305 on a rod 306, and held by the same in raised position disengaged from the input bars 84 and the bar 84T. Only when the tabulator key 803 is actuated and depressed is the rod 306 raised so that the projections 305 release the levers 300 to 304 permitting the levers to assume a position corresponding to the position of the cams 308 to 311 which are characteristic for the end position of the cam shaft 120 and of the condition of the storing device. When the input bars 84 are shifted by the springs 702, the combination is transferred to the combination bars 30 to 34 as previously described. Beside the pick-up springs 24a serving for identifying stored digits, further pick-up springs 24a' are provided for actuating stop bars 330. One pick-up spring 24a' is provided for each of the decades from C to M. One of these pick-up springs 24a' finds aligned cut-outs in the combination bars 30 to 34 and lifts the corresponding stop bar 330 which is shifted into the path of the projection stop 2T on the carriage 2, and stops the carriage at the respective decimal place. When the tabulator key 803 is depressed, the final position of the decade cam shaft 120 is expressed in the position of the carriage, whereupon the blocking rod 306 is lowered, permitting the decade cam shaft 120 to return to its initial position. As shown in Fig. 3a, the carriage is positively connected to the control drum 6a by gear means so that the stops 6d may be arranged on the control drum 6a instead of the carriage stops 2T. In this embodiment the cut-outs for the pick-up springs 24a' are not provided on the combination bars 30 to 34, but on extended portions of the input bars 84 so that the bars 6c corresponding to the stop bars 330 are actuated by pick-up members cooperating with the input bars 84 to engage stops 6d on the control drum 6a.

The printing of a ledger sheet

Referring now to Fig. 16, the operation of the bookkeeping machine according to the present invention will be explained by an example. A ledger sheet, as shown in Fig. 16, has ten columns. In column 1 each business transaction is recorded by number, for instance 54 321. The computing devices are not operated in this column, but the respective number is typed without storing. The same is true with respect to column 5 in which the respective business transaction is described, for instance a sale or a purchase. It is clear that in these columns the types may be electrically or mechanically actuated, for instance the keys for typing letters may be directly connected to the lever 65 by means of a linkage. The electrical actuation by means of the members 53 has been described with reference to Fig. 1.

In columns 2 and 3 the outstanding balance is entered, 2 is a debit column and 3 is a credit column. The operator moves the carriage to the respective column, in the first transaction the debit column, and this position of the carriage the drum 6e automatically operates a clutch so that the corresponding decade cam shaft 120 turns for a step each time a key is actuated. Since the storing devices can store ten digits, the decade cam shaft 120 moves through twenty positions, namely ten operative positions and ten intermediate positions. Every time the decade cam shaft 120 is in operative position, the corresponding coupling cam shaft 708 is in intermediate position.

The amount is simultaneously stored in a storing device of the line computing device and in a storing device of the column computing device, shown in Fig. 15.

For each digit of the stored number the decade cam shaft 120 moves two steps so that the five digits are stored in the first five decades of the type storing device T and the printing storing device TP. Since the debit column always contains negative values there is no need to operate the key corresponding to a negative value.

Means may be provided for indicating a typed number so that the operator may check whether the correct number has been typed. Thereupon the actuating key 803 is operated, Fig. 17, whereby the stops 305 release the levers 300 to 304 which engage the cams 308 to 311 of the corresponding decade cam shaft 120. Then rotation of the cam shaft 720 effects shifting of the input bars 84 which shift the combination bars 30 to 34 through the levers 81, 83. The particular turning angle of the decade cam shaft 120 causes shifting of the carriage by means of the tabulator for four steps. As shown in Fig. 17, the tabulator bars are controlled by springs 24a' and in the selected position each spring 24a' engages and lifts the tabulator bar which permits shifting for four steps. Thereupon the decade cam shaft 120 is shifted to initial position.

The storing in the type storing device T and the printing storing device TP has been already carried out. Now the value is picked up from the storing device T for computing purposes and from the storing device TP for printing. The pick-up starts at the lowest decimal order for computing since the coupling cam shaft 708 of the storing device T has performed four steps, while the decade cam shaft 120 has returned four steps to initial position. For recording purposes the number 12350 is added in the first storing device of the line computing device to the stored value zero for transverse addition. For the longitudinal addition the number 12350 is added to the value stored in the storing device corresponding to the column 2. Thereby the sum of the column is obtained. The storing device corresponding to the column 2 and the first storing device for transverse computing in the line computing device each have a decade cam shaft 120 and a common coupling cam shaft 708, the latter being actuated and going into a first operative position when the carriage arrives in the respective column. Thereby in the lowest decade of a storing device the coupling members 98 are shifted to operative position whereupon the springs 702 actuate the transfer bars 101 to shift the summand bars 713 of the summing device SU. At the same time the value zero in the lowest decimal order of the type storing device T is indicated by the pick-up bars 95 which are blocked and cannot be raised so that at first no transfer bar 101 is released for shifting by storing device T. Consequently in the line computing device the value zero is added to the stored value zero, while in the column computing device zero is added to the previously stored value. The pick-up shaft 97 and springs 296 in the summing device SU raise the result bars 110 whereby the summand bars 713 are blocked.

In this moment the coupling cam shafts 708 of the two storing devices turn to the intermediate position, and the decade cam shafts 120 of the two storing devices turn to the first operative position, while the locking members 94 are raised to permit passing of the storing combs 90. The value previously stored in the respective decimal order is simultaneously cancelled. Now the vertical cam shaft 720 presses the springs 702 against the input bars 84, which are controlled by the blocking levers 207 to 210 in the summing device SU. If for instance adding the value zero in the second storing device S to a stored value 6 results in the sum 6, the longitudinal summing device releases the input bars 84 corresponding to the elements 1 plus 5, and the corresponding storing combs 90 are turned to storing position, whereupon the locking members 94 are lowered by a further step of the decade cam shaft 120 so that the respective elements are stored. Simultaneously the common coupling cam shaft 708 of the second storing device, as well as of the first storing device of the line computing device, and the coupling cam shaft 708 of the type storing device T move to the next operative position to effect the pick-up of the next following decimal order while the corresponding decade cam shaft 120 moves from an operative position to an intermediate position.

At the same time the element 1 is picked up from the type storing device, transferred by the input bars 84 to the combination bars 30 to 33, and typed in correct order. The addition is carried out one decimal order after the other at the speed of 7 to 10 operations per second, until the type storing device T and the printing storing device TP are completely exhausted. Printing and computing is carried out in simultaneous steps. After the last decimal order the carriage is released so that it jumps across the credit column 3. In column 4 the date is printed which is taken from a date storing device S in which it was stored through the type storing device T. The date is picked up in each line from the date storing device and printed from the printing storing device TP in the same manner as any other stored value is printed.

In column 5 the transaction is effected by typing and printing, as described above, whereupon the carriage is shifted into the column 6 by means of the tabulator key. In column 6 deductions which are negative values, have to be added longitudinally, in the column computing device and subtracted transversely in the line computing device.

When the carriage arrives in the column 6, the bar 407 corresponding to negative values is shifted so that the transfer bars 101 transfer complement values into the summing device SU. After the value has been stored in a storing device, it is picked up as described with reference to column 2, and then automatically printed from the printing storing device TP. At the same time the positive value is added in the column computing device in which the respective bars 407 is not shifted. Thereupon the complement value is added to the value stored in the first storing device of the line computing device. The computing operation is carried out as follows:

| Stored value | 12350 (123.50) |
|---|---|
| Input value | 999999699 (−3.00) |
| (1) | 000012049 (120.50) |

At the highest decimal order a fugitive one appears, which indicates that the obtained difference is a positive value. The sign is obtained at the end of the computing operation when the K-decade is passed after the highest decimal order for digits. As in the other decades, the tens transfer bars 850 remain in raised position due to the action of a result bar 110F10 when the K-decade is reached and are held in this position by the locking bar 107 which is not laterally shifted in the K-decade until the storing device passes beyond the K-decade into the lowest decimal order. The fact that the tens transfer bar 850 remains in raised position effects:

(1) The computing operation is completed, and the fugitive one is added to the lowest decimal order, while in the other decimal orders zero is added to the stored value. Thereby the correct result 1200 is obtained. After arriving at the lowest decimal order the tens transfer bar 850 is released by the locking bar 107 and drops to its initial position unless the addition requires another tens transfer as is the case in the present example.

(2) In the event that there is no fugitive one, and that the tens transfer bar 850 is not raised, the digit element 2 is stored in the K-decade to characterize the negative value of the result which would have later on resulted in the complement indication of digit elements. A result bar 110F2 released in the summing device SU, as bar 407 in Fig. 8, unlocks the input bar 84 corresponding to the element 2 so that in the K-decade 2 is stored which indicates a complement value.

In column 7 the operations described with respect to column 2 are repeated. The recorded number is added to the value stored in the column 6 storing device of the column computing device, and to the value stored in the first storing device of the line computing device. The typed value is positive and the computing takes place simultaneously with the printing.

Thereupon the carriage automatically jumps to column 9 where the result is printed which is taken from the first storing device of the line computing device, while at the same time this amount is added in the eighth storing device of the column computing device. Consequently the printing must be done from the first storing device of the line computing device beginning with the highest decimal order, while simultaneously this storing device has to supply the typed values for addition to the value stored in the eighth storing device of the line computing device beginning with the lowest decimal order.

For this purpose the printing storing device TP is coupled to the input bars 84 when the carriage arrives in column 9 and stores the value 245,50 at the same time as it was stored in the first storing device of the line computing device.

After the decade cam shaft 120 has completed its revolution and has caused the corresponding steps of the carriage, and after the pick-up cam shaft 97 performed the corresponding steps, the coupling cam shaft 708 effects start of the printing beginning with the highest decimal order. For forming the sum in the eighth storing device the first storing device of the line computing device supplies the respective typed values by transferring the same to the type storing device T simultaneously with the storing of the sum. The pick-up bars 604 transfer the value into the column computing device. If a decade cam shaft 120 having two sets of cams is provided, it is shifted in axial direction to reverse the order of the operation of the respective cams so that the type storing device T distributes the digits beginning with the highest decimal order.

The automatic shifting of the carriage to the credit or debit columns 9 and 10 is derived from the storing device in the line computing device. The order K, which indicates the sign of the result, is the last to be actuated by the decade cam shaft 120 during the storing operation, but the first to be picked up. If the value 2 is picked up the K-decade, the result is stored as a complement value, and consequently negative so that it has to be printed in the debit column. While the carriage moves from column 8 to column 9 the column tabulator tends to move the carriage directly to the credit column. The action, however, is prevented if during the pick-up of the K-decade the value 2 was indicated. In this event a stop holds the carriage in the credit column from where the value is taken into the line computing device. The stop may be replaced by an electrical contact. The bars 84r2 and 84r5 may operate a contact which causes actuation of a magnet for shifting bar 35 for raising the carriage if special printing is required for negative values.

If a special key 811 is operated, the balance of the sheet is found by printing in each column the stored sums. During this printing such stored values are entered in the first storing device of the line computing device for positive credit values, and the results of the same are then picked up in the columns 9 and 10 and printed therein. Fig. 4 shows shift keys 800, actuating keys 803, a minus key 804, a clearance key 807, a carriage return key 805, a line transport key 806, a date key 809 and three balance keys 810, 811, 812 for showing the balance, the sheet balance and an intermediate balance.

Multiplication

For payroll accounting it is necessary to multiply working hours with the amount of the hourly wage.

Figure 13:
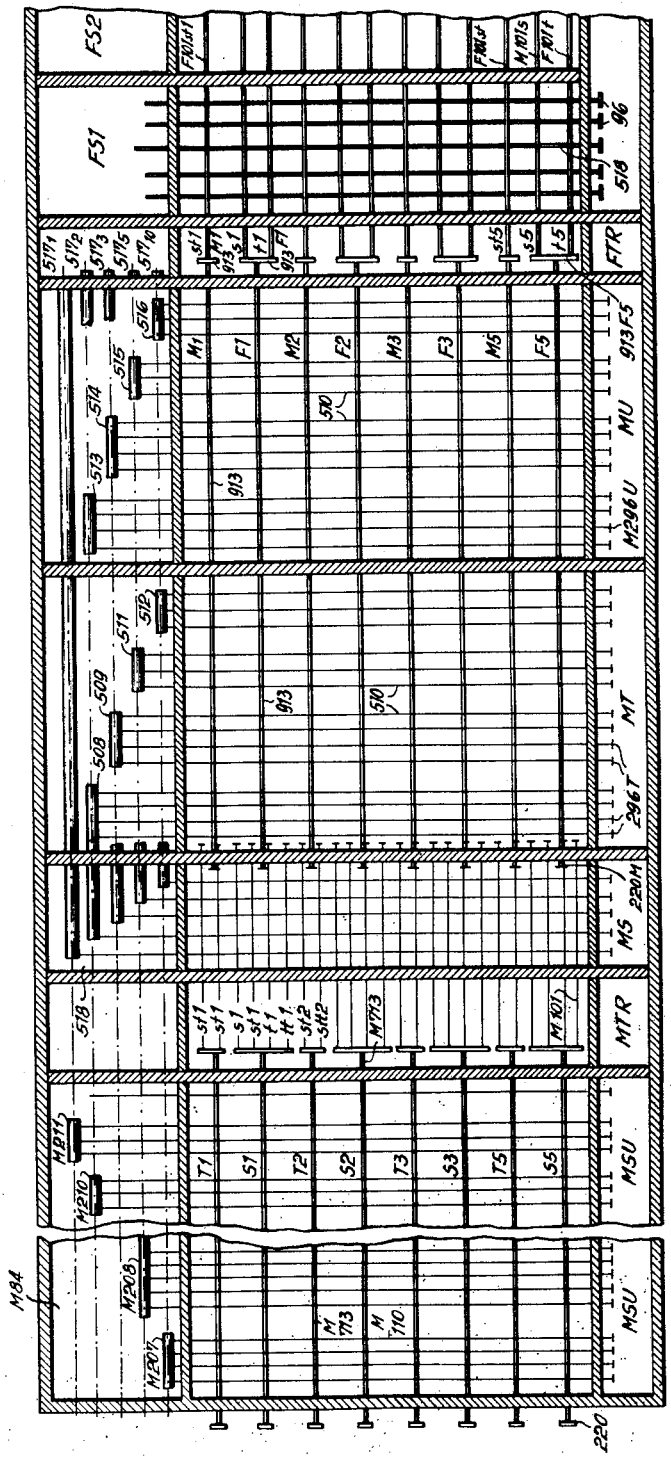
Fig. 13 is a schematic sectional view of a multiplication device.

For forming a product an arrangement shown in Fig. 13 is used. It comprises a summing device MSU, a transfer device MTR, storing devices MS, a first multiplying device MT for multiplying digits in the tens decimal order, a second multiplying device MU for multiplying digits in the unit decimal order, another transfer device FTR for the factors, a first factor storing device FS1 and a second factor storing device FS2. In the factor storing devices FS1 and FS2 the value for time and hourly wage are entered.

The factor storing devices FS1 and FS2 are constructed like the storing device shown in Figs. 5a and 5b. Several storing devices FS may be provided which are picked up in accordance with the column for transferring the factors of the multiplication to the multiplying devices MT and MU. It is also possible to connect the storing devices in a similar manner as the type storing devices T and T' by extended pick-up members 604 so that when values are stored in the storing devices of the line and column computing devices they are simultaneously recorded in one of the factor storing device FS arranged below it in another tier of the machine, as shown in Fig. 3a, from where the value may be taken later on for carrying out the multiplication. The combination bars 30–34 may also actuate electric contacts and magnets for shifting the bar M84 in the multiplication device. According to a modified arrangement an arrangement as shown in Fig. 19 is used for the input of values into the multiplication device.

Through the factor storing devices FS, factor transfer bars F101 extend horizontally, and abut against crosspieces of the factor bars 913F1 to 913F5, and 913M1 to 913M5. Th factor transfer bars F101 are crossed by pick-up bars 518 corresponding to the bars 95 in the adding devices, and provided with projections cooperating with cutouts in the factor transfer bars F101. The factor bars 913 are crossed by result bars 510, which correspond to the result bars 110 in the adding devices and are arranged in groups corresponding to the digit elements 1, 2, 3 and 5 cooperating with the levers 513 to 516 corresponding to levers 208 to 211 in the adding devices. The arrangement of the factor bars 913 and of the result bars 510 and of the levers 508 to 512 in the multiplying device MT is the same.

The levers 508 to 516 can be best seen from Fig. 14 which shows a cross-section through Fig. 13. Levers 508 to 516 are pivoted on shafts 517 at one end, and are pivotally connected at the other end thereof by pins 519 to the pick-up bars 518 corresponding to the pick-up bars 95 of the storing device illustrated in Figs. 5a and 5b. As can be seen from Fig. 14, the remaining structure of the storing device MS corresponds exactly to the storing device shown in Figs. 5a and 5b. The transfer bars M101 in the transfer device MTR abut against cross pieces of the summand bars M713 which are crossed by result bars M110. Result bars M110 are arranged in groups corresponding to the digit elements which engage and actuate blocking levers M207 to M211. Bars M84 are released by levers M207 to M211 to represent the result, and may close contacts for the actuation of magnets which lift the levers 207–211 in the adding device, and effect printing.

The operation of the arrangement shown in Fig. 13 for carrying out the multiplication will be best understood with reference to an example, for instance the multiplication of $12,345 \times 6,289 = 83,810,205$. The multiplication is carried out by breaking up the problem into a series of multiplications of two numbers having two digits, that is a unit digit and a tens digit, and will be best understood with reference to Fig. 14a.

First the two lowest digits are multiplied and then the higher decimal places are multiplied and the two results added by means of the summing device MSU. Table 14a shows how the sum of the tens, and the sum of the units is formed in about 20 steps of the decade cam shafts, and how the intermediate results are added in accordance with their decimal order.

First the two lowest digits are multiplied, unit×unit, in the example: $5 \times 9 = 45$. When the factors are stored in the factor storing devices FS1 and FS2, the coupling members M98 are shifted, the pick-up bars M95 are raised, and the factor transfer bars F101 are urged by springs to move to the left in Fig. 13. Similar to the arrangement described with reference to the adding devices, factor transfer bars M101s are provided for one factor, factor transfer bars F101t are provided for the other factor which abut against a cross piece of the factor bars 913F. Only if the same digit element occurs in both factors, factor transfer bars F101st, abutting against cross pieces of the factor bars 913M are required. If, for instance, the digit element 1 occurs twice such as in the product $1 \times 1$, the factor transfer bar F101st1 is shifted, and shifts the factor bar 913M1 against the action of a spring 220M.

The factor bars 913 are provided with cut-outs corresponding with projections on the result bars 510 in such manner that the result bar 510 of the unit digit contained in the product of the two factors is permitted to be raised by springs M296. In the example the unit digit of the product 45, that is 5, is represented by a raised result bar 510F5, which pivots the lever 516 connected to the pick-up bar 518 representing the digit element 5. In the factor storing device FS1, the factor transfer bars F101t1, t3, and st5 have been shifted corresponding to the factor 9, and in the factor storing device FS2 the factor transfer bar F101s5 has been shifted corresponding to the factor 5. F101t5 was also shifted but has no effect in the multiplication device. Consequently in the multiplication device MU the factor bars 913F1, F3, F5 and M5 are shifted. In this position of the factor bars a result bar 510FU5 can be raised which corresponds to the unit digit. In the multiplication device MT a result bar 913FU10 acting on lever 508, and a result bar 913FU30 are raised, the latter acting on the lever 511. These result bars 511 in the multiplication device MT are raised shortly after result bars 510 in the multiplication device MU are raised.

The intermediate result 45 of which the unit digit 5 is first received must be stored in a multiplication product storing device MS, Fig. 14, which is similar to the storing device shown in Figs. 5a and 5b and to the factor storing devices FS but of course not identical. A decade cam shaft 520 cooperating with the multiplication storing device MS is rotated and actuates through cams 530, the lever M93 so that the same fall into cut-outs in the bars 84. Thereupon another cam 531 effects storing of the value 5 in one storing device MS, as described with references to Figs. 5a and 5b. Shortly after that the supporting springs M296T in the multiplication device MT are urged upwardly by a cam shaft, while the corresponding springs M296U are released. This effects raising of the bars 518 in storing device MS corresponding to digit elements 1 and 3 so as to represent the digit 4 in the tens decimal order of the first product 45. The value 40 is stored in the tens decade of the storing device MS. After the number 45 is stored, the supporting springs M296T in the multiplication device MT are released and the next product is computed. By a suitable arrangement of the cams of the coupling cam shaft of the factor storing devices FS1, the coupling member 98 remains in coupling position that again the number 9 is picked up, while in the other factor storing device FS2, the coupling member 98 of the tens decade is shifted to coupling position so that the number 4 is picked up and transferred.

In this manner in accordance with Fig. 14a part products are formed by timed operations of the cam shafts and added in the corresponding decades of the result storing device MS. In the summing device MSU one summand is taken from the newly formed product, while the other summand is picked up from the result storing device and transferred to the transfer bars M101. The transfer bars M101 of the transfer device MTR are crossed by the pick-up bars of the result storing device and can be shifted in accordance with the stored value. For summing up the pick-up bar 518 performs the task which in the adding process is carried out by the pick-up bars 604 in the type storing device T. The pick-up bars 518 are provided with projections and cut-outs and control the transfer bars M101s to stt in a similar manner as described with reference to Figs. 7 and 8 for an adding operation. The bars 713 are shifted accordingly and the result is then expressed by the result bars M110.

The sequence of storing operations and pick-up operations in the correct decades is obtained by the arrangement of the cams on the coupling cam shafts of the factor storing devices, and of the decade cam shaft of the result storing device which have to cooperate in accordance with the table in Fig. 14a. In the present example 20 part products have to be formed whose unit decimal orders and tens decimal orders have to be added so that forty additions are required. This can be carried out in about four seconds.

It will be understood that each of the elements described above, or two or more together, may also find a useful application in other types of computing and bookkeeping machines differing from the types described above.

While the invention has been illustrated and described as embodied in a computing device in which the digits are represented by the relative position of a plurality of elements shiftable for a predetermined equal distance, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characterstics of the generic or specific aspects of this invention and, therefore, such adaptations should and are intended to be comprehended within the meaning and range of equivalence of the following claims.

What is claimed as new and desired to be secured by Letters Patent is:

1. In a device of the type described, in combination, a set of combination elements, each combination element being movable for a predetermined distance independently of the other combination elements between a normal position and a shifted position, all combination elements being movable for the same predetermined distance, different combinations of combination elements in normal and shifted positions defining a plurality of combination positions of said set of combination elements, said combination elements representing in each of said combination positions a single digit, one of said combination elements being a zero combination element; means urging said combination elements to said normal positions; operating means for selectively shifting said combination elements from said normal positions to said shifted positions and for holding shifted combination elements in said shifted positions; printing means for printing characters represented by combination positions of said combination elements while shifted combination elements are held in said shifted positions; means for releasing shifted combination elements to return to normal positions after printing of a single character, a shiftable typewriter carriage cooperating with said printing means; carriage shifting means for shifting said carriage step by step; and means for actuating said carriage shifting means whenever said zero combination element is shifted.

2. In a computing device, in combination, at least two storing devices, each storing device including a plurality of sets of storing elements, each set of storing elements being associated with one denominational order, each storing element being movable between a normal position and a shifted position, different combinations of storing elements in normal and shifted positions defining a plurality of combination positions of said sets of storing elements, said storing elements representing in each of said combination positions a single digit; at least two sets of pick-up bars, each set of pick-up bars cooperating with one of said storing devices and with the set of storing elements associated with the same, the pick-up bars of each set of pick-up bars being movable from a normal position to a first shifted position and, independently of each other, to a second shifted position, storing elements in said shifted position permitting movement of the corresponding pick-up bars to said second shifted position, while storing elements in said normal position block corresponding pick-up bars in said first shifted position; resilient means consecutively urging said pick-up bars to move to said first and second shifted positions; two sets of summand bar means extending normal to said pick-up bars through said storing devices, each set of summand bar means being associated with at least one of said storing devices, each summand bar means being movable independently of the other summand bar means between a normal position and a shifted position, said pick-up bars and said summand bar means being provided with cooperating blocking projections, each set of pick-up bars permitting in said normal position shifting of said two sets of summand bar means, and blocking in said first shifted position the associated set of summand bar means, said pick-up bar means permitting in said second shifted position shifting of corresponding summand bar means of the associated set of summand bar means, and blocking the other set of summand bar means; and resilient means for consecutively urging said sets of summand bar means to move to said shifted position so that first one set of summand bar means and then the other set of summand bar means tends to assume combination positions in which at least one summand bar bars is permitted by a pick-up bar in said second shifted position to move to a shifted position.

3. In a computing device, in combination, at least two storing devices, each storing device including a plurality of sets of storing elements, each set of storing elements being associated with one denominational order, each storing element being movable between a normal position and a shifted position, different combinations of storing elements in normal and shifted positions defining a plurality of combination positions of said sets of storing elements, said storing elements representing in each of said combination positions a single digit; at least two sets of pick-up bars, each set of pick-up bars cooperating with one of said storing devices and with the set of storing elements associated with the same, the pick-up bars of each set of pick-up bars being movable from a normal position to a first shifted position and, independently of each other, to a second shifted position, storing elements in said shifted position permitting movement of the corresponding pick-up bars to said second shifted position, while storing elements in said normal position block corresponding pick-up bars in said first shifted position; resilient means consecutively urging said pick-up bars to move to said first and second shifted positions; two sets of summand bar means extending normal to said pick-up bars through said storing devices, each set of summand bar means being associated with at least one of said storing devices, each summand bar means being movable independently of the other summand bar means between a normal position and a shifted position, said pick-up bars and said summand bar means being provided with cooperating blocking projections, each set of pick-up bars permitting in said normal position shifting of said two sets of summand bar means, and blocking in said first shifted position the associated set of summand bar means, said pick-up bar means permitting in said second shifted position shifting of corresponding summand bar means of the associated set of summand bar means, and blocking the other set of summand bar means, such summand bar means having an extension located outside of said storing devices and being provided with blocking teeth defining recesses between each other; resilient means for consecutively urging said sets of summand bar means to move to said shifted position so that first one set of summand bar means and then the other set of summand bar means tends to assume combination positions in which at least one summand bar bars is permitted by a pick-up bar in said second position to move to a shifted position; a set of result bars extending transversely to said extensions of said summand bar means and having blocking teeth cooperating with said blocking teeth and recesses of said extensions, said result bars being movable between a normal position and a shifted position independently of each other, at least one result bar being provided for each of said storing elements; and resilient means for resiliently urging said result bars from said normal positions to said shifted positions, said blocking teeth and recesses in said extensions of said summand bar means and in said result bars being arranged in such manner that only result bars representing in shifted position together with the result bars in non-shifted normal position a digit corresponding to the sum of two digits stored in said storing devices are shifted.

4. An arrangement as claimed in claim 3 and including at least one set of input bars extending normal to said result bars along said storing devices, each input bar being movable for a predetermined distance independently of the other input bars between a normal position and a shifted position, different combinations of input bars in normal and shifted positions defining a plurality of combination positions of said set of input bars, each of said input bars representing a digit element, said input bars representing in each of said combination positions a single digit which is the sum of the digit elements represented by said input bars; motion-transmitting means connecting each of said input bars with a corresponding storing element in each set of storing elements, each storing element representing a digit element; means for consecutively shifting said input bars for consecutive storing of digit elements for each denominational order in said sets of storing elements in each of said storing devices; and means connecting said result bars in said shifted position with said input bars so that result bars in a combination position representing a result digit cause said input bars to assume a corresponding combination position representing the same result digit.

5. An arrangement as claimed in claim 4 wherein each summand bar means of one of said two sets of summand bar means includes at least two transfer bars extending through said storing devices and a summand bar having a cross piece engaged by said two transfer bars and constituting said extension one transfer bar of each two associated transfer bars cooperating with one of said storing devices, and the other transfer bar cooperating with the other of said two storing devices, each two associated transfer bars expressing the same digit element, said one set of summand bar means, and the summand bar associated therewith being used for expressing digit elements stored in any one of said two storing devices if such digit element is stored only in one of said storing devices.

6. An arrangement as claimed in claim 4 wherein said summand bar means include a plurality of transfer bars extending through said storing devices, and wherein said extensions of said two sets of summand bar means are two sets of summand bars, each summand bar having a cross piece engaged by a plurality of transfer bars; and including resilient means for resiliently urging said transfer bars and said summand bars toward each other.

7. An arrangement as claimed in claim 6, and wherein said set of result bars includes at least one tens-transfer result bar for indicating that the result of two digits stored in said two storing devices exceeds the value nine.

8. An arrangement as claimed in claim 6, and wherein said set of result bars includes at least one tens-transfer result bar for indicating that the result of two digits stored in said two storing devices exceeds the value nine, said tens-transfer result bar indicating the value ten, and the other result bars indicating together the value by which the sum of the stored digits exceeds the value ten.

9. An arrangement as claimed in claim 8 and including a tens-transfer bar extending transversely with respect to said transfer bars and having blocking projections cooperating with said transfer bars, said tens-transfer bar being movable between a normal inoperative position and a shifted operative position, said tens-transfer bar blocking in said shifted position at least one transfer bar representing a digit element, and permitting shifting of at least one transfer bar representing said digit element increased by the value one; and motion-transmitting means connecting said tens-transfer result bar and said tens-transfer bar for shifting said tens-transfer bar whenever said tens-transfer result bar is shifted.

10. An arrangement as claimed in claim 9, wherein each of said storing devices includes a plurality of sets of said storing elements, one set of storing elements being provided in each storing device for each denominational order; and including means for consecutively operating said resilient means associated with said pick-up bars, said transfer bars and said result bars for computing digits stored by said sets of storing elements in each denominational order; and locking means for arresting said tens-transfer bar in said shifted position after the same has been shifted by said tens-transfer result bar in one denominational order, said locking means holding said tens-transfer bar in shifted position during computing in the next higher denominational order so that in said next higher denominational order a digit value increased by one is transferred by said transfer bars to said summand bars and indicated by said result bars.

11. In a computing device, in combination, at least two storing devices, each storing device including a plurality of sets of storing elements, each set of storing elements being associated with one denominational order, a further set of storing elements being provided in each storing device for indicating complement and negative values, each storing element being movable between a normal position and a shifted position, different combinations of storing elements in normal and shifted positions defining a plurality of combination positions of said sets of storing elements, said storing elements associated with denominational orders representing in each of said combination positions a single digit; at least two sets of pick-up bars, each set of pick-up bars cooperating with one of said storing devices and with the set of storing elements associated with the same, the pick-up bars of each set of pick-up bars being movable from a normal position to a first shifted position and, independently of each other, to a second shifted position, storing elements in said shifted position permitting movement of the corresponding pick-up bars to said second shifted position, while storing elements in said normal position block corresponding pick-up bars in said first shifted position; classifying pick-up bars cooperating with said further set of storing elements; locking means for holding said classifying pick-up bars in said shifted position during a computing operation; resilient means consecutively urging said pick-up bars to move to said first and second shifted positions; two sets of summand bar means extending normal to said pick-up bars through said storing devices, each set of summand bar means being associated with at least one of said storing devices, each summand bar means being movable independently of the other summand bar means between a normal position and a shifted position, said pick-up bars and said summand bar means being provided with cooperating blocking projections, each set of pick-up bars permitting in said normal position shifting of said two sets of summand bar means, and blocking in said first shifted position the associated set of summand bar means, said pick-up bar means permitting in said second shifted position shifting of corresponding summand bar means of the associated set of summand bar means, and blocking the other set of summand bar means, each summand bar means having an extension located outside of said storing devices and being provided with blocking teeth defining recesses between each other; resilient means for consecutively urging said sets of summand bar means to move to said shifted position so that first one set of summand bar means and then the other set of summand bar means tends to assume combination positions in which at least one summand bar is permitted by a pick-up bar in said second shifted position to move to a shifted position; a set of result bars extending tranversely to said extensions of said summand bar means and having blocking teeth cooperating with said blocking teeth and recesses of said extensions, said result bars being movable between a normal position and a shifted position independently of each other, at least one result bar being provided for each of said storing elements; and resilient means for resiliently urging said result bars from said normal positions to said shifted positions, said blocking teeth and recesses in said extensions of said summand bar means and in said result bars being arranged in such manner that only result bars representing in shifted position together with the result bars in non-shifted normal position a digit corresponding to the sum of two digits stored in said storing devices are shifted.

12. An arrangement as claimed in claim 11 wherein said summand bar means include a plurality of transfer bars extending through said storing devices, and wherein said extensions of said two sets of summand bar means are two sets of summand bars, each summand bar having a cross piece engaged by a plurality of transfer bars; and wherein each storing element and each pick-up bar associated with a denominational order represents a digit element; the respective sets representing digits which are the sum of said digit elements; and wherein said classifying pick-up bars have blocking projections cooperating with said transfer bars.

13. An arrangement as claimed in claim 12 wherein said classifying pick-up bars in normal position permit shifting of transfer bars released by the sets of pick-up bars associated with denominational orders, and in shifted position block said last-mentioned transfer bars, and permit shifting of transfer bars representing digit elements which are the complements of the stored digit element whereby a subtraction is carried out by adding complement values.

14. An arrangement as claimed in claim 12 wherein said classifying pick-up bars in normal position permit shifting of transfer bars released by the sets of pick-up bars associated with denominational orders, and in shifted position block said last-mentioned transfer bars, and permit shifting of transfer bars representing digit elements which are the negative complements of the stored digit element whereby a subtraction is carried out by adding complement values.

15. An arrangement as claimed in claim 14 and including at least one set of input bars extending normal to said result bars along said storing devices, each input bar being movable for a predetermined distance independently of the other input bars between a normal position and a shifted position, different combinations of input bars in normal and shifted positions defining a plurality of combination positions of said set of input bars, each of said input bars representing a digit element, said input bars representing in each of said combination positions a single digit which is the sum of the digit elements represented by said input bars; motion-transmitting means connecting each of said input bars with a corresponding storing element in each set of storing elements; means for consecutively shifting said input bars for consecutive storing of digit elements for each denominational order in said sets of storing elements in each of said storing devices which are associated with a denominational order; blocking means movable between an inoperative position and an operative position, said blocking means blocking in said inoperative position said input bars and permitting in said operative position shifting of input bars representing predetermined digit elements for storing corresponding digit elements in said further set of storing elements; means for moving said blocking means to said operative position; and means connecting said result bars in said shifted position with said input bars so that result bars in a combination position representing a result digit cause said input bars to assume a corresponding combination position representing the same result digit.

16. An arrangement as claimed in claim 15 and including a typewriter carriage for supporting a sheet being movable between a plurality of positions adapted to correspond to columns on said sheet; contact means actuated by said typewriter carriage in predetermined positions of the same, said positions adapted to correspond to predetermined columns on the sheet; and actuating means actuated by said contact means and operatively connected to said blocking means for shifting the same to said operative position in said predetermined positions of said carriage means for carrying out subtractions by addition of negative complement values.

17. An arrangement as claimed in claim 14 and including at least one set of input bars extending normal to said result bars along said storing devices, each input bar being movable for a predetermined distance independently of the other input bars between a normal position and a shifted position, different combinations of input bars in normal and shifted positions defining a plurality of combination positions of said set of input bars, each of said input bars representing a digit element, said input bars representing in each of said combination positions a single digit which is the sum of the digit elements represented by said input bars; motion-transmitting means connecting each of said input bars with a corresponding storing element in each set of storing elements; means for consecutively shifting said input bars for consecutive storing of digit elements for each denominational order in said sets of storing elements in each of said storing devices; a set of output bars, each output bar being movable for a predetermined distance independently of the other output bars between a normal position and a shifted position, different combinations of output bars in normal and shifted positions defining a plurality of combination positions of said set of output bars, each of said output bars representing a digit element, said output bars representing in each of said combination positions a single digit which is the sum of the digit elements represented by said output bars; printing means for printing digits; motion transmitting means operatively connecting said output bars with said printing means for printing digits represented by combination positions of said output bars; and means connecting said result bars in shifted position with said output bars so that result bars in a combination position representing a result digit cause said output bars to assume a corresponding combination position so that a result digit represented by said result bars is printed by said printing means.

18. In a computing device, in combination movable carriage means for supporting a sheet; said carriage means including fixed stop means; a plurality of shiftable stops cooperating with said fixed stop means to arrest said carriage means in a plurality of positions; a storing device composed of a plurality of storing means, one storing means being provided for each decimal order; printing means for consecutively printing on a sheet supported by said carriage digits stored in said storing means; tabulator means for shifting said carriage to a starting position in which any number of decimal digits stored in a corresponding number of said storing means are printed in positions corresponding to the lowest decimal orders so that if $n$ digits are stored in said storing device, printing is started in the $n$th decimal place from the lowest decimal order, said tabulator means including a plurality of shiftable combination elements movable between different combination positions; means connecting said combination elements with said movable stops for actuating the same in accordance with combination positions of said combination elements; a blocking rod for blocking said combination elements; and a tabulator key for shifting said blocking rod to an inoperative position releasing said combination elements.

19. An arrangement as claimed in claim 18 wherein $m$ lowest decimal places represent decimal fractions; and including means for actuating said printing means to print zeroes at least in said lowest decimal places representing decimal fractions and in the unit decimal place when the number of stored digits is smaller than the number of said lowest decimal places representing decimal fractions plus one.

20. In a computing device, in combination, at least two factor storing devices, each storing device including a plurality of sets of storing elements, each set of storing elements being associated in the one denominational order, each storing element being movable between a normal position and a shifted position, different combinations of storing elements in normal and shifted positions defining a plurality of combination positions of said sets of storing elements, said storing elements representing in each of said combination positions a single digit; at least two sets of pick-up bars, each set of pick-up bars cooperating with one of said storing devices and with the set of storing elements associated with the same, the pick-up bars of each set of pick-up bars being movable from a normal position to a first shifted position and, independently of each other, to a second shifted position, storing elements in said shifted position permitting movement of the corresponding pick-up bars to said second shifted position, while storing elements in said normal position block corresponding pick-up bars in said first shifted position; resilient means consecutively urging said pick-up bars to move to said first and second shifted positions; two sets of factor bars means extending normal to said pick-up bars through said storing devices, each set of factor bar means being associated with at least one of said storing devices, each factor bar means being movable independently of the other factor bar means between a normal position and a shifted position, said pick-up bars and said factor bar means being provided with cooperating blocking projections, each set of pick-up bars permitting in said normal position shifting of said two sets of factor bar means, and blocking in said first shifted position the associated set of factor bar means, said pick-up bar means permitting in said second shifted position shifting of corresponding factor bar means of the associated set of factor bar means, and blocking the other set of factor bar means, each factor bar means having an extension located outside of said storing devices and being provided with blocking teeth defining recesses between each other; resilient means for consecutively urging said sets of factor bar means to move to said shifted position so that first one set of factor bar means and then the other set of factor bar means tends to assume combination positions in which at least one factor bar is permitted by a pick-up bar in said second position to move to a shifted position; two sets of result bars extending transversely to said extensions of said factor bar means and having blocking teeth cooperating with said blocking teeth and recesses of said extensions, said result bars being movable between a normal position and a shifted position independently of each other, at least one result bar being provided in each set of result bars for each of said storing elements; and resilient means for resiliently urging said result bars from said normal positions to said shifted positions, said blocking teeth and recesses in said extensions of said factor bar means and in said result bars being arranged in such manner that in one of said sets of said result bars only result bars representing in shifted position together with the result bars in non-shifted normal position a digit corresponding to the unit digit of the product of two digits stored in said factor storing devices are shifted, and so that in the other set of result bars only result bars representing in shifted position together with the other result bars the tens digit of said product are shifted.

21. An arrangement as claimed in claim 20 and including a product storing device for storing said product, said product storing device including at least one set of storing elements for storing unit digits and one set of storing elements for storing tens digits.

22. An arrangement as claimed in claim 21 wherein each factor bar means of one of said two sets of factor bar means includes at least two transfer bars extending through said factor storing devices and a factor bar having a cross piece engaged by said two transfer bars and constituting said extension, one transfer bar of each two associated transfer bars cooperating with one of said storing devices, and the other transfer bar cooperating with the other of said two storing devices, each two associated transfer bars expressing the some digit element, said one set of factor bar means, and the factor bar associated therewith being used for expressing digit elements stored in any one of said two storing devices if such digit element is stored only in one of said storing devices.

References Cited in the file of this patent

UNITED STATES PATENTS

| | | |
|---|---|---|
| 1,157,079 | Bricken | Oct. 19, 1915 |
| 1,876,296 | Hofgaard | Sept. 6, 1932 |
| 2,116,731 | Noll | May 10, 1938 |
| 2,364,758 | Roggenstein | Dec. 12, 1944 |
| 2,403,005 | Lake et al. | July 2, 1946 |
| 2,540,226 | Williams | Feb. 6, 1951 |
| 2,625,324 | Sundstrand | Jan. 13, 1953 |
| 2,668,659 | Swanson | Feb. 9, 1954 |

FOREIGN PATENTS

| | | |
|---|---|---|
| 210,468 | Great Britain | Feb. 1, 1924 |